(12) United States Patent
LaJoie

(10) Patent No.: US 10,810,628 B2
(45) Date of Patent: Oct. 20, 2020

(54) METHODS AND APPARATUS FOR USER-BASED TARGETED CONTENT DELIVERY

(71) Applicant: Time Warner Cable Enterprises LLC, St. Louis, MO (US)

(72) Inventor: Michael L. LaJoie, Stamford, CT (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 25 days.

(21) Appl. No.: 16/292,124

(22) Filed: Mar. 4, 2019

(65) Prior Publication Data
US 2019/0266645 A1   Aug. 29, 2019

Related U.S. Application Data

(62) Division of application No. 14/754,226, filed on Jun. 29, 2015, now Pat. No. 10,223,713, which is a (Continued)

(51) Int. Cl.
*G06Q 30/02* (2012.01)
*H04N 7/173* (2011.01)
(Continued)

(52) U.S. Cl.
CPC ......... *G06Q 30/0269* (2013.01); *G06Q 30/02* (2013.01); *G06Q 30/0264* (2013.01); (Continued)

(58) Field of Classification Search
None
See application file for complete search history.

(56) References Cited

U.S. PATENT DOCUMENTS

| | | |
|---|---|---|
| 4,521,881 A | 6/1985 | Stapleford et al. |
| 4,546,382 A | 10/1985 | McKenna et al. |
| | (Continued) | |

FOREIGN PATENT DOCUMENTS

| | | |
|---|---|---|
| CA | 2643806 C | 6/2013 |
| WO | WO-0110125 A1 | 2/2001 |
| | (Continued) | |

OTHER PUBLICATIONS

"DOCSIS 3.0 Management Features Differences Technical Report" CM-TR-MGMT V3.0-DIFF-V01-071228.
(Continued)

*Primary Examiner* — James R Marandi
(74) *Attorney, Agent, or Firm* — Gazdzinski & Associates, PC

(57) ABSTRACT

Methods and apparatus for selecting and delivering advertising or promotional content based on, e.g., the attributes of a desired demographic. In one embodiment, the invention enhances advertising or promotional penetration into a particular demographic of a network subscriber pool by correlating the advertising/promotion (and even the contextual program content) with specific users or groups of users within the pool. This approach decouples the advertising or promotion from any given program or lineup, and gives the network operator flexibility in deciding where, when, and how often to insert advertisements or promotions in order to achieve the desired result. Dynamic network architectures such as broadcast switched architectures can also be leveraged to further enhance flexibility and targeting precision. In effect, the network advertising or promotion model is made results-driven (versus program-centric). Subscriber privacy is also optionally maintained, thus ensuring that stored data is not traceable to a specific user.

20 Claims, 21 Drawing Sheets

Related U.S. Application Data division of application No. 12/284,757, filed on Sep. 24, 2008, now Pat. No. 9,071,859.

(60) Provisional application No. 60/995,655, filed on Sep. 26, 2007.

(51) Int. Cl.
*H04N 21/234* (2011.01)
*H04N 21/258* (2011.01)
*H04N 21/44* (2011.01)
*H04N 21/81* (2011.01)
*H04N 21/845* (2011.01)
*H04N 21/45* (2011.01)

(52) U.S. Cl.
CPC ... *H04N 7/17318* (2013.01); *H04N 21/23424* (2013.01); *H04N 21/25875* (2013.01); *H04N 21/25883* (2013.01); *H04N 21/25891* (2013.01); *H04N 21/44016* (2013.01); *H04N 21/812* (2013.01); *H04N 21/8455* (2013.01); *H04N 21/45* (2013.01)

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,313,454 A | 5/1994 | Bustini et al. |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,673,253 A | 9/1997 | Shaffer |
| RE35,651 E | 11/1997 | Bradley et al. |
| 5,734,380 A | 3/1998 | Adams et al. |
| 5,758,257 A | 5/1998 | Herz et al. |
| 5,774,170 A | 6/1998 | Hite et al. |
| 5,793,409 A | 8/1998 | Tetsumura |
| 5,793,410 A | 8/1998 | Rao |
| 5,812,642 A | 9/1998 | Leroy |
| 5,815,662 A | 9/1998 | Ong |
| 5,862,312 A | 1/1999 | Mann et al. |
| 5,878,324 A | 3/1999 | Borth et al. |
| 5,884,037 A | 3/1999 | Aras et al. |
| 5,914,945 A | 6/1999 | Abu-Amara et al. |
| 5,926,205 A | 7/1999 | Krause et al. |
| 5,929,849 A | 7/1999 | Kikinis |
| 5,935,206 A | 8/1999 | Dixon et al. |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,092,178 A | 7/2000 | Jindal et al. |
| 6,105,134 A | 8/2000 | Pinder et al. |
| 6,124,878 A | 9/2000 | Adams et al. |
| 6,128,316 A | 10/2000 | Takeda et al. |
| 6,134,532 A | 10/2000 | Lazarus et al. |
| 6,157,377 A | 12/2000 | Shah-Nazaroff et al. |
| 6,161,142 A | 12/2000 | Wolfe et al. |
| 6,167,432 A | 12/2000 | Jiang |
| 6,169,728 B1 | 1/2001 | Perreault et al. |
| 6,175,856 B1 | 1/2001 | Riddle |
| 6,182,050 B1 | 1/2001 | Ballard |
| 6,202,210 B1 | 3/2001 | Ludtke |
| 6,211,869 B1 | 4/2001 | Loveman et al. |
| 6,211,901 B1 | 4/2001 | Imajima et al. |
| 6,216,129 B1 | 4/2001 | Eldering |
| 6,216,152 B1 | 4/2001 | Wong et al. |
| 6,219,710 B1 | 4/2001 | Gray et al. |
| 6,219,840 B1 | 4/2001 | Corrigan et al. |
| 6,240,243 B1 | 5/2001 | Chen et al. |
| 6,240,553 B1 | 5/2001 | Son et al. |
| 6,252,964 B1 | 6/2001 | Wasilewski et al. |
| 6,256,393 B1 | 7/2001 | Safadi et al. |
| 6,272,176 B1 | 8/2001 | Srinivasan |
| 6,282,713 B1 | 8/2001 | Kitsukawa et al. |
| 6,330,609 B1 | 12/2001 | Garofalakis et al. |
| 6,337,715 B1 | 1/2002 | Inagaki et al. |
| 6,353,626 B1 | 3/2002 | Sunay et al. |
| 6,378,130 B1 | 4/2002 | Adams |
| 6,434,141 B1 | 8/2002 | Oz et al. |
| 6,446,261 B1 | 9/2002 | Rosser |
| 6,463,508 B1 | 10/2002 | Wolf et al. |
| 6,463,585 B1 | 10/2002 | Hendricks et al. |
| 6,467,089 B1 | 10/2002 | Aust et al. |
| 6,498,783 B1 | 12/2002 | Lin |
| 6,502,076 B1 | 12/2002 | Smith |
| 6,502,139 B1 | 12/2002 | Birk et al. |
| 6,516,412 B2 | 2/2003 | Wasilewski et al. |
| 6,560,578 B2 | 5/2003 | Eldering |
| 6,571,102 B1 | 5/2003 | Hogberg et al. |
| 6,590,865 B1 | 7/2003 | Ibaraki et al. |
| 6,594,699 B1 | 7/2003 | Sahai et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,651,103 B1 | 11/2003 | Markowitz et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,718,551 B1 | 4/2004 | Swix et al. |
| 6,725,459 B2 | 4/2004 | Bacon |
| 6,728,269 B1 | 4/2004 | Godwin et al. |
| 6,728,840 B1 | 4/2004 | Shatil et al. |
| 6,738,978 B1 | 5/2004 | Hendricks et al. |
| 6,742,187 B1 | 5/2004 | Vogel |
| 6,745,245 B1 | 6/2004 | Carpenter |
| 6,763,391 B1 | 7/2004 | Ludtke |
| 6,771,290 B1 | 8/2004 | Hoyle |
| 6,772,435 B1 | 8/2004 | Thexton et al. |
| 6,775,843 B1 | 8/2004 | McDermott |
| 6,799,196 B1 | 9/2004 | Smith |
| 6,842,783 B1 | 1/2005 | Boivie et al. |
| 6,868,439 B2 | 3/2005 | Basu et al. |
| 6,891,841 B2 | 5/2005 | Leatherbury et al. |
| 6,901,606 B2 | 5/2005 | Wright et al. |
| 6,909,837 B1 | 6/2005 | Unger |
| 6,917,628 B2 | 7/2005 | McKinnin et al. |
| 6,944,166 B1 | 9/2005 | Perinpanathan et al. |
| 6,948,183 B1 | 9/2005 | Peterka |
| 6,961,430 B1 | 11/2005 | Gaske et al. |
| 6,981,045 B1 | 12/2005 | Brooks |
| 6,985,934 B1 | 1/2006 | Armstrong et al. |
| 6,986,156 B1 | 1/2006 | Rodriguez et al. |
| 7,010,801 B1 | 3/2006 | Jerding et al. |
| 7,012,891 B1 | 3/2006 | Chandran et al. |
| 7,024,461 B1 | 4/2006 | Janning et al. |
| 7,024,676 B1 | 4/2006 | Klopfenstein |
| 7,027,460 B2 | 4/2006 | Iyer et al. |
| 7,039,116 B1 | 5/2006 | Zhang et al. |
| 7,039,169 B2 | 5/2006 | Jones |
| 7,039,614 B1 | 5/2006 | Candelore |
| 7,039,928 B2 | 5/2006 | Kamada et al. |
| 7,039,938 B2 | 5/2006 | Candelore |
| 7,047,309 B2 | 5/2006 | Baumann et al. |
| 7,058,387 B2 | 6/2006 | Kumar et al. |
| 7,069,573 B1 | 6/2006 | Brooks et al. |
| 7,075,945 B2 | 7/2006 | Arsenault et al. |
| 7,086,077 B2 | 8/2006 | Giammaressi |
| 7,089,577 B1 | 8/2006 | Rakib et al. |
| 7,093,272 B1 | 8/2006 | Shah-Nazaroff et al. |
| 7,100,183 B2 | 8/2006 | Kunkel et al. |

(56) References Cited

U.S. PATENT DOCUMENTS

| | | |
|---|---|---|
| 7,103,906 B1 | 9/2006 | Katz et al. |
| 7,107,462 B2 | 9/2006 | Fransdonk |
| 7,127,619 B2 | 10/2006 | Unger et al. |
| 7,133,837 B1 | 11/2006 | Barnes, Jr. |
| 7,143,431 B1 | 11/2006 | Eager et al. |
| 7,146,627 B1 | 12/2006 | Ismail et al. |
| 7,150,017 B1 | 12/2006 | Vogl et al. |
| 7,152,237 B2 | 12/2006 | Flickinger et al. |
| 7,155,508 B2 | 12/2006 | Sankuratripati et al. |
| 7,174,126 B2 | 2/2007 | McElhatten et al. |
| 7,174,385 B2 | 2/2007 | Li |
| 7,178,161 B1 | 2/2007 | Fristoe et al. |
| 7,181,010 B2 | 2/2007 | Russ et al. |
| 7,191,461 B1 | 3/2007 | Arsenault et al. |
| 7,194,756 B2 | 3/2007 | Addington et al. |
| 7,197,472 B2 | 3/2007 | Conkwright et al. |
| 7,200,788 B2 | 4/2007 | Hiraki et al. |
| 7,203,940 B2 | 4/2007 | Barmettler et al. |
| 7,207,055 B1 | 4/2007 | Hendricks et al. |
| 7,216,265 B2 | 5/2007 | Hughes et al. |
| 7,222,078 B2 | 5/2007 | Abelow |
| 7,225,164 B1 | 5/2007 | Candelore et al. |
| 7,225,458 B2 | 5/2007 | Klauss et al. |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,246,366 B1 | 7/2007 | Addington et al. |
| 7,254,608 B2 | 8/2007 | Yeager et al. |
| 7,257,650 B2 | 8/2007 | Maciesowicz |
| 7,266,198 B2 | 9/2007 | Medvinsky |
| 7,266,611 B2 | 9/2007 | Jabri et al. |
| 7,266,726 B1 | 9/2007 | Ladd et al. |
| 7,274,661 B2 | 9/2007 | Harrell et al. |
| 7,280,737 B2 | 10/2007 | Smith |
| 7,283,803 B2 | 10/2007 | Karaoguz et al. |
| 7,305,691 B2 | 12/2007 | Cristofalo |
| 7,308,415 B2 | 12/2007 | Kimbrel et al. |
| 7,317,728 B2 | 1/2008 | Acharya et al. |
| 7,324,523 B2 | 1/2008 | Dacosta |
| 7,325,073 B2 | 1/2008 | Shao et al. |
| 7,327,692 B2 | 2/2008 | Ain et al. |
| 7,334,044 B1 | 2/2008 | Allen |
| 7,340,759 B1 | 3/2008 | Rodriguez |
| 7,346,688 B2 | 3/2008 | Allen et al. |
| 7,352,775 B2 | 4/2008 | Powell |
| 7,355,980 B2 | 4/2008 | Bauer et al. |
| 7,356,751 B1 | 4/2008 | Levitan |
| 7,363,371 B2 | 4/2008 | Kirby et al. |
| 7,363,643 B2 | 4/2008 | Drake et al. |
| 7,370,120 B2 | 5/2008 | Kirsch et al. |
| 7,376,386 B2 | 5/2008 | Phillips et al. |
| 7,379,494 B2 | 5/2008 | Raleigh et al. |
| 7,403,618 B2 | 7/2008 | Van et al. |
| 7,434,245 B1 | 10/2008 | Shiga et al. |
| 7,457,520 B2 | 11/2008 | Rosetti et al. |
| 7,464,179 B2 | 12/2008 | Hodges et al. |
| 7,567,565 B2 | 7/2009 | La |
| 7,574,726 B2 | 8/2009 | Zhang et al. |
| 7,577,118 B2 | 8/2009 | Haumonte et al. |
| 7,602,820 B2 | 10/2009 | Helms et al. |
| 7,603,529 B1 | 10/2009 | MacHardy et al. |
| 7,617,516 B2 | 11/2009 | Huslak et al. |
| 7,690,020 B2 | 3/2010 | Lebar |
| 7,720,432 B1 | 5/2010 | Colby et al. |
| 7,729,940 B2 | 6/2010 | Harvey et al. |
| 7,730,509 B2 | 6/2010 | Boulet et al. |
| 7,757,251 B2 | 7/2010 | Gonder et al. |
| 7,783,316 B1 | 8/2010 | Mitchell |
| 7,801,803 B2 | 9/2010 | Forlai |
| 7,836,178 B1 | 11/2010 | Bedell et al. |
| 7,930,715 B2 | 4/2011 | Hendricks et al. |
| 7,954,131 B2 | 5/2011 | Cholas et al. |
| 8,028,322 B2 | 9/2011 | Riedl et al. |
| 8,042,131 B2 | 10/2011 | Flickinger |
| 8,065,703 B2 | 11/2011 | Wilson et al. |
| 8,099,757 B2 | 1/2012 | Riedl et al. |
| 8,156,520 B2 | 4/2012 | Casagrande et al. |
| 8,170,065 B2 | 5/2012 | Hasek et al. |
| 8,205,226 B2 | 6/2012 | Ko et al. |
| 8,214,256 B2 | 7/2012 | Riedl et al. |
| 8,296,185 B2 | 10/2012 | Isaac |
| 8,347,341 B2 | 1/2013 | Markley et al. |
| 8,365,212 B1 | 1/2013 | Orlowski |
| 8,365,213 B1 | 1/2013 | Orlowski |
| 8,458,125 B1 | 6/2013 | Chong, Jr. et al. |
| 8,468,099 B2 | 6/2013 | Headings et al. |
| 8,516,529 B2 | 8/2013 | LaJoie et al. |
| 8,571,931 B2 | 10/2013 | Riedl et al. |
| 8,621,501 B2 | 12/2013 | Matheny et al. |
| 8,701,138 B2 | 4/2014 | Stern et al. |
| 8,713,623 B2 | 4/2014 | Brooks |
| 8,726,303 B2 | 5/2014 | Ellis, III |
| 8,769,559 B2 | 7/2014 | Moon et al. |
| 8,997,136 B2 | 3/2015 | Brooks et al. |
| 9,027,062 B2 | 5/2015 | Patel et al. |
| 9,215,423 B2 | 12/2015 | Kimble et al. |
| 2001/0013123 A1 | 8/2001 | Freeman et al. |
| 2001/0030785 A1 | 10/2001 | Pangrac et al. |
| 2001/0050901 A1 | 12/2001 | Love et al. |
| 2002/0004912 A1 | 1/2002 | Fung |
| 2002/0019984 A1 | 2/2002 | Rakib |
| 2002/0032754 A1 | 3/2002 | Logston et al. |
| 2002/0046404 A1 | 4/2002 | Mizutani |
| 2002/0049902 A1 | 4/2002 | Rhodes |
| 2002/0049980 A1 | 4/2002 | Hoang |
| 2002/0053082 A1 | 5/2002 | Weaver et al. |
| 2002/0054589 A1 | 5/2002 | Ethridge et al. |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100059 A1 | 7/2002 | Buehl et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129378 A1 | 9/2002 | Cloonan et al. |
| 2002/0144262 A1 | 10/2002 | Plotnick et al. |
| 2002/0144263 A1 | 10/2002 | Eldering et al. |
| 2002/0147771 A1 | 10/2002 | Traversat et al. |
| 2002/0152299 A1 | 10/2002 | Traversat et al. |
| 2002/0154655 A1 | 10/2002 | Gummalla et al. |
| 2002/0162109 A1 | 10/2002 | Shteyn |
| 2002/0162115 A1 | 10/2002 | Bruckner et al. |
| 2002/0163928 A1 | 11/2002 | Rudnick et al. |
| 2002/0166119 A1 | 11/2002 | Cristofalo |
| 2002/0170057 A1 | 11/2002 | Barrett et al. |
| 2002/0178445 A1 | 11/2002 | Eldering et al. |
| 2002/0178447 A1 | 11/2002 | Plotnick et al. |
| 2002/0194607 A1 | 12/2002 | Connelly |
| 2002/0196939 A1 | 12/2002 | Unger et al. |
| 2003/0002862 A1 | 1/2003 | Rodriguez et al. |
| 2003/0004810 A1 | 1/2003 | Eldering |
| 2003/0005056 A1 | 1/2003 | Yamamoto et al. |
| 2003/0005453 A1 | 1/2003 | Rodriguez et al. |
| 2003/0005454 A1 | 1/2003 | Rodriguez et al. |
| 2003/0007516 A1 | 1/2003 | Abramov et al. |
| 2003/0021412 A1 | 1/2003 | Candelore et al. |
| 2003/0025832 A1 | 2/2003 | Swart et al. |
| 2003/0028884 A1 | 2/2003 | Swart et al. |
| 2003/0033199 A1 | 2/2003 | Coleman |
| 2003/0037068 A1 | 2/2003 | Thomas et al. |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0074565 A1 | 4/2003 | Wasilewski et al. |
| 2003/0077067 A1 | 4/2003 | Wu et al. |
| 2003/0088876 A1 | 5/2003 | Mao et al. |

(56) References Cited

U.S. PATENT DOCUMENTS

| | | |
|---|---|---|
| 2003/0093311 A1 | 5/2003 | Knowlson |
| 2003/0093784 A1 | 5/2003 | Dimitrova et al. |
| 2003/0093792 A1 | 5/2003 | Labeeb et al. |
| 2003/0095791 A1 | 5/2003 | Barton et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0115612 A1 | 6/2003 | Mao et al. |
| 2003/0118014 A1 | 6/2003 | Iyer et al. |
| 2003/0135860 A1 | 7/2003 | Dureau |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0161473 A1 | 8/2003 | Fransdonk |
| 2003/0172376 A1 | 9/2003 | Coffin |
| 2003/0179773 A1 | 9/2003 | Mocek et al. |
| 2003/0182261 A1 | 9/2003 | Patterson |
| 2003/0195927 A1 | 10/2003 | Virine et al. |
| 2003/0214962 A1 | 11/2003 | Allaye-Chan et al. |
| 2003/0217365 A1 | 11/2003 | Caputo |
| 2003/0229681 A1 | 12/2003 | Levitan |
| 2004/0006625 A1 | 1/2004 | Saha et al. |
| 2004/0013136 A1 | 1/2004 | Mailhot et al. |
| 2004/0031053 A1 | 2/2004 | Lim et al. |
| 2004/0045030 A1 | 3/2004 | Reynolds et al. |
| 2004/0078809 A1 | 4/2004 | Drazin |
| 2004/0103437 A1 | 5/2004 | Allegrezza et al. |
| 2004/0109672 A1 | 6/2004 | Kim et al. |
| 2004/0123313 A1 | 6/2004 | Koo et al. |
| 2004/0133467 A1 | 7/2004 | Siler |
| 2004/0133907 A1 | 7/2004 | Rodriguez et al. |
| 2004/0133917 A1 | 7/2004 | Schilling |
| 2004/0138909 A1 | 7/2004 | Mayer |
| 2004/0146006 A1 | 7/2004 | Jackson |
| 2004/0148625 A1 | 7/2004 | Eldering et al. |
| 2004/0163109 A1 | 8/2004 | Kang et al. |
| 2004/0179605 A1 | 9/2004 | Lane |
| 2004/0181800 A1 | 9/2004 | Rakib et al. |
| 2004/0181811 A1 | 9/2004 | Rakib |
| 2004/0186774 A1 | 9/2004 | Lee |
| 2004/0187150 A1 | 9/2004 | Gonder et al. |
| 2004/0187159 A1 | 9/2004 | Gaydos et al. |
| 2004/0193648 A1 | 9/2004 | Lai et al. |
| 2004/0193704 A1 | 9/2004 | Smith |
| 2004/0194134 A1 | 9/2004 | Gunatilake et al. |
| 2004/0199789 A1 | 10/2004 | Shaw et al. |
| 2004/0210936 A1 | 10/2004 | Rao et al. |
| 2004/0261114 A1 | 12/2004 | Addington et al. |
| 2004/0261116 A1 | 12/2004 | McKeown et al. |
| 2004/0267965 A1 | 12/2004 | Vasudevan et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0039206 A1 | 2/2005 | Opdycke |
| 2005/0041679 A1 | 2/2005 | Weinstein et al. |
| 2005/0047596 A1 | 3/2005 | Suzuki |
| 2005/0050070 A1 | 3/2005 | Sheldon |
| 2005/0050160 A1 | 3/2005 | Upendran et al. |
| 2005/0055685 A1 | 3/2005 | Maynard et al. |
| 2005/0058115 A1 | 3/2005 | Levin et al. |
| 2005/0060742 A1 | 3/2005 | Riedl et al. |
| 2005/0060745 A1 | 3/2005 | Riedl et al. |
| 2005/0060758 A1 | 3/2005 | Park |
| 2005/0071669 A1 | 3/2005 | Medvinsky |
| 2005/0071882 A1 | 3/2005 | Rodriguez et al. |
| 2005/0086691 A1 | 4/2005 | Dudkiewicz et al. |
| 2005/0097598 A1 | 5/2005 | Pedlow et al. |
| 2005/0108529 A1 | 5/2005 | Juneau |
| 2005/0111844 A1 | 5/2005 | Compton et al. |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0125528 A1 | 6/2005 | Burke et al. |
| 2005/0125832 A1 | 6/2005 | Jost et al. |
| 2005/0135476 A1 | 6/2005 | Gentric et al. |
| 2005/0160470 A1 | 7/2005 | Strauss |
| 2005/0168323 A1 | 8/2005 | Lenoir et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0276284 A1 | 12/2005 | Krause et al. |
| 2005/0289588 A1 | 12/2005 | Kinnear |
| 2005/0289618 A1 | 12/2005 | Hardin |
| 2005/0289619 A1 | 12/2005 | Melby |
| 2006/0010075 A1 | 1/2006 | Wolf |
| 2006/0020984 A1 | 1/2006 | Ban et al. |
| 2006/0036750 A1 | 2/2006 | Ladd et al. |
| 2006/0037060 A1 | 2/2006 | Simms et al. |
| 2006/0047957 A1 | 3/2006 | Helms et al. |
| 2006/0050784 A1 | 3/2006 | Lappalainen et al. |
| 2006/0059098 A1 | 3/2006 | Major et al. |
| 2006/0059342 A1 | 3/2006 | Medvinsky et al. |
| 2006/0062059 A1 | 3/2006 | Smith et al. |
| 2006/0064728 A1 | 3/2006 | Son et al. |
| 2006/0073843 A1 | 4/2006 | Aerrabotu et al. |
| 2006/0084417 A1 | 4/2006 | Melpignano et al. |
| 2006/0085824 A1 | 4/2006 | Bruck et al. |
| 2006/0088063 A1 | 4/2006 | Hartung et al. |
| 2006/0130107 A1 | 6/2006 | Gonder et al. |
| 2006/0130113 A1 | 6/2006 | Carlucci et al. |
| 2006/0133398 A1 | 6/2006 | Choi et al. |
| 2006/0133644 A1 | 6/2006 | Wells et al. |
| 2006/0171390 A1 | 8/2006 | La |
| 2006/0171423 A1 | 8/2006 | Helms et al. |
| 2006/0190336 A1 | 8/2006 | Pisaris-Henderson et al. |
| 2006/0197828 A1 | 9/2006 | Zeng et al. |
| 2006/0218601 A1 | 9/2006 | Michel |
| 2006/0218604 A1 | 9/2006 | Riedl et al. |
| 2006/0236353 A1 | 10/2006 | Cheng et al. |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0256376 A1 | 11/2006 | Hirooka |
| 2006/0271946 A1 | 11/2006 | Woundy et al. |
| 2006/0277569 A1 | 12/2006 | Smith |
| 2006/0288374 A1 | 12/2006 | Ferris et al. |
| 2006/0291506 A1 | 12/2006 | Cain |
| 2006/0294259 A1 | 12/2006 | Matefi et al. |
| 2007/0022459 A1 | 1/2007 | Gaebel, Jr. et al. |
| 2007/0028260 A1 | 2/2007 | Williams et al. |
| 2007/0029379 A1 | 2/2007 | Peyer |
| 2007/0033531 A1* | 2/2007 | Marsh ............... G06Q 30/02 715/738 |
| 2007/0047449 A1 | 3/2007 | Berger et al. |
| 2007/0053293 A1 | 3/2007 | McDonald et al. |
| 2007/0055985 A1 | 3/2007 | Schiller et al. |
| 2007/0061818 A1 | 3/2007 | Williams et al. |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0094692 A1 | 4/2007 | De |
| 2007/0101157 A1 | 5/2007 | Faria |
| 2007/0101370 A1 | 5/2007 | Calderwood |
| 2007/0113243 A1 | 5/2007 | Brey |
| 2007/0118852 A1 | 5/2007 | Calderwood |
| 2007/0121569 A1 | 5/2007 | Fukui et al. |
| 2007/0121678 A1 | 5/2007 | Brooks et al. |
| 2007/0124781 A1 | 5/2007 | Casey et al. |
| 2007/0130581 A1 | 6/2007 | Del et al. |
| 2007/0150919 A1 | 6/2007 | Morishita et al. |
| 2007/0153820 A1 | 7/2007 | Gould |
| 2007/0156539 A1 | 7/2007 | Yates |
| 2007/0157234 A1 | 7/2007 | Walker |
| 2007/0157242 A1 | 7/2007 | Cordray et al. |
| 2007/0162927 A1 | 7/2007 | Ramaswamy et al. |
| 2007/0192794 A1 | 8/2007 | Curtis et al. |
| 2007/0204300 A1 | 8/2007 | Markley et al. |

(56) References Cited

U.S. PATENT DOCUMENTS

| | | |
|---|---|---|
| 2007/0204310 A1 | 8/2007 | Hua et al. |
| 2007/0204311 A1 | 8/2007 | Hasek et al. |
| 2007/0204314 A1 | 8/2007 | Hasek et al. |
| 2007/0217436 A1 | 9/2007 | Markley et al. |
| 2007/0233857 A1 | 10/2007 | Cheng et al. |
| 2007/0241176 A1 | 10/2007 | Epstein et al. |
| 2007/0244760 A1 | 10/2007 | Bodnar et al. |
| 2007/0250872 A1 | 10/2007 | Dua |
| 2007/0250880 A1 | 10/2007 | Hainline |
| 2007/0263653 A1 | 11/2007 | Hassan et al. |
| 2007/0271386 A1 | 11/2007 | Kurihara et al. |
| 2007/0274400 A1 | 11/2007 | Murai et al. |
| 2007/0276925 A1 | 11/2007 | La et al. |
| 2007/0276926 A1 | 11/2007 | LaJoie et al. |
| 2008/0016526 A1 | 1/2008 | Asmussen |
| 2008/0022012 A1 | 1/2008 | Wang |
| 2008/0052157 A1 | 2/2008 | Kadambi et al. |
| 2008/0066112 A1 | 3/2008 | Bailey et al. |
| 2008/0092181 A1 | 4/2008 | Britt |
| 2008/0098212 A1 | 4/2008 | Helms et al. |
| 2008/0098446 A1 | 4/2008 | Seckin et al. |
| 2008/0101460 A1 | 5/2008 | Rodriguez |
| 2008/0103903 A1 | 5/2008 | Flake et al. |
| 2008/0109823 A1 | 5/2008 | Whitfield et al. |
| 2008/0109857 A1 | 5/2008 | Goodwill et al. |
| 2008/0115166 A1 | 5/2008 | Bhogal et al. |
| 2008/0134156 A1 | 6/2008 | Osminer et al. |
| 2008/0134165 A1 | 6/2008 | Anderson et al. |
| 2008/0141317 A1 | 6/2008 | Radloff et al. |
| 2008/0147497 A1 | 6/2008 | Tischer |
| 2008/0152116 A1 | 6/2008 | Sylvain |
| 2008/0152316 A1 | 6/2008 | Sylvain |
| 2008/0155059 A1 | 6/2008 | Hardin et al. |
| 2008/0177998 A1 | 7/2008 | Apsangi et al. |
| 2008/0192820 A1 | 8/2008 | Brooks et al. |
| 2008/0201748 A1 | 8/2008 | Hasek et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0313691 A1 | 12/2008 | Cholas et al. |
| 2009/0025027 A1 | 1/2009 | Craner |
| 2009/0028182 A1 | 1/2009 | Brooks et al. |
| 2009/0030802 A1 | 1/2009 | Plotnick et al. |
| 2009/0132346 A1 | 5/2009 | Duggal et al. |
| 2009/0187939 A1 | 7/2009 | LaJoie |
| 2009/0210899 A1 | 8/2009 | Lawrence-Apfelbaum et al. |
| 2009/0210912 A1 | 8/2009 | Cholas et al. |
| 2009/0254971 A1 | 10/2009 | Herz et al. |
| 2009/0320059 A1 | 12/2009 | Bolyukh |
| 2010/0057560 A1 | 3/2010 | Skudlark et al. |
| 2010/0058406 A1 | 3/2010 | Xu et al. |
| 2010/0115060 A1* | 5/2010 | Julia .................... G06Q 30/02 709/219 |
| 2010/0157928 A1 | 6/2010 | Spinar et al. |
| 2010/0161492 A1 | 6/2010 | Harvey et al. |
| 2010/0223491 A1 | 9/2010 | Ladd et al. |
| 2010/0251304 A1 | 9/2010 | Donoghue et al. |
| 2010/0251305 A1 | 9/2010 | Kimble et al. |
| 2010/0262488 A1 | 10/2010 | Harrison et al. |
| 2010/0269131 A1 | 10/2010 | Newberry et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0093900 A1 | 4/2011 | Patel et al. |
| 2011/0103374 A1 | 5/2011 | LaJoie et al. |
| 2011/0107364 A1 | 5/2011 | LaJoie et al. |
| 2011/0107379 A1 | 5/2011 | LaJoie et al. |
| 2011/0119703 A1 | 5/2011 | Schlack et al. |
| 2011/0178880 A1 | 7/2011 | Karaoguz et al. |
| 2011/0231265 A1 | 9/2011 | Brown et al. |
| 2011/0307339 A1 | 12/2011 | Russell et al. |
| 2011/0317977 A1 | 12/2011 | Harris |
| 2012/0011269 A1 | 1/2012 | Krikorian et al. |
| 2012/0023522 A1 | 1/2012 | Anderson et al. |
| 2012/0042331 A1 | 2/2012 | Wolf, Sr. |
| 2012/0084813 A1 | 4/2012 | Dmitriev et al. |
| 2012/0110620 A1 | 5/2012 | Kilar et al. |
| 2012/0159539 A1 | 6/2012 | Berberet et al. |
| 2012/0224834 A1 | 9/2012 | Chen et al. |
| 2012/0278841 A1 | 11/2012 | Hasek et al. |
| 2013/0133009 A1 | 5/2013 | Bhogal et al. |
| 2013/0227608 A1 | 8/2013 | Evans et al. |
| 2013/0290556 A1 | 10/2013 | Giladi |
| 2013/0325870 A1 | 12/2013 | Rouse et al. |
| 2013/0330063 A1 | 12/2013 | Bonovich et al. |
| 2014/0020017 A1 | 1/2014 | Stern et al. |
| 2014/0157313 A1 | 6/2014 | Shartzer et al. |
| 2014/0164760 A1 | 6/2014 | Hybertson et al. |
| 2014/0208349 A1 | 7/2014 | Nair et al. |
| 2014/0282777 A1 | 9/2014 | Gonder et al. |
| 2017/0164378 A1 | 6/2017 | Gunasekara et al. |
| 2017/0164416 A1 | 6/2017 | Yeddala et al. |
| 2018/0014041 A1 | 1/2018 | Chen et al. |

FOREIGN PATENT DOCUMENTS

| | | |
|---|---|---|
| WO | WO-0191474 A2 | 11/2001 |
| WO | WO-2004008693 A1 | 1/2004 |
| WO | WO-2007136399 A1 | 11/2007 |
| WO | WO-2008016786 A1 | 2/2008 |

OTHER PUBLICATIONS

"DOCSIS 3.0 OSSI Configuration Management Technical Report" CM-TR-OSSIv3.0-CM-VO1-080926.

Cisco Intelligent Network Architecture for Digital Video—SCTE Cable-Tec Expo 2004 information page, Orange County Convention Center, Jun. 2004, 24 pages.

Deering et al., Internet Protocol, Version 6 (IPv6) Specification, Dec. 1998, 39 pages.

Griffith, et al.,Resource Planning and Bandwidth Allocation in Hybrid Fiber-Coax Residential Networks, National Institute of Standards and Technology (NIST), 10 pages.

Internet Protocol DARPA Internet Program Protocol Specification, Sep. 1981, 51 pages.

Kanouff, Communications Technology: Next-Generation Bandwidth Management—The Evolution of the Anything-to-Anywhere Network, 8 pages, Apr. 1, 2004.

Motorola DOCSIS Cable Module DCM 2000 specifications, 4 pages, copyright 2001.

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, (http://www.imake.com/hopenvision).

\* cited by examiner

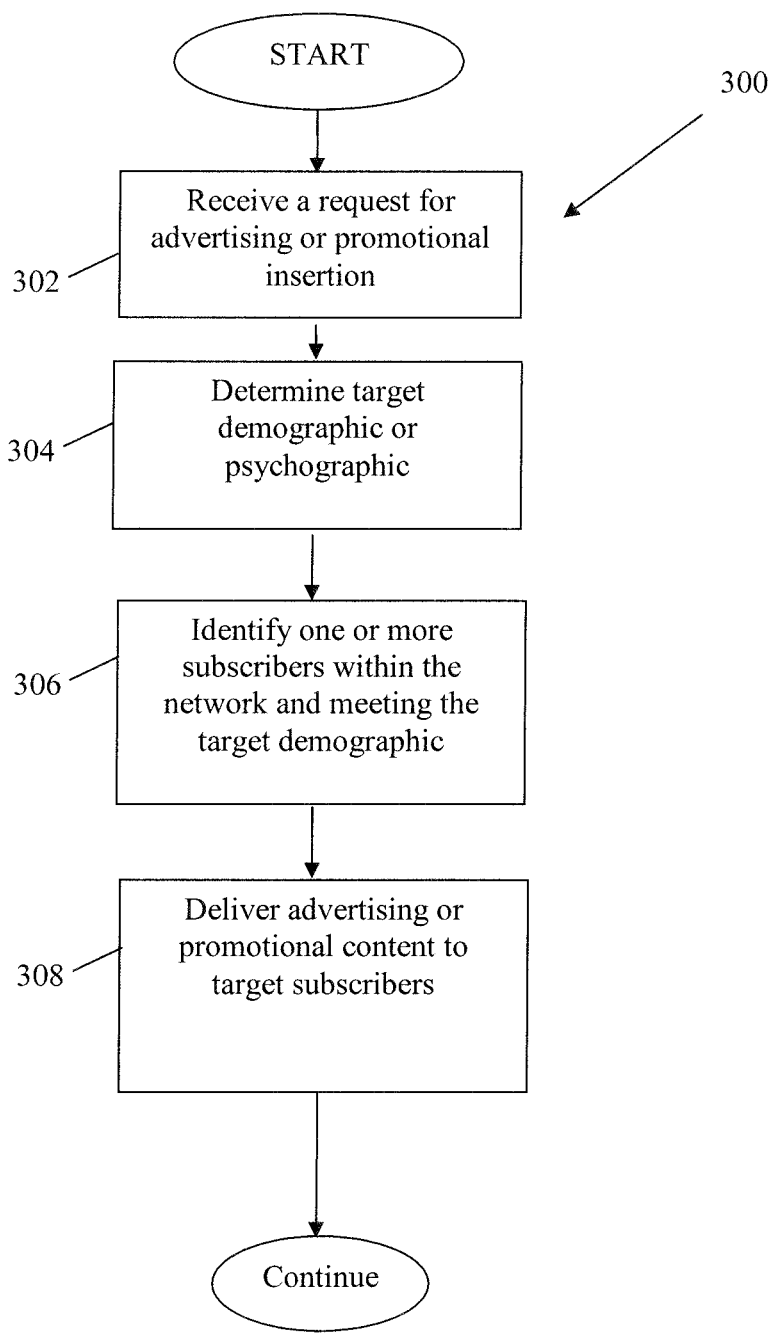

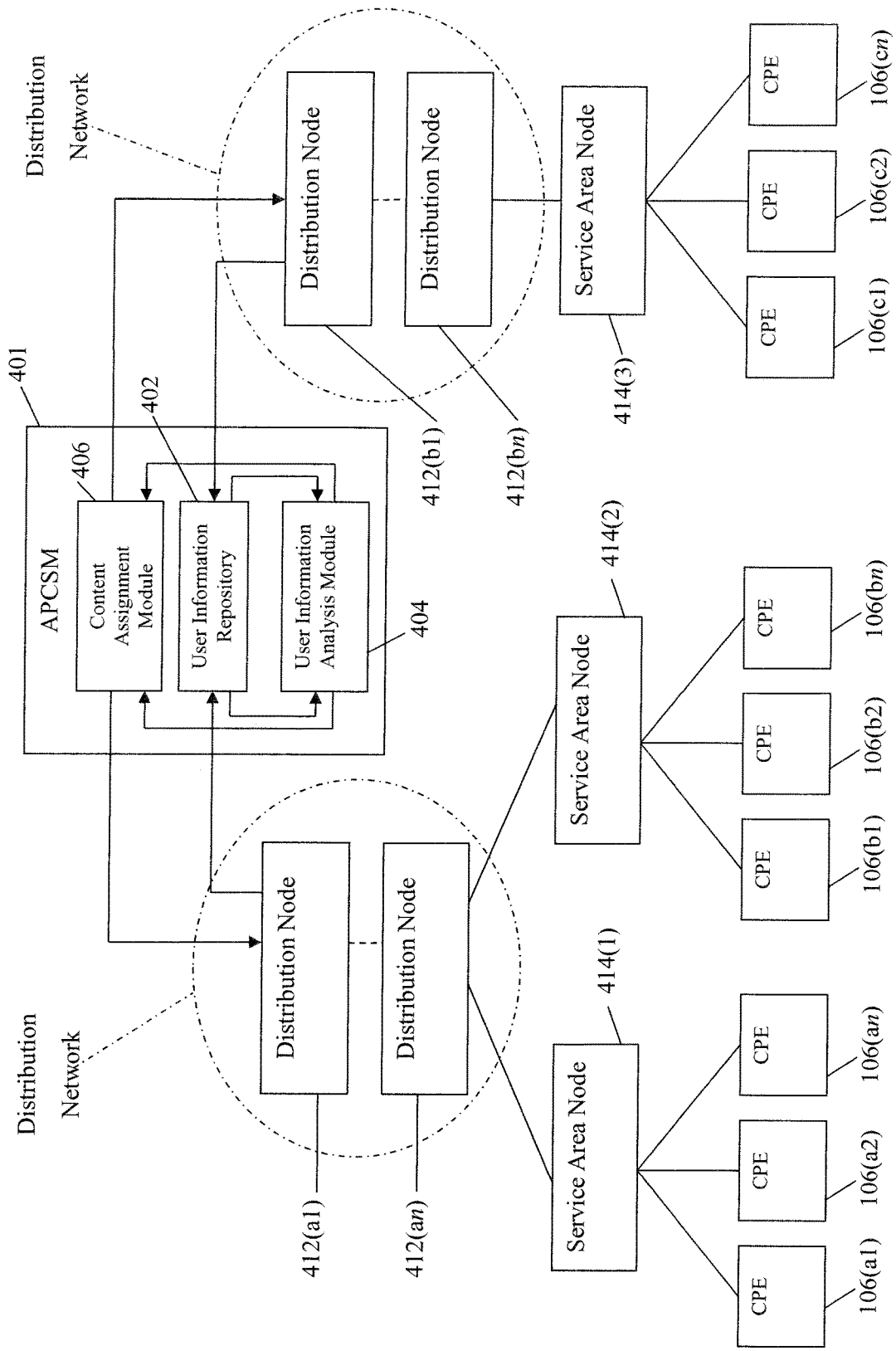

METHODS AND APPARATUS FOR USER-BASED TARGETED CONTENT DELIVERY

PRIORITY AND RELATED APPLICATIONS

This application is a divisional of and claims priority to co-owned U.S. patent application Ser. No. 14/754,226 filed on Jun. 29, 2015 entitled "METHODS AND APPARATUS FOR USER-BASED TARGETED CONTENT DELIVERY," and issuing as U.S. Pat. No. 10,223,713 on Mar. 5, 2019, which is a divisional of and claims priority to co-owned U.S. patent application Ser. No. 12/284,757 filed on Sep. 24, 2008 of the same title and issued as U.S. Pat. No. 9,071,859 on Jun. 30, 2015, which claims priority to co-owned U.S. Provisional Patent Application Ser. No. 60/995,655, filed Sep. 26, 2007, and entitled "METHODS AND APPARATUS FOR USER-BASED TARGETED CONTENT DELIVERY," each of which are incorporated herein by reference in its entirety. Additionally, this application is related to U.S. patent application Ser. No. 10/639,070 filed Aug. 12, 2003, entitled "TECHNIQUE FOR EFFECTIVELY DELIVERING TARGETED ADVERTISEMENTS THROUGH A COMMUNICATIONS NETWORK HAVING LIMITED BANDWIDTH," and issued as U.S. Pat. No. 9,247,288 on Jan. 26, 2016, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content delivery over a network. More specifically, the present invention is in one exemplary aspect directed to analyzing user-, device-, or premises-specific information in order to determine the appropriate advertising or promotional content to be delivered over the network.

2. Description of Related Technology

In cable television networks, advertisements are usually statically interspersed within a given broadcasted program. In this manner, every CPE in a local service area which is currently tuned to the same program channel will receive the same advertisements at approximately the same time and in the same order.

In content-based networks such as cable television networks, advertisements (including without limitation promotions, commercials, and short segments) that are viewed by subscribers can be controlled in several ways. Generally, two categories or subdivisions of these techniques exist: (i) national- or high-level insertion, and (ii) local- or low-level insertion.

Under national level insertion, national networks (such as NBC, ABC, etc.) are responsible for determining the advertisements or promotions that are resident in a given program stream. The pre-configured stream is delivered to the network operator (e.g., MSO), and the MSO merely then delivers the stream (content and advertisements) to the relevant subscribers over their network.

Under local-level insertion, the MSO (and even broadcast affiliates) can insert locally-generated advertisements or commercials and other such segments into remotely distributed regional programs before they are delivered to the network subscribers.

Advertisement time is typically priced based upon an associated program's popularity (and hence its time slot). Such prices are commonly based on Nielsen Television Ratings, which are ratings determined by measuring of the number of unique viewers or households tuned to a television program at any one particular time.

The Nielsen system has also recently been expanded from only program content to advertising (i.e., Nielsen ratings may be provided for advertisements themselves).

Nielsen Television Ratings are gathered in one of two ways. One method involves asking viewers of various demographics to keep a written record of the television shows they watch throughout the day and evening. Another method involves using "Set Meters," which are small devices connected to televisions in selected homes. These devices electronically gather the viewing habits of the home and transmit the information nightly to Nielsen over a connected phone line.

There are several disadvantages with employing a Nielsen-like approach to pricing statically interspersed cable advertisements. The first is that the sample of viewers selected may not be fairly representative of the population of cable viewers as a whole. For example, in a cable network comprising four million cable viewers, a sample of any 100,000 viewers may exhibit different average viewing habits than the averages associated with the other 3,900,000 cable viewers who are not in the sample.

A second disadvantage is that static delivery makes it difficult to perfectly target an audience known to be in the market. For example, suppose that the ideal target for a sports car advertisement is the set of all consumers who like and would be interested in buying sports cars. If all that is known from Nielsen data is that 10% of the sample group has watched the auto-racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

The aforementioned prior art "Nielsen" approach is also program-specific, and this is a problem from several aspects. First, the efficacy of the advertising is tied to the accuracy of the demographic model for that particular program; i.e., that most 18-30 year old females in fact do actually watch American Idol. As a limiting case, if the demographic model used had 0% correlation with actual behavior, then advertising used based on that demographic model would have a correspondingly low (or no) effect on the target demographic (e.g., 18-30 year old females), since none of them would be watching American Idol when the advertising was broadcast. Stated simply, the prior art program-coupled approach is only as good as the underlying demographic correlation model.

Also, the aforementioned demographic model is often limited to one particular program. Hence, the 18-30 year old females discussed above may tune in dutifully to American Idol each broadcast (e.g., Monday at 8:00 pm), but may not have any interest in watching the program immediately preceding or following American Idol, and hence may tune away (or delay tuning to that channel until the start of American Idol). The demographic model for that particular program accordingly may have little or no correlation to periods (programs) before or after it, and thus a new demographic model (which may cater to a heterogeneous demographic from the first, e.g., 40-65 year-old males) would be needed. This has the effect of, inter alia, artificially segmenting or imposing boundaries on the continuity of advertising or promotions; i.e., a given "theme" or demographic cannot be reliably targeted significantly beyond the program boundaries unless the same demographic or theme continues in the programming itself. The network operator, network, or other entity must effectively tailor advertisements/promotions on a per-program basis in some cases if their advertising/promotion is to have maximum efficacy.

A number of other different approaches have been described in the prior art which attempt to facilitate effective targeted advertising or promotional content delivery. For example, U.S. Patent Application Publication No. 20070113243 to Brey published May 17, 2007 entitled "Targeted advertising system and method" discloses a targeted advertising system comprising an interface unit configured to receive broadcast transmissions, a primary broadcast stream for broadcast programming, a secondary broadcast stream for targeted advertising content, and a storage device for storing the targeted advertising content. The method comprises presenting a targeted advertising content to a user including receiving a primary broadcast stream, receiving a secondary broadcast stream, storing a portion of the secondary broadcast stream in a storage device, and presenting a targeted advertising stream to the user, which may be selected based on a user parameter.

U.S. Patent Application Publication No. 20070089127 to Flickinger et al. published Apr. 19, 2007 entitled "Advertisement Filtering and Storage for Targeted Advertisement Systems" discloses an advertisement storage and filtering system for selectively identifying targeted advertisements to be stored in the memory of the STB. This storing of the selected advertisements can be accomplished in a number of ways. In one embodiment, the advertisements, in real-time and as they are received at the STB, are processed by the STB and only those advertisements with the appropriate characteristics are stored on the hard drive. This may require some buffering of the advertisements in the STB memory as the STB processes and determines whether or not to store the advertisement. The information required to determine whether or not to store the advertisement could also be sent in advance, e.g., as a data service in an advertisement channel. Alternatively, the STB may store incoming advertisements in a memory temporarily and subsequently determine whether or not to retain the stored advertisements.

U.S. Patent Application Publication No. 20060277569 to Smith published Dec. 7, 2006 entitled "DVR-based targeted advertising" discloses a system for DVR-based targeted advertising. In an embodiment, a targeted advertisement system includes a DVR, an advertisement data store, and an advertisement manager. The DVR records media content, maintains the recorded media content for on-demand viewing, and provides the recorded media content for viewing when requested. The advertisement manager designates advertisement region(s) in the recorded media content as the media content is being recorded, where an advertisement region includes a first boundary and a second boundary to designate the advertisement region in the media content. The advertisement manager monitors a first data stream of the recorded media content when it is rendered for viewing to detect that a playback position of the first data stream has crossed an advertisement region boundary, and to initiate that an advertisement obtained from the advertisement data store be provided as a second data stream to render the advertisement for viewing.

U.S. Patent Application Publication No. 20060253864 to Easty published Nov. 9, 2006 entitled "System and method for household targeted advertising" discloses a targeted television advertisement system comprising a customer premises equipment at a household and coupled to a television set, the customer premise equipment, which comprises a server operable to access a media storage device and demand-pull advertising elementary streams customized for a viewer of the household, and a splicer operable to receive a program elementary streams and splice the demand-pulled advertising elementary streams into the program elementary streams.

U.S. Patent Application Publication No. 20060253328 to Kohli et al. published Nov. 9, 2006 entitled "Targeted advertising using verifiable information" discloses a system and a method to match advertisement requests with campaigns using targeting attributes, and campaigns are selected for fulfillment of the advertisement request according to a priority algorithm. The targeting uses end user information that is verifiable, and which the user has granted permission to use, improving the granularity and accuracy of the targeting data. The algorithm includes load balancing and campaign state evaluation on a per campaign, per user basis. The algorithm enables control over the frequency and number of exposures for a campaign, optimizing the advertising both from the perspective of the user and the advertiser.

U.S. Patent Application Publication No. 200602483555 to Eldering published Nov. 2, 2006 entitled "Targeted advertising through electronic program guide" discloses a mechanism for matching Electronic Program Guide (EPG) advertisements to subscribers or groups of subscribers and delivering those advertisements within the EPG. The subscribers are initially characterized in different groups by using commercially available data, such as demographic data. Furthermore, the groups of subscribers may be formed according to their characteristics. These characteristics may be derived from, but are not limited to, demographic data, geographic information or individual subscriber selection data. Subsequent to the formation of the groups, suitable advertisements to be placed in the EPG avails are selected, based on the matching of the advertisement characteristics to the characteristics of the groups, wherein the EPG avails are the advertising opportunities available within the EPG. Different versions of the EPG having targeted advertisements may be created, and the different versions may be placed on a download server for transmission over an access system to the subscriber. At the subscriber end, the different versions of the EPG may be received and the subscriber end, being assigned to a particular group, may receive the EPG which corresponds to that group. The subscriber end generally comprises a suitable subscriber interface, such as, a set-top box (STB) or a cable-ready television having a unique identification.

U.S. Pat. No. 7,228,555 to Schlack issued Jun. 5, 2007 entitled "System and method for delivering targeted advertisements using multiple presentation streams" discloses a system and method for delivering channels of presentation streams carrying targeted advertisements in a television service network environment. The system includes a generator for generating a set of presentation streams for each of programming channels, each of the presentation streams in each set having same programming data but different ads directed to advertiser-specific market segments of different advertisers. A plurality of local routing stations receives the generated sets of presentation streams. At least one local routing station processes the sets of presentation streams and selectively switches between the presentation streams in each set to output one presentation stream for a programming channel. As a result, a presentation stream carrying the most appropriate advertisement is provided to a viewer at any given time for at least one programming channel.

U.S. Pat. No. 6,738,978 to Hendricks, et al. issued May 18, 2004, entitled "Method and apparatus for targeted advertisement" discloses a network controller for use with a digital cable headend capable of monitoring and controlling set top terminals in a television program delivery system. The invention relates to methods and apparatus for a network controller that manages a configuration of set top terminals in a program delivery system. The invention is particularly useful in program delivery systems with hundreds of channels of programming, a menu driven program selection system, and a program control information signal that carries data and identifies available program choices. Specifically, the invention modifies a program control information signal at the cable headend before the modified signal is transmitted to each set top terminal. This signal is used with polling methods to receive upstream data from the set top terminals. The invention initiates such upstream data retrieval, gathers all data received and compiles viewer demographics information and programs watched information. The invention processes this data and information to generate packages of advertisements, as well as account and billing reports, targeted towards each set top terminal. The invention uses upstream data reception hardware, databases and processing hardware and software to accomplish these functions.

U.S. Pat. No. 6,718,551 to Swix, et al. issued Apr. 6, 2004 entitled "Method and system for providing targeted advertisements" discloses a method and system for providing targeted advertisements over a networked media delivery system, especially interactive television networks, the system comprising tracking and storing viewer selections, analyzing the selections, and delivering targeted advertisements that appeal to the particular subscriber making the selections. The system includes a merge processor, a file server, a profile processor, and a broadcast server contained in a head end in communication with a plurality of set-top boxes through a distribution network. Based on a subscriber's viewing habits and account information, the invention delivers different, customized advertisements to different viewers watching the same program or channel. The advertisements are delivered as either still frame bit maps or as video streams advertisement insertion in a playlist or a broadcast media program.

U.S. Pat. No. 6,463,585 to Hendricks, et al. issued Oct. 8, 2002 entitled "Targeted advertisement using television delivery systems" discloses a multiple channel architecture designed to allow targeted advertising directed to television terminals connected to an operations center or a cable headend. Program channels carry television programs. During commercial breaks in the television programs, advertisements, which are also broadcast on the program channel, are displayed. However, additional feeder channels carry alternate advertising that may be better suited for certain viewing audiences. The operations center or the cable headend generate a group assignment plan that assigns the television terminals to groups, based on factors such as area of dominant influence and household income. A switching plan is then generated that instructs the television terminals to remain with the program channel or to switch to one of the alternate feeder channels during the program breaks. The television terminals record which channels were viewed during the program breaks, and report this information to the cable headends and the operations center. The reported information is used to generate billing for commercial advertisers, and to analyze viewer watching habits. The invention uses upstream data reception hardware, databases and processing hardware and software to accomplish these functions.

U.S. Pat. No. 6,002,393 also issued to Hite, et al. Dec. 14, 1999, entitled "System and method for delivering targeted advertisements to consumers using direct commands" discloses a system and method for targeting TV advertisements to individual consumers by delivering a plurality of advertisements to a display site. A command signal is sent to the display site commanding the display of a selected advertisement suited for the individual consumer. In another embodiment, a predetermined advertisement is delivered upon command from a control center to a viewing site intended for the particular consumer.

U.S. Pat. No. 5,774,170 to Hite, et al. issued Jun. 30, 1998 entitled "System and method for delivering targeted advertisements to consumers" discloses advertising by targeting, delivering and displaying electronic advertising messages (commercials) within specified programming in one or more pre-determined households (or on specific display devices) while simultaneously preventing a commercial from being displayed in other households or on other displays for which it is not intended. Commercials are delivered to specified homes or displays via either over-the-air or wired delivery systems.

Despite the foregoing plethora of approaches to "targeted" advertising and promotions, there is a need for improved methods and apparatus which more effectively identify and access groups for content delivery over an information network. Such improved methods and apparatus would ideally identify one or more users of the delivery network based on information that will better correlate with an advertiser's target audience and demographic. Ideally, these methods and apparatus would be able to selectively utilize multiple sources of information relating to users and their behavior (thus providing even more precision when attempting to identify a designated audience) and would leverage flexible network delivery paradigms such as broadcast switched architectures.

Such methods and apparatus would also allow for decoupling of advertising or promotions from a particular program or time slot, thereby providing the network operator flexibility to insert the advertising or promotional content in a dynamic fashion based on inter alia changing network conditions, and/or cost/benefit decisions. This approach would also permit use of a new more flexible business method (pricing model) for network operators and content sources.

Subscriber anonymity or privacy (i.e., no use of personally identifiable information) would also ideally be maintained where desired.

The improved apparatus and methods should also be capable of providing complete privacy and anonymity for individual subscribers from which the "targeting" information is obtained.

SUMMARY OF THE INVENTION

The present invention addresses the foregoing needs by providing methods and apparatus adapted to increase the effectiveness of advertising or promotional content to be delivered over a network to one or more network devices and associated users.

In a first aspect of the invention, a method of delivering targeted advertising or promotional content to a selected one or more users of a content-based network is disclosed. In one embodiment, the method comprises: identifying the one or more users from the plurality using descriptive information relating to the one or more users, the descriptive information being selected so as to correlate to a demographic or psychographic; identifying one or more advertising or promotional content elements based at least in part on the descriptive information; and selectively delivering the one or more advertising or promotional content elements to the one or more users via the network.

In one variant, the identifying one or more advertising or promotional content elements comprises: accessing metadata associated with at least one of the advertising or promotional content elements; and evaluating the correlation of the metadata with the descriptive information.

In another variant, the network comprises a broadcast switched architecture (BSA) network, and the delivering comprises instantiating a new broadcast switched program stream comprising the one or more advertising or promotional content elements.

In a further variant, the one or more users comprises a single user, and the delivering comprises instantiating a new video on-demand (VoD) session and streaming content via the session, the content comprising the one or more advertising or promotional content elements.

In still another variant, the one or more users comprises a single user, and the delivering comprises delivering content comprising the one or more advertising or promotional content elements according to a network digital video recorder (nDVR) or network personal video recorder (nPVR) delivery channel.

Alternatively, the delivering comprises delivering the one or more advertising or promotional content elements within a program stream having non-advertising or promotional content therein also, and the method further comprises selecting one or more of the identified advertising or promotional content elements based on a relationship between a theme or context of the selected one or more advertising or promotional content elements and a theme or context of the non-advertising or promotional content.

As yet another alternative, the delivering comprises delivering the one or more advertising or promotional content elements within a program stream having non-advertising or promotional content therein also, and the one or more advertising or promotional content elements and the non-advertising or promotional content are contextually related to one another in at least one aspect.

In another variant, the method further comprises: receiving feedback information relating to the one or more subscriber's viewing of the one or more advertising or promotional content elements; and adjusting the at least one of (i) the identifying one or more advertising or promotional content elements, or (ii) delivery of the elements, based at least in part on the feedback information. The feedback information may be selected from the group consisting of, e.g.: (i) information indicating that one or more of the one or more users has tuned away from the advertising or promotional content elements during their delivery; (ii) information indicating that one or more of the one or more users has turned off consumer premises equipment during delivery of the advertising or promotional content elements; and (iii) information indicating that one or more of the one or more users has interacted with their consumer premises equipment in a manner related to the advertising or promotional content elements.

In a further variant, the descriptive information is obtained passively from the one or more users during network operation; e.g., data relating to the one or more user's tuning habits.

Alternatively, the descriptive information is obtained from the one or more users during network operation via an interactive interface with the users, the interface being adapted to solicit demographic or psychographic information from the users.

In a second aspect of the invention, an apparatus for use in a content based network is disclosed. In one embodiment, the apparatus comprises: a first module adapted to receive information about one or more users of the network; a second module adapted to select one or more advertising or promotional content streams based at least in part on the information; and a third module adapted to cause transmission of the one or more content streams to at least one user of the one or more users.

In one variant, the first module is adapted to receive information about the one or more users by querying a database. For example, the first module may be adapted to receive information about the one or more users by querying a database such that the database elements queried cannot be used to personally identify any user in the one or more users.

Alternatively, the first module is adapted to receive information about the one or more users by receiving at least one data file from a network subscriber database. At least a portion of the contents of the at least one data file are optionally protected; e.g., hashed using a one-way hash function, the portion of the contents to be hashed comprising information which can be used to personally identify a specific user of the one or more users.

In another variant, the information about the one or more users comprises data related to at least one program content selection from at least one of the users, such as: (i) a history of program requests, (ii) times at which requested programs were broadcast, (iii) frequency of channel changes, (iv), recorded periods of non-activity, and (v) history on-demand requests.

In still another variant, the information about the one or more users comprises demographic information, at least portions of the demographic information being unique to respective ones of the one or more users.

In a further variant, the apparatus further comprises a fourth module, the fourth module being adapted to create one or more subsets or groups of users from the one or more users. The one or more subsets are created, e.g., based at least in part on demographic information about the one or more users.

In another variant, the apparatus comprises a computerized device, and at least portions of the first, second and third modules comprise a computer program adapted to run on the computerized device. The computerized device may comprise for example a broadcast switched architecture (BSA) controller, or a VoD server.

In a third aspect of the invention, a method of doing business within a content-based network is disclosed. In one embodiment, the method comprises: receiving a request from a third party for delivery of advertising or promotional content over the network, the advertising or promotional content having at least one target demographic or psychographic associated therewith; obtaining information about a first set of users of the network; identifying at least a portion of the first set of users correlating to the at least one demographic or psychographic based at least in part on the information; and delivering the advertising or promotional content to the at least portion of the first set of users based at least in part on the at least one demographic or psychographic.

In one variant, the method further comprises providing the third party an assurance or guarantee that the advertising or promotional content will be delivered to (or alternatively perceived by) at least a certain number of the users within the target demographic.

In a fourth aspect of the invention, a method for non-program restricted advertising or promotion delivery within a content-based network is disclosed. In one embodiment, the method comprises: receiving a request from a third party for delivery of advertising or promotional content over the network, the advertising or promotional content having at least one target demographic or psychographic associated therewith; obtaining information about a first set of users of the network; identifying at least a portion of the first set of users correlating to the at least one demographic or psychographic based at least in part on the information; and delivering the advertising or promotional content to the at least portion of the first set of users based at least in part on the at least one demographic or psychographic, the delivering being substantially agnostic to program content being delivered to the at least portion of users substantially contemporaneously with the advertising or promotional content.

In a fifth aspect of the invention, a method of delivering targeted advertising or promotional content to one or more users of a content-based network is disclosed. In one embodiment, the method comprises: determining one or more descriptive features associated with the advertising or promotional content; identifying one or more target users of the network based at least in part on the descriptive features; identifying one or more non-advertising or non-promotional content elements to be delivered over the network; and delivering the advertising or promotional content to the identified one or more target users along with the non-advertising or promotional content elements. The advertising or promotional content and the non-advertising or non-promotional content elements can optionally be contextually related to one another.

For instance, in one variant, the contextual relationship comprises a common theme.

In another variant, the contextual relationship comprises a common persona.

In yet another variant, the contextual relationship comprises a common inanimate object.

In a further variant, at least one of the one or more descriptive features comprises a basis for the contextual relationship.

In a sixth aspect of the invention, a method of delivering a plurality of related advertising or promotional content elements to one or more users of a content-based network, is disclosed. In one embodiment, the method comprises: determining one or more descriptive features associated with the plurality of advertising or promotional content elements; identifying one or more target users of the network based at least in part on the descriptive features; identifying one or more program content elements to be delivered over the network; and delivering the plurality of advertising or promotional content elements to the identified one or more target users along with the program content elements, the delivering comprising delivering the plurality of content elements according to a prescribed schedule or sequence.

In one variant, the advertising or promotional content elements are contextually related to the program content elements.

In another variant, the advertising or promotional content elements are each contextually related to one another, yet differ from each other in at least one aspect (e.g., each of the elements utilizing a different persona, but utilizing the same product or service).

In yet another variant, the prescribed schedule or sequence comprises delivering the advertising or promotional content elements at different points within the same one of the one or more program content elements.

In still a further variant, the prescribed schedule or sequence comprises delivering the advertising or promotional content elements substantially one after another with no intervening content.

In another variant, the prescribed schedule or sequence comprises delivering the advertising or promotional content elements within the same one of the one or more program content elements, yet each on a different program channel.

In a seventh aspect of the invention, a method of advertising or promoting goods or services over a content-based network having a plurality of users is disclosed. In one embodiment, the method comprises delivering one or more advertising or promotional content elements of an advertiser or promoter to a target demographic within the plurality of users, the delivering being substantially independent of the program content with which the advertising or promotional content is delivered; and providing information to the advertiser or promoter relating to the delivering of the elements.

In one variant, the providing information comprises providing data relating to actual or estimated impressions of the elements by the target demographic.

In another variant, the method further comprises providing a warranty or guarantee to the advertiser that the elements have been delivered to a prescribed number or percentage of target demographic.

In another variant, the network comprises a broadcast-switched architecture (BSA) cable television network, and the delivering comprises switching the BSA network so as to selectively provide the elements to the target demographic. The switching so as to selectively provide comprises in one embodiment instantiating a new program stream comprising the elements for a user within the target demographic when the user requests a channel change.

Alternatively, the switching so as to selectively provide comprises rebinding an existing program stream to a new source, the new source being adapted to provide the elements.

In an eighth aspect of the invention, a system adapted to deliver targeted advertising within a content-based network is disclosed.

In a ninth aspect of the invention, consumer premises equipment (CPE) adapted to facilitate delivery of targeted advertising to one or more subscribers is disclosed.

In a tenth aspect, a computer readable storage apparatus is disclosed. In one embodiment, the apparatus comprises a storage medium adapted to store one or more computer programs, the one or more programs being adapted to select and deliver targeted advertising or promotional content.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 3 is a flow diagram illustrating a method of operating a content-based network so as to provide dynamically adaptive advertising or promotion content delivery in accordance with one embodiment of the present invention.

FIG. 4 illustrates one exemplary network configuration comprising a modified headend in accordance with one embodiment of the present invention.

FIG. 5 is a functional block diagram illustrating one embodiment of an information analysis module as illustrated in FIGS. 4-4a.

FIG. 6 is a functional block diagram illustrating one embodiment of a content assignment module as illustrated in FIGS. 4-4a.

DETAILED DESCRIPTION OF THE INVENTION

Figure 1:
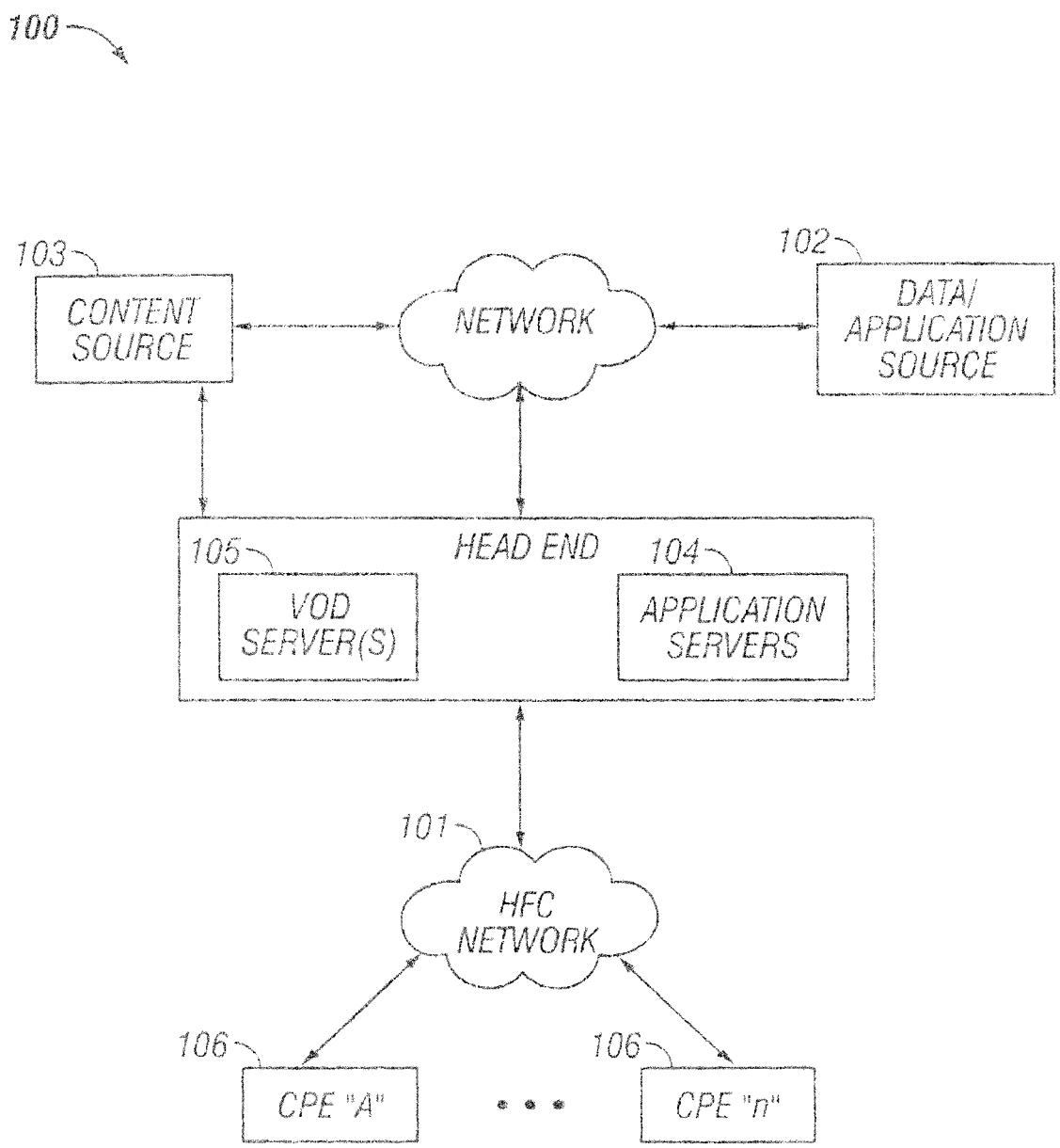
FIG. 1 is a functional block diagram illustrating an exemplary HFC cable network configuration useful with the present invention.

Reference is now made to the drawings, wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another form comprises a subscription or installment plan. Yet a further form comprises providing a limited time option Myriad other forms of consideration will be appreciated by those of ordinary skill given the present disclosure.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "display element" refers to any user interface (UI) or other structure adapted to be displayed on a display device including without limitation windows, icons, objects, "tickers" or menus.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to said schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "server" refers to any computerized component, system or entity regardless of form which is adapted to provide data, files, applications, content, or other services to one or more other devices or entities on a computer network.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi (such as IEEE-Std. 802.11 or related standards including 802.11 a/b/g/n), Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for enhancing advertising or promotional penetration into a particular demographic of a network subscriber pool.

The present invention overcomes the disabilities previously discussed (including inter alia those associated with program-centric advertising or promotional models) through use of a direct correlation between the subscribers in the network and the target demographic (or psychographic).

Instead of relying solely on an externally-based analysis or model such as Nielsen that assumes that a particular demographic or psychographic of the subscriber pool will be accessed when advertising in association with a particular program (as in the prior art), the methods and apparatus of the present invention advantageously place advertising and/or promotions within the delivered program lineup based on data and information gleaned from the target audience itself (e.g., subscribers in a cable or satellite network). This approach affords, inter alia, the ability to target certain demographics at various levels of granularity, ranging from a per-subscriber basis to the network subscriber pool as a whole.

At any level of granularity chosen, the result is a more accurate targeting of the desired demographic(s), since the data relating to subscriber attributes, CPE configuration, and behaviors used to determine demographics is derived from and unique to the network on which the advertisements or promotions will be carried.

Due to this increased accuracy, the MSO or other network operator can advantageously provide the advertiser with data relating to the number and type of viewer "impressions" for their advertising or promotional content. This type of information may be useful to the advertiser (or even the MSO) in assessing the efficacy of their advertisement or promotion.

Moreover, the methods and apparatus of the present invention afford the opportunity for the MSO or other network operator to alleviate the advertiser from having to pick programs or slots, and provide them a "guarantee" of sorts for a certain exposure or number of impressions by the target demographic(s).

In one embodiment, the methods and apparatus described herein are used in conjunction with a broadcast switched architecture (BSA) network, the latter which allows for the near-instantaneous switching of programs being delivered to certain portions of the network. This BSA switching capability is leveraged in the present invention by providing the ability to rapidly switch in and out different targeted program streams to different subscribers (or groups of subscribers). Hence, targeted "microcasts" can be rapidly set up and torn down, the microcasts specifically targeting certain demographics within the network.

In other embodiments of the invention, the decision to instantiate a new stream (with targeted advertising content) or utilize an existing stream can be made dynamically and based on a variety of factors including e.g., available bandwidth, cost/benefit determinations, and/or data relating to the subscriber requesting program delivery.

Similarly, NDVD, VoD or other session-based delivery paradigms can be tailored or targeted to the requesting subscriber if desired.

Moreover, the insertion of targeted advertising or promotional content can be orchestrated across multiple heterogeneous delivery paradigms in order to achieve the desired degree of penetration or "impressions".

Subscriber privacy and anonymity is also optionally maintained via e.g., hashing or encrypting data relating to the CPE and/or subscriber, thus ensuring that stored data is not traceable to a specific user account. In alternative embodiments, only information designated by a consumer is eligible for content collection and/or analysis. In this manner, subscriber privacy is effectively safeguarded.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where targeted advertising or promotion is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is also noted that while portions of the following discussion are cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Also, while certain aspects are described primarily in the context of the well-known IP or Internet Protocol (described in, inter alia, RFC 791 and 2460), it will be appreciated that the present invention may utilize other types of protocols (and in fact bearer networks to include other internets and intranets) to implement the described functionality.

It will further be appreciated that while the exemplary embodiments presented herein are described in the context of services that may include multicast and unicast data, the present invention is applicable to other types of services that include multicast transmission of data delivered over a network having multiple physical channels or even virtual or logical channels.

Bearer Network Architecture—

FIG. 1 illustrates a typical content-based network configuration with which the targeted advertising and promotion apparatus and methods of the present invention may be used. The various components of the network 100 include (i) one or more data and application origination points 102; (ii) one or more content sources 103, (iii) one or more application distribution servers 104; (iv) one or more VoD servers 105, and (v) customer premises equipment (CPE) 106. The distribution server(s) 104, VoD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VoD server 105 comprises a computer system where on-demand (OD) content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
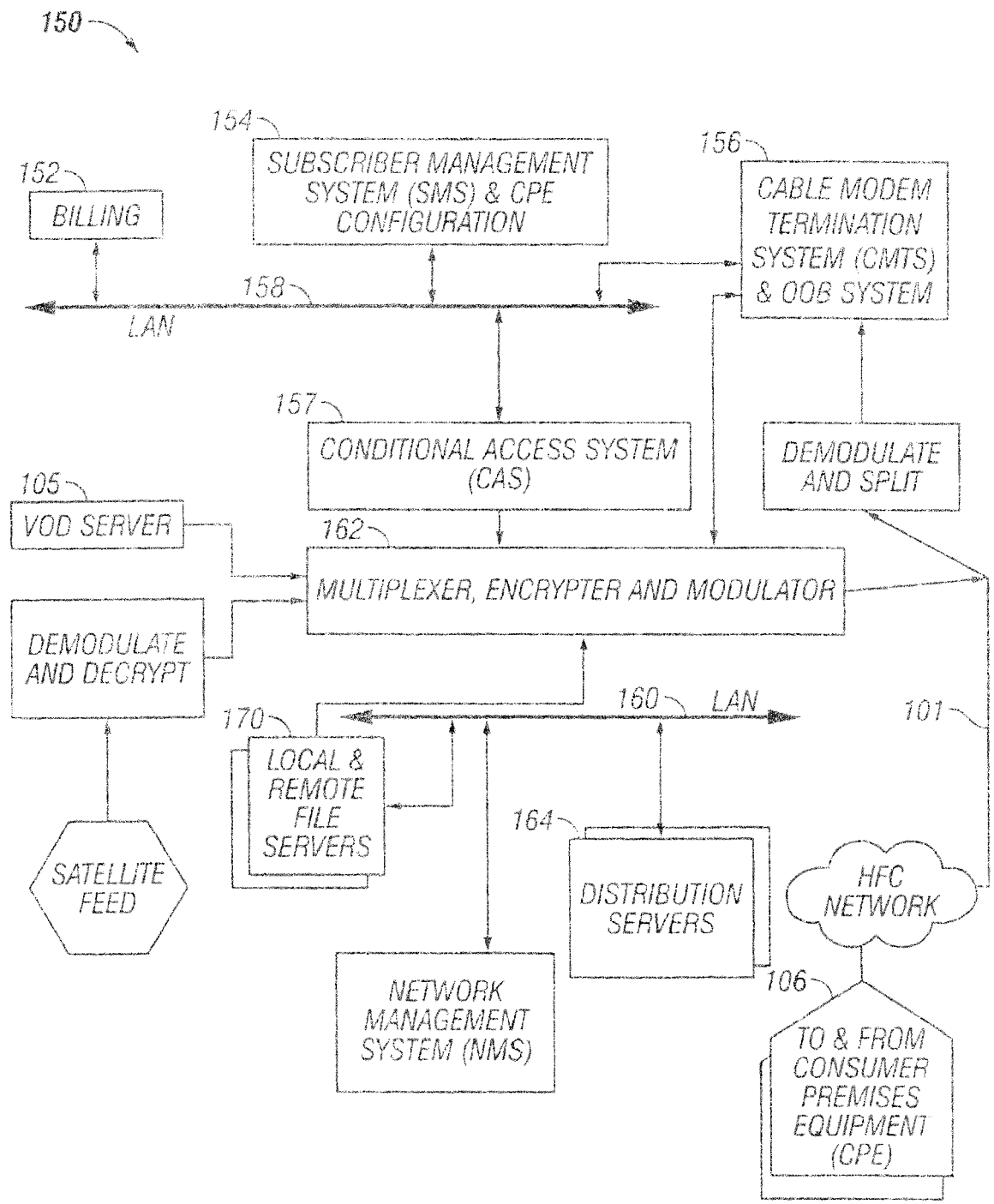
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
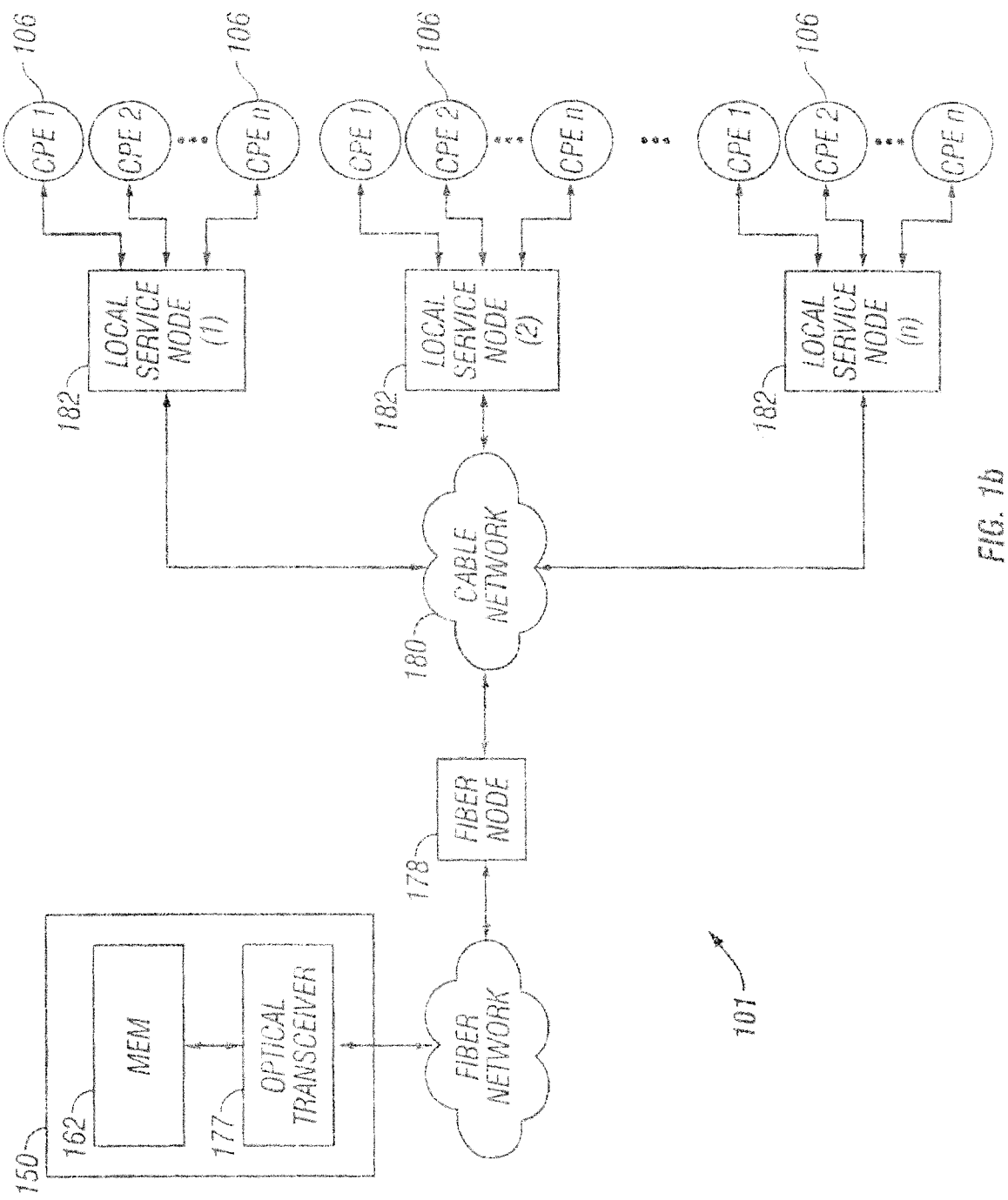
FIG. 1b is a functional block diagram illustrating one exemplary local service node configuration useful with the present invention.

The exemplary architecture 150 of FIG. 1*a* further includes a multiplexer/encrypter/modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1*b*) via a variety of interposed network components.

Figure 1C:
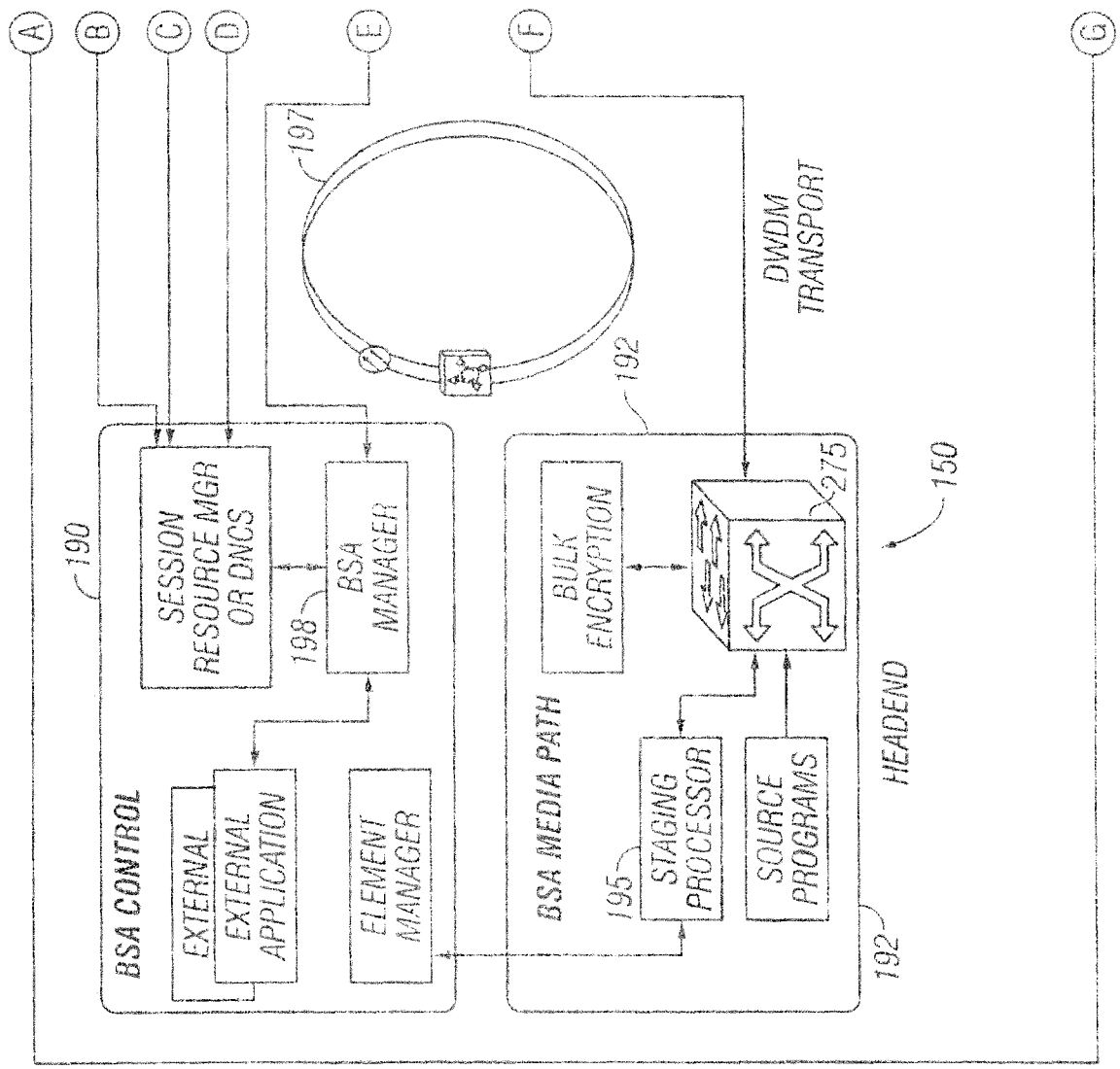
FIG. 1c is a functional block diagram illustrating one exemplary broadcast switched architecture (BSA) network useful with the present invention.
Figure 1C:
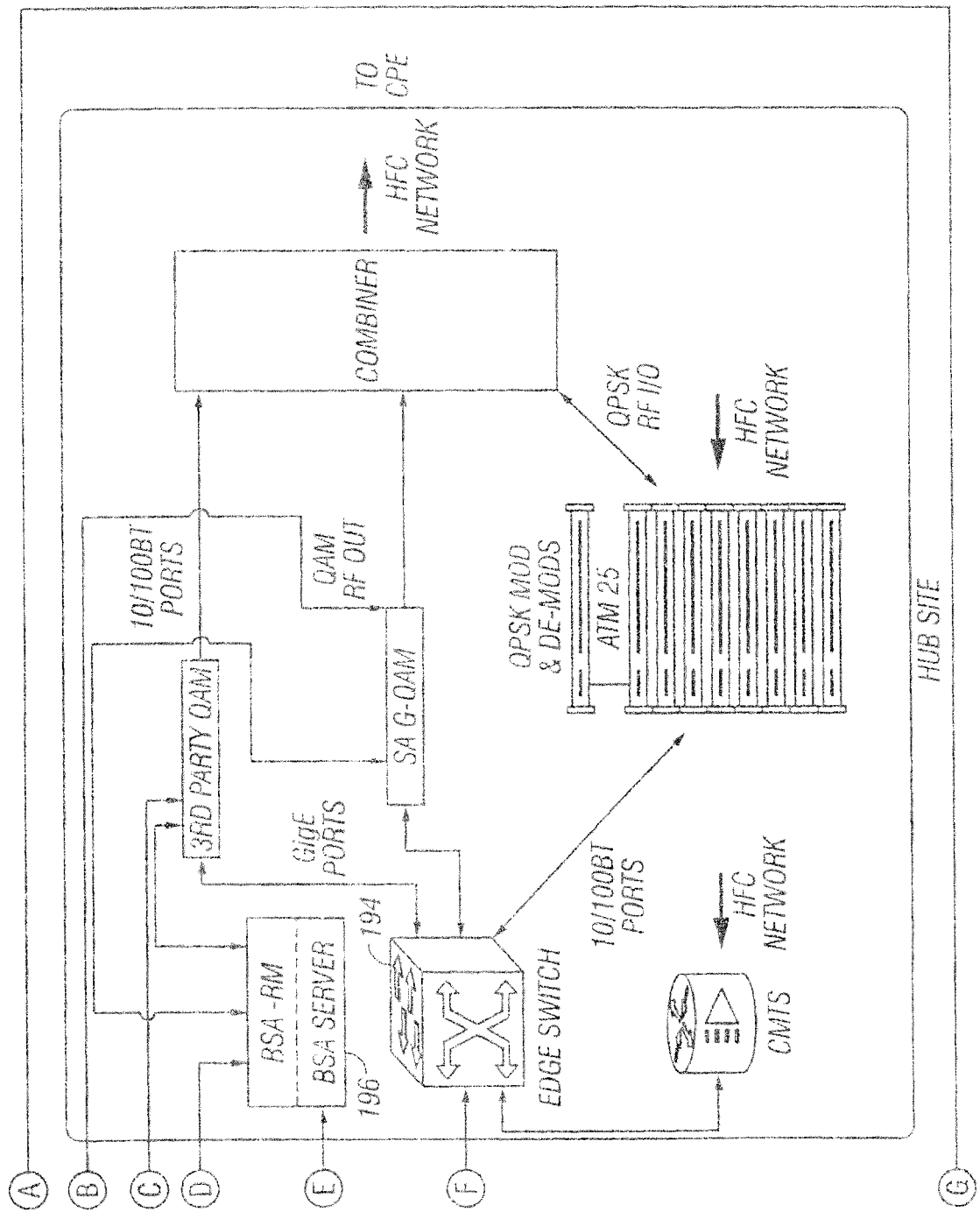

It will also be recognized, however, that the multiplexing operation(s) need not necessarily occur at the head-end 150 (e.g., in the aforementioned MEM 162). For example, in one variant, at least a portion of the multiplexing is conducted at a BSA switching node or hub (see discussion of FIG. 1*c* provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK," and issued as U.S. Pat. No. 7,602,820 on Oct. 13, 2009, incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1*c* illustrates an exemplary "switched" network architecture also useful with the targeted advertising and promotion features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Mar. 20, 2003, incorporated herein by reference in its entirety, describes one exemplary broadcast switched digital architecture useful with the present invention, although it will be recognized by those of ordinary skill that other approaches and architectures may be substituted.

In order for the BSA function to be transparent to the subscriber, channel change latencies are kept to a minimum (e.g., 250 ms or less as compared to average linear digital broadcast services). Like video-on-demand (VoD) systems, BSA programs are streamed to a service group (contrast: switch) only when being viewed. Unlike VoD, many viewers can view the same stream. Typically, only real-time linear programs are included in BSA broadcasts. Since there is no storage involved, the "VCR" controls (e.g., trick mode functions) common to VoD are not available. In this regard, BSA is much simpler that VoD. Commercials or other programming segments cannot be skipped, and program bitrates can be treated as in more conventional systems.

In the context of the aforementioned BSA network, there are several metrics or indices which are useful in evaluating the performance of the network. Specifically, the expression "peak streams" represents the maximum number of different program streams that are instantaneously (based on specified data intervals) needed. Using software, peak stream requirements can be analyzed for each group size. It has been noted by the Assignee hereof that generally speaking, as service group size is decreased, peak stream needs also decrease. When viewed over a sufficiently short time scale (e.g., two hour periods), it is possible to compare the moment-to-moment variability in peak stream use. Note that the physical network topology (which determines service group size) can also be modified, and is expected to migrate towards smaller groups of subscribers over time.

It has also been noted that the smaller service groups display roughly the same variability as the larger service groups down to a certain threshold size. When considered as a percentage of maximum stream use, as service group size decreases beyond this threshold, variability increases, and will impose a limit the amount of concentration that can be safely implemented within the system. Concentration in the context of BSA networks is defined as a ratio of the total bandwidth of the programs offered, to the BSA bandwidth provided to the service group. While this is conveniently expressed as a ratio of stream counts, in practice streams will be of various bitrates; concentration is therefore best thought of as the ratio of the bitrates. Concentration generally (at a given grade of service or blocking frequency) trends upwards with decreasing service group size.

Another useful metric of the value of BSA is yield. Yield is a function of concentration and the total number of programs included. Yield is important to consider when comparing the value of various bandwidth reclamation techniques.

As verified by actual trials conducted by the Assignee hereof, BSA provides significant concentration, which results in the ability to vacate significant portions of the previously occupied bandwidth ("free" bandwidth yield).

Also of interest is the metric of "redundant viewership". Redundant viewers are those which view otherwise unique programs. Generally speaking, the highest number of redundant viewers occurs at prime-time or just post prime time. This is also the time of greatest total viewership and the time of highest peak stream needs. A design point of X streams would provide a non-blocking grade of service; however, however, significant surplus bandwidth still exists below the X-stream level. Unfortunately, the greatest surpluses occur at times when other services (e.g., VoD) also have their lowest demands. Edge QAM resource sharing with VoD is therefore not expected to provide significant interleaving bandwidth gains. However, the BSA system can be advantageously operated to allow this surplus bandwidth to be utilized in other ways, such as for transport of data, video, voice, or even future applications which would require additional bandwidth.

Gain is a useful parameter for comparison of BSA with statistical multiplexing technology. In BSA, percent gain is defined as:

$$(\text{Concentration} - 1) \times 100 \quad \text{Eqn. (1)}$$

In this context, content that occupies the "freed up" spectrum is assumed to operate with the same level of efficiency as the content being processed (i.e. switched under the BSA architecture, or alternatively statistically multiplexed).

A primary advantage of the BSA paradigm is bandwidth conservation/preservation. Bandwidth for unviewed programs is not consumed, and can be re-allocated. Similarly, new programs can be added without adding bandwidth. Advantageously, programs with narrow appeal can be added in a BSA system with little if any bandwidth impact. More popular programs will impact the BSA bandwidth, but to a lesser extent than was traditionally the case. Multiple bitrates can also be made available for use or sale to programmers or advertisers.

BSA bandwidth efficiencies are at least in part a result of over-subscription. Specifically, the selection of programming is greater than the bandwidth allocated to the service group. This can result in blocking, the case where a viewer is denied access to a requested program. However, the aforementioned trials conducted by the Assignee hereof demonstrate that when properly configured, blocking events are sufficiently rare, so as to be less common than a network outage, thereby providing a sufficient level of service.

Additionally, a BSA system typically gathers and keep logs or other records of programmer-specific viewership data. For example, the BSA server gathers logs that are based on the client-server interactions. These logs or records are maintained to allow for well-considered "recapture" of non-viewed program streams (i.e., reclamation of bandwidth). The server manages bandwidth by removing streams based on this activity data. In typical practice, unviewed streams will be marked, but not actually removed until the bandwidth is needed either because of a client request, or based on external resource demands such as VoD overflow.

In one exemplary embodiment, the network session manager (BSA manager) logs all channel change events and is aware of the tuning locations of all tuners, not just those that happen to be viewing BSA programs. This provides highly accurate and complete viewership data based on actual channel changes as contrasted with extrapolations or other estimation techniques.

In the exemplary embodiment of the present invention, the edge switch 194 (generally located in the distribution hub as shown in FIG. 1c) is flooded with all available programs. This improves transport efficiency, because a simple unidirectional "drop and continue" protocol is performed at each hub location on a given optical transport ring 197. The concept of flooding also simplifies the transport network in that no control system is needed; rather a simple "deliver everything" paradigm is used. This approach also advantageously makes this portion of the signal chain more robust, since more complex control systems generally lend themselves to a higher operational failure rate.

Because ordinary broadcast programming is supplied using BSA, the transport network 197 needs to have a high degree of availability. In the exemplary embodiment, BSA program transport is supplied through a redundant, spatially diverse counter-rotating Ethernet ring topology, although other topologies may be utilized with success.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Methods—

Figure 2:
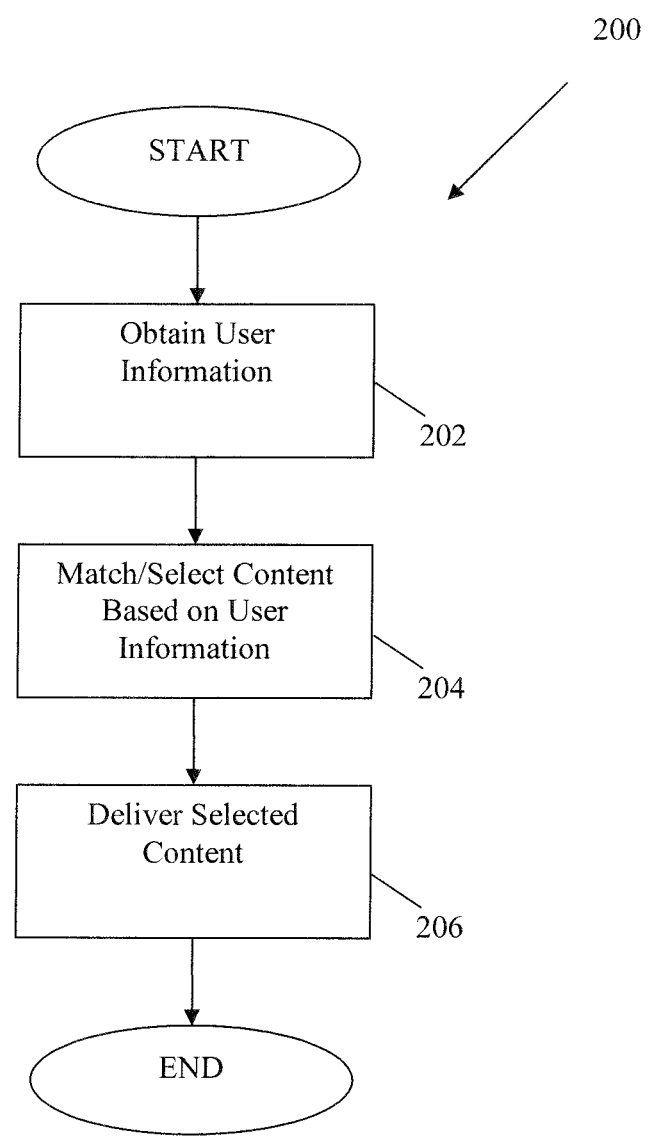
FIG. 2 is a flow diagram illustrating a method of selecting content based on received information in accordance with one embodiment of the present invention.
Figure 3A:
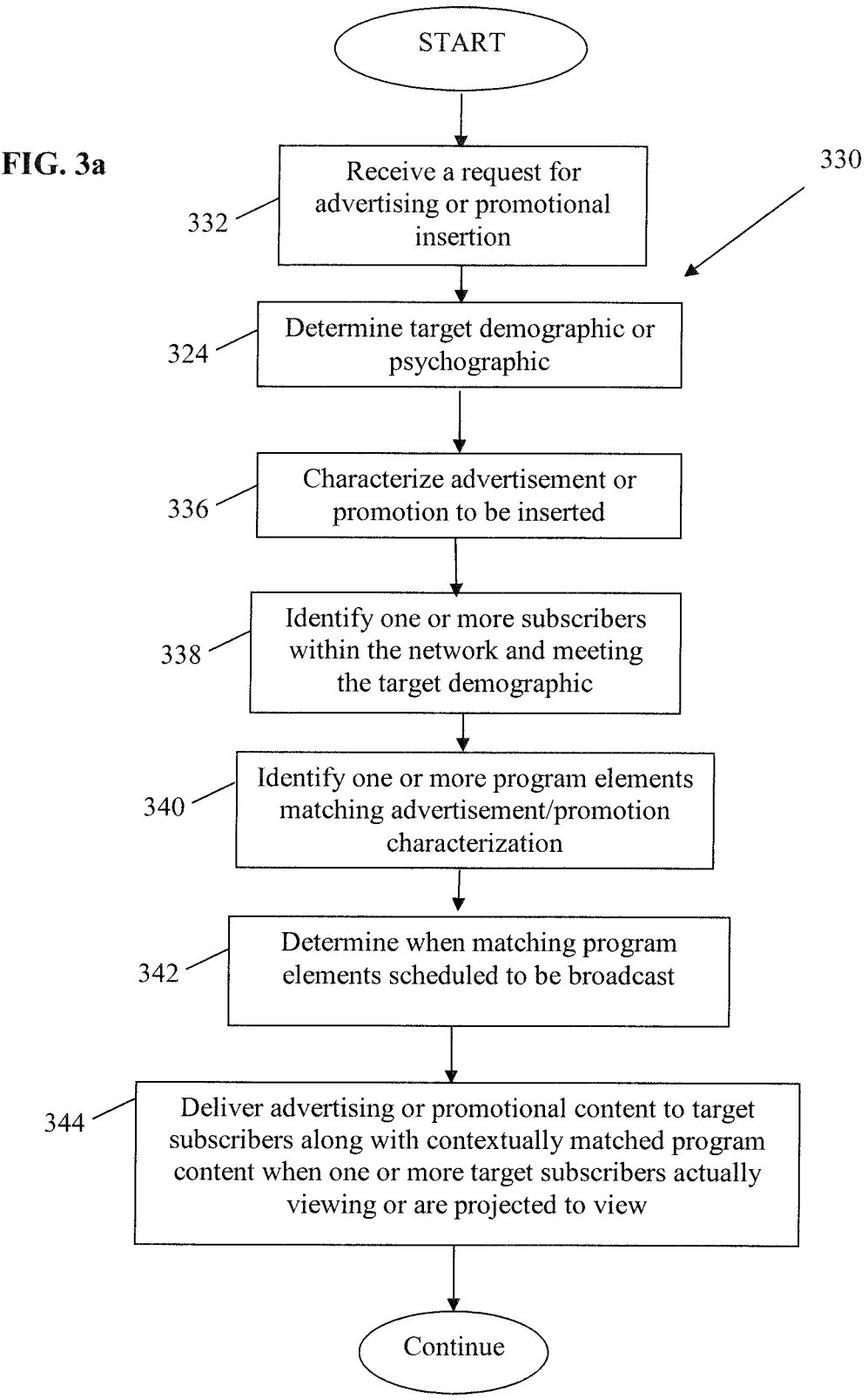
FIG. 3a is a flow diagram illustrating a variant of the method of FIG. 3, wherein contextual matching between the program and advertising/promotional content is utilized.

Referring now to FIGS. 2-3a, exemplary embodiments of the methodology according to the present invention are described.

FIG. 2 is a flow diagram illustrating a generalized method 200 of selecting advertising or promotional content based on subscriber information in accordance with one embodiment of the present invention. This method may be used for example in response to a subscriber request for content, such as a VoD session request, switching to a prescribed BSA-delivered program channel, requesting an IPTV video, and so forth. To this extent, the method of FIG. 2 is substantially subscriber-centric, in effect selecting advertising or promotional content using subscriber identity, data or demographics and entry point.

Initially, information associated with one or more relevant network users (e.g., the aforementioned subscriber requesting a VoD session) is obtained at step 202. This information comprises for example one or more personal attributes or characteristics, such as without limitation name, address, age, race, ethnicity, gender, anatomical dimensions such as weight or height, physical or mental conditions, marital status, family size, number of dependents, sexual orientation, religious persuasion, political affiliation, net worth, income, types and number of automobiles owned, country of citizenship, languages spoken, occupation, hobbies, and personal preferences. This information may also comprise historical viewing patterns and/or viewing behavior (actual or extrapolated). Myriad other types of information may also be collected in accordance with the scope of the present invention.

The foregoing information may be received dynamically (e.g., periodically or anecdotally from the subscriber or his/her CPE 106), or comprise historical information such as that contained in a subscriber database or other data repository. Algorithms or other such means may also be utilized to derive one or more pieces of information from others (so-called "derivatives"). For example, where a given subscriber declined to provide any financial information to the MSO, but is known to live in a Beverly Hills, Calif. zip code, the MSO would have a good confidence that the subscriber was in a higher income/net worth category. If that same subscriber further indicated that they own seven (7) automobiles and lists "real estate investing" as a hobby, this information could be used to increase the confidence level of that derivative assumption regarding income/wealth.

It will also be recognized that various types of subscriber-related information can be used to derive a psychographic or behavior-centric profile. For example, it may be speculated that subscribers who are chronic "channel hoppers", power up their CPE at exactly the same time every day, send in their cable account bill on the same day every month, and who frequently watch Monk are potentially obsessive-compulsive (OC). This type of psychographic profile may be useful to advertisers looking to access such subscribers, such as for promoting a new medication for OC or OC-related disorders, for automated electronic bill-pay services, for closet or garage organizing shelves, etc.

At step 204, advertising or promotional content is matched or selected for potential use based on the collected user information. In one embodiment, this is accomplished by comparing the collected user information against a set of advertising or promotional content descriptors. For instance, first advertising content might comprise metadata that indicates that: (i) the advertisement relates to automobiles, and (ii) the advertisement is particularly geared toward high-income older males (based on, e.g., the type of car being advertised). When this metadata is compared to user-based data (e.g., metadata generated based on the subscriber information obtained per step 202), a match may be generated, such as where the user from which the data was obtained is a high-income older male.

It will be appreciated, however, that the foregoing model is simplified for purposes of illustration; much more sophisticated approaches to advertising content and subscriber demographic data evaluation and matching may be employed. The MSO can advantageously make its implementation as detailed or simplistic as it desires (or as coarse or fine a match as desired), and even dynamically alter the evaluation and matching rule sets applied under different operational or business climates. For instance, a first rule set might be imposed during normal operation, and a second rule set during maintenance or equipment failure periods. Or, a first rule set could be applied during prime-time, and different rule sets during other periods. As yet another alternative, different rule sets could be applied during different holidays (or holiday season, such as the "Christmas rule set"), which are different than the normal rule sets. An almost limitless number of different rule sets and permutations are possible under the present invention.

In some variants, one or more thresholds or other criteria are used in order to identify ostensibly relevant user information. For example, a rule may be imposed such that if at least a certain percentage of the subscribers under consideration satisfy a certain condition (for instance, at least 60% of the consumers within the group are female) then that particular condition would be considered relevant for the purposes of the of the content selection process. In the above example, any content comprising a descriptor indicating "female" as a preferred target audience would then be considered an eligible candidate for content selection. This process can be applied across multiple conditions or parameters as desired. Moreover, it can be applied to one individual; i.e., all facets of that particular individual may be considered "relevant" for the content selection and matching process.

In another embodiment, a priority scheme indicates which candidate among the set of all eligible n candidates (n greater than or equal to 1) should be selected for content delivery. This scheme may rank or prioritize users on any number of different criteria. In one simple example, subscribers are "graded" on their correlation or adherence to a particular target demographic, such as via a percentage or other numerical system. Alternatively, a fuzzy logic, Bayesian, or Dempster-Shafer approach may be used to assign priority (e.g., "high correlation", "medium correlation", "low correlation"), and so forth. In one embodiment, this priority scheme is encoded into the controlling logic of an advertising/promotional content selection module (APCSM) 401, described subsequently herein with respect to FIGS. 4-5. In certain variants, the priority scheme is customizable and may be provided as input to the content selection module.

At step 206, the selected content is delivered to the relevant subscriber(s) that are part of the target demographic. In one embodiment, this delivery is accomplished by directing the relevant subscribers to tune to an unused transmission channel for receipt of a substitute set of advertisements, such as via the targeting advertisement methods described in co-owned U.S. patent application Ser. No. 10/639,070 filed Aug. 12, 2003, entitled "TECHNIQUE FOR EFFECTIVELY DELIVERING TARGETED ADVERTISEMENTS THROUGH A COMMUNICATIONS NETWORK HAVING LIMITED BANDWIDTH,"

and issued as U.S. Pat. No. 9,247,288 on Jan. 26, 2016, which is incorporated herein by reference in its entirety. The relevant subscribers may have their CPE 106 forcibly tuned to the unused channel based on commands sent from the headend or other network location ((.g., via an immediate update to their program mapping table, via existing BSA client protocols, or the like) so as to present a seamless and effortless transition to the subscriber, or alternatively a new program stream can be instantiated (e.g., using the aforementioned BSA techniques) with the relevant advertising or promotional content spliced therein, the user's CPE then being directed to tune to the newly generated program channel.

As other alternatives, a technique know as "re-binding", or alternatively a payload substitution, may be used in place of a forced re-tuning consistent with the invention. For example, in one embodiment, a BSA switch or other device in the network can switch a new source of advertising or promotional content into an existing program stream, thereby obviating the need for the subscriber's CPE tuner to physically tune to another QAM. Using payload substitution, the payload or encoded content of an existing stream can effectively be replaced, such as where the existing advertisements or promotions or replaced before broadcast. Such techniques are well known to those of ordinary skill in the cable television arts, and accordingly not described further herein.

In other embodiments, information may be returned pertaining to the group of all content consumers presently requesting content. In many of these embodiments, this information is reflective of only those content consumers comprised within a certain service area, distribution area, and/or geographic area (see discussion of "granularity" presented subsequently herein).

Figure 2A:
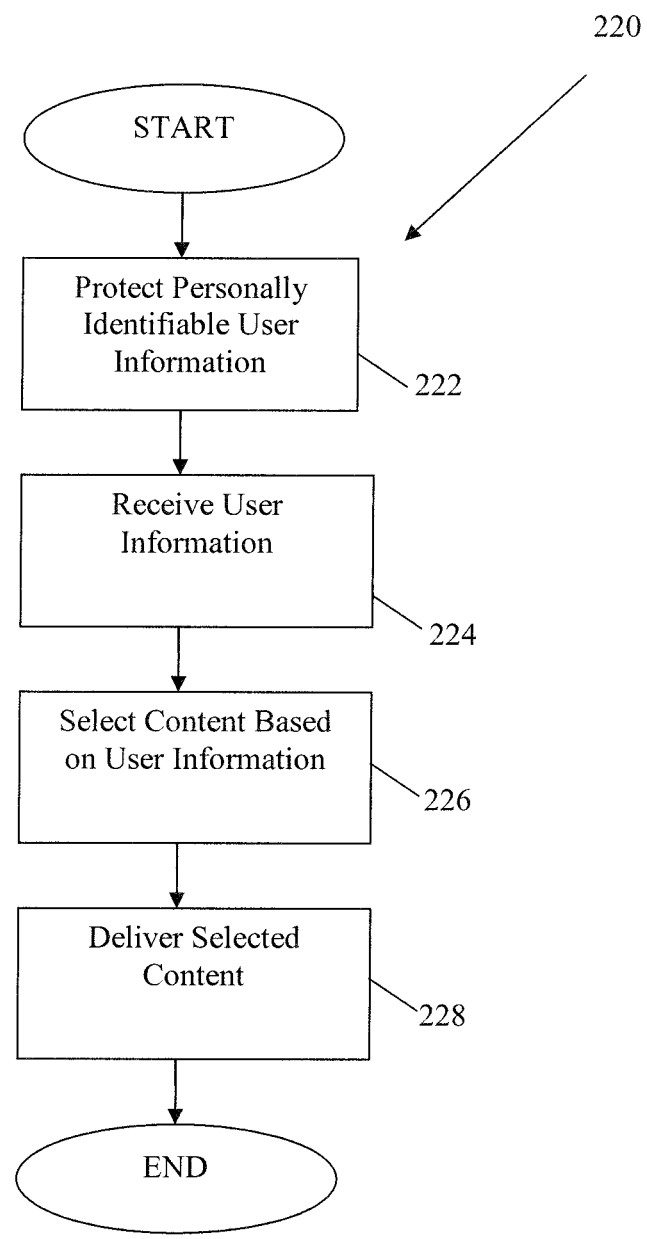
FIG. 2a is a flow diagram illustrating one variant of the method illustrated in FIG. 2, wherein personally identifiable user information is protected.

It will be appreciated that the user(s) from which information is obtained per step 202 of the method 200 of FIG. 2 need not necessarily be the same user(s) to which the advertising or promotional content is delivered per step 206. For instance, a plurality of FIG. 2a illustrates one variant of the method depicted by FIG. 2. This methodology 220 is generally similar to that of FIG. 2, yet at step 222, at least a portion of the user information which could be used to personally identify a particular subscriber is first privacy-protected (e.g., hashed, scrambled, or otherwise enciphered). This process can be accomplished in a variety of ways. For example, in one embodiment, a one-way cryptographic hashing function is utilized, such as the hashing functions described in co-owned U.S. patent application Ser. No. 11/186,452 filed Jul. 20, 2005, entitled "METHOD AND APPARATUS FOR BOUNDARY-BASED NETWORK OPERATION," and issued as U.S. Pat. No. 8,571,931 on Oct. 29, 2013, which is incorporated herein by reference in its entirety. In another embodiment, advertisements may be selected and delivered according to information in a feature repository which does not comprise personally identifiable information, such as via the methods described in co-owned and co-pending U.S. Patent Publication No. 20050060742 published Mar. 17, 2005 and entitled "SYSTEM AND METHOD FOR TARGETED DISTRIBUTION OF ADVERTISING WITHOUT DISCLOSURE OF PERSONALLY IDENTIFIABLE INFORMATION," which is incorporated herein by reference in its entirety as well. The MAC address, TUNER ID and/or TUNER USE variables are hashed so that the identity of the originating CPE/subscriber are anonymous. In this manner, subscriber privacy is effectively maintained. The actual data itself (e.g., tuning history, subscriber preferences, etc.) may also be encrypted (e.g., using symmetric or asymmetric key encryption) or otherwise protected if desired, such as to prevent theft or misuse thereof, although the information is effectively of little use without knowing which subscriber originated it.

It will also be appreciated that the data may be first obtained and processed, and then hashed or otherwise protected as previously described.

In other embodiments, at least a portion of the user information which could be used to personally identify a particular content consumer is simply not transmitted or used in the first instance. For example, the subscriber may not want certain information about themselves or habits utilized by the MSO, whether hashed for anonymity or not. Advantageously, this provides additional privacy protection and requires no additional logic for resident hashing, scrambling, or enciphering processes. It also reduces the precision with which the MSO or designated algorithmic process can identify a particular demographic or psychographic, however.

In still other variants, subscribers are given a choice as to whether to "opt-in" or "opt-out" of the information collection process (or selective portions thereof). In one such variant, the user can control access to various types of user information such that only user-designated or approved information is eligible for collection and/or analysis. For example, a given user may grant access to information about his historical viewing patterns (such as most frequently requested programs), but deny access to more personal information (such as age, income, and occupation). This restriction or control can be imposed at the MSO end (e.g., by restricting access to certain portions of the MSO subscriber database by the APCSM), or at the CPE 106 (e.g., through a client application or middleware module which prevents certain data from being "mined" from the CPE or connected devices, or transmitted upstream).

It will be noted that the MSO may passively glean tuner activity information relating to a particular subscriber based on inter alia, channel-change requests sent from the CPE 106 upstream. This can be positively correlated to a given CPE (such as via the TUNER ID or TUNER USE variables, or MAC), which can then be positively correlated to a given subscriber account via, e.g., the MSO subscriber database. So as to mitigate any loss of subscriber privacy (for both commercial and legal reasons), methods such as the aforementioned use of an "opaque" variable or cryptographic has may be employed. Accordingly, under such an approach, the MSO will be able to maintain CPE-specific data (e.g., what programs were selected when, when the CPE was powered up or down, CPE-specific logged errors, VoD delivery requests and session behavior, etc.) since each CPE 106 can be specifically albeit anonymously identified by its cryptographic hash. Only when the subscriber "opts in" and permits access to personal data, or association of this hash with its identity (i.e., subscriber account or other such information), will the subscriber's personal information be utilized by the APCSM.

Myriad other privacy protection measures are also possible in accordance with the scope of the present invention, including without limitation encryption of various portions of the sensitive personal data according to e.g., a public/private encryption key pair or the like.

Next, at step 224, the user-related (or CPE-related) information is received or obtained as described previously with respect to FIG. 2.

At step 226, the content (e.g., advertisement or promotion) is selected based at least in part on the user/CPE information, and the content delivered per step 228.

Figure 2B:
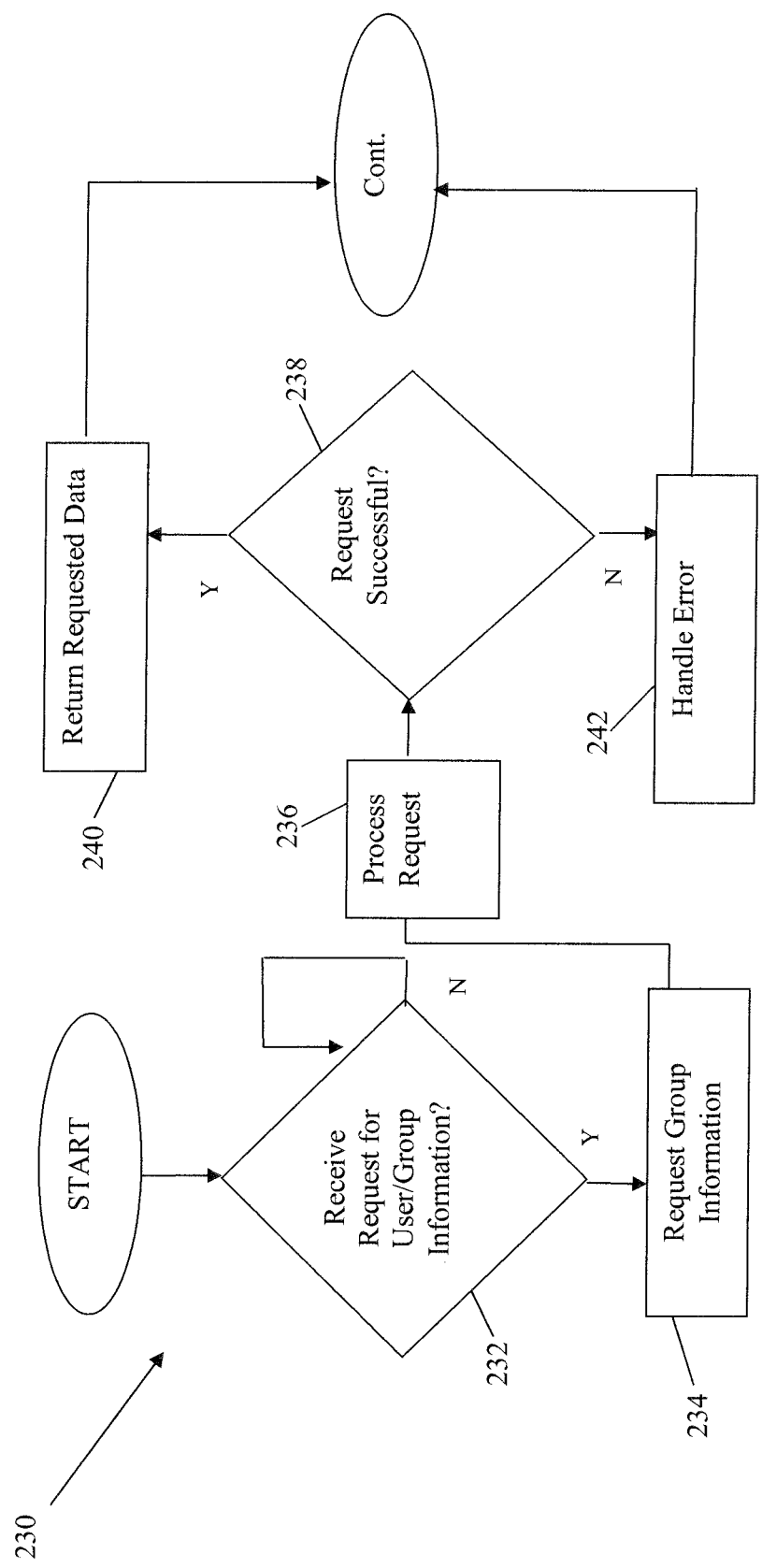
FIG. 2b is a flow diagram illustrating a method of processing group information in accordance with one embodiment of the present invention.

FIG. 2b is a flow diagram illustrating an exemplary embodiment of a method 230 of obtaining information with respect to one or more users (and their related subscriber accounts and/or CPE as applicable) in accordance with one embodiment of the present invention. This process would be used, for example, by the APCSM to obtain information relating to a subscriber of interest (or groups of subscribers) as part of obtaining information per step 202 of the method 200 of FIG. 2, such as where the subscriber or group of subscribers is the input to the process, and the MSO (via the APCSM) desires to identify content relevant to these specific individuals or groups. Consider the case, for example, where an individual subscriber requests delivery of a VoD stream, or switches their BSA-delivered programming to a new channel, and the MSO desires to target these deliveries using particular advertising or promotional content.

Alternatively, the methodology of FIG. 2b may be used to identify specific subscribers or groups of subscribers based on their demographics/psychographics, where the advertising or promotional content is used as the entry argument (e.g., find all of the subscribers in the MSO network that "match" the demographic of a particular advertisement).

Step 232 of FIG. 2b comprises determining whether a request for information have yet been received. It will be appreciated that this step may be performed anecdotally, such as upon request by the APSCM, periodically (such as e.g., every hour), or according to another implementation scheme.

In certain embodiments, the request for information further comprises a set of arguments or input parameters. These arguments/parameters may further specify the individual or group for which information is to be collected. For example, in an embodiment utilizing Boolean logic, the set of arguments "status: married AND (age: >40 OR activity: travel)" would refer to the set of married consumers who are either over the age forty or who frequently travel. Note that the above example is merely illustrative of the broader principles; myriad other methods for specifying or delimiting a certain group are also possible in accordance with the scope of the present invention.

After a request for group information has been received, the group information is then requested at step 234. At step 236, the request is processed (e.g., a subscriber database searched for subscribers matching the input parameters), and a determination is subsequently made as to whether the request for group information was successful per step 238. If the request was successful, the requested data is returned at step 240. If the request was unsuccessful, the error is handled accordingly at step 242. In certain embodiments, the aforementioned error handling procedure involves adjusting one or more parameters in the query (e.g., changing Boolean operator logic, expanding ranges of criteria, etc.), and repeating the request, before aborting the operation. In many embodiments, any errors are recorded to a log that can be subsequently accessed by one or more processes and/or a human operator.

Alternatively, instead of evaluating the success or failure of the request, the method of FIG. 2b may comprise grading each of the identified subscriber records according to grading schema (as described elsewhere herein). For example, one such schema might comprise identifying and quantifying those who matched one Boolean criterion, those which met two criteria, and s forth. Each subscriber who matched at least one criterion would then be graded, and the graded subscribers ranked. Myriad other approaches will be recognized by those of ordinary skill.

Figure 2C:
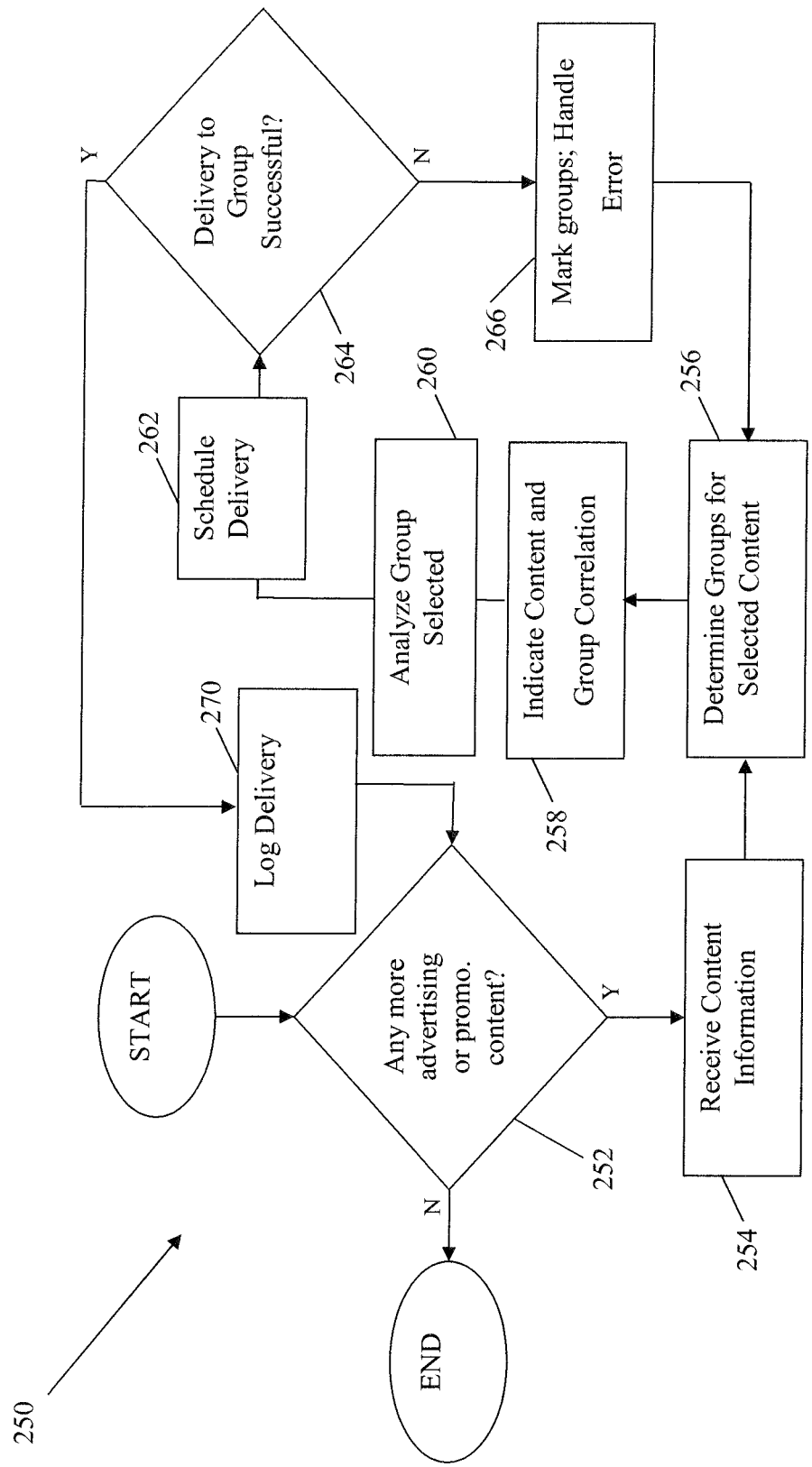
FIG. 2c is a flow diagram illustrating a method of determining groups for advertising or promotional content delivery in accordance with one embodiment of the present invention.

FIG. 2c is a flow diagram illustrating an exemplary embodiment of the method 250 of determining groups based on content information in accordance with one embodiment of the present invention. Initially, at step 252, a determination is made as to whether there is any more content to be analyzed. The content-related information is received at step 254. In one embodiment, this content information comprises a set of descriptors for a given content element or stream. For example, the XML metadata descriptors "advertisement, restaurant, Italian, family, San Diego" might be used to indicate an advertisement for an Italian family-style restaurant located in San Diego.

At step 256, individual or groups of subscribers are selected which best match the provided content identifiers. These subscribers may be identified ad hoc; i.e., as a result of the content evaluation process, or alternatively via prior analysis and categorization by the MSO, such as via a subscriber database, etc.

In one embodiment, the matching process of step 256 is accomplished by traversing a set of relevant individual or group descriptors. As described elsewhere herein, according to some embodiments, one or more thresholds or grading criteria may be used in order to identify relevant subscribers/information. For example, a rule may be imposed such that if at least a certain percentage of the content consumers comprised within a group of subscribers that are otherwise logically related satisfy a certain condition (for instance, at least 60% of the consumers within a group comprising subscribers served by the same local network distribution node, or within the same zip code, are female), then that particular condition would be considered relevant for the purposes of the of the subscriber selection process.

In some embodiments, eligible individuals or groups are assigned a priority or weight based upon their correspondence to certain content descriptors. For instance, in the restaurant example given above, a group of subscribers referenced by the descriptor "location: San Diego 10%" might be given less weight or a lower score than a group referenced by the descriptor "location: San Diego 30%" since it has been determined that there is a larger percentage of consumers residing in the San Diego area in the second group than the first group (who would be more likely to frequent a restaurant located in San Diego). On the other hand, a group "location: San Diego 10%; activity: dine 80%; preference: Italian 70%" might be given more weight than "location: San Diego 30%, activity: dine 25%; preference: Italian 20%", since in this case there is a higher correlation or "tighter fit" with the other descriptors in the descriptor set. The above example is merely illustrative of the broader principles; myriad other possible priority or weight assignment schemes can be used in accordance with the present invention. In one embodiment, these priority/weight assignment schemes comprise an MSO-customizable input to the APCSM 401; e.g., the MSO or root advertiser can customize the degree of matching necessary in order to achieve penetration of a target demographic.

Once the appropriate individual(s) or group(s) have been selected, any content/group pairing is indicated in step 258. In one embodiment, this is accomplished by populating content entries in a schedule, table, database, or other such similar data structure.

Per step 260, the selected groups (if any) are evaluated to determine number of members, so that the number of "impressions" resulting from the content delivery can optionally be estimated.

Delivery is then scheduled at step 262. This scheduling can be accomplished using a broad range of different techniques, depending largely on the granularity level selected. For example, in one variant (e.g., maximum granularity), scheduling of delivery of the content to the target group(s) comprises scheduling for delivery of particular individuals, and the delivery can be attempted during use of the network by those individuals (e.g., when they request a VoD session, when they tune their CPE to a then-undelivered BSA program channel, thereby causing that channel to be instantiated, etc.). This approach allows for near instantaneous modification of the delivered program stream, whether by switching the target subscriber to an unused program channel for targeted advertisements, splicing the targeted advertisements into an existing stream, re-binding an existing stream to another source, etc. In effect, the APSCM is scheduling n different deliveries of the target advertisement or promotion, where n comprises the number of different subscribers/CPE who meet the prescribed demographic or psychographic criteria. These n different deliveries advantageously may be either coupled or wholly unrelated in terms of schedule. For example, where the MSO has identified subscribers X Y and Z as meeting the target demographic and being within the same BSA delivery node, and determines that both X and Y are watching the same program channel at the same time, it may situationally "splice in" the target advertisement, thereby obtaining two impressions from the target demographic. If X tunes away before delivery, then the impressions counter (described below) only records one prospective impression (Y), and the scheduling module schedules a second attempt for X, as discussed below.

It will be appreciated that the aforementioned "maximum granularity" approach may also be implemented for individual subscribers irrespective of their identity. For instance, in one variant, the subscriber's particular identity is known, and decisions relating to selection, scheduling and delivery made based at least in part on their identity (i.e., we know that CPE 123456 belongs to John Smith who lives in zip code 92131, and that John Smith likes sports cars and owns a Ford, so advertisements for the new Ford Mustang would be well correlated to John Smith). In another variant, the subscriber's identity is kept hidden, and certain identifying information kept separate or segregated from use by the APCSM algorithms. In one such variant, a cryptographic hash of a subscriber's CPE MAC address, TUNER ID or TUNER USE variable maintained by the MSO, and only this hash (versus the subscriber's actual identity, address, SSN, etc.) is associated with demographic or psychographic data useful for the advertising process. Stated differently, the MSO database used by the APCSM in this latter variant knows a subscriber only by their CPE (hash), and perhaps knows other relevant but non-descriptive information (e.g., zip code where they live, job, income, hobbies, etc.).

At a higher level of granularity (e.g., groups of subscribers that are logically related by way of one or more criteria) can be targeted. For instance, as previously described, all male subscribers over age 50 who live in zip code 92101 and are sports car owners or enthusiasts can be readily identified within an MSO database. This logical relationship or demographic may be what the sports car advertiser wishes to target. Scheduling of delivery of the sports car advertisement in this case is different than in the maximal granularity embodiment previously described, since individual delivery modes for each member of the group are not necessarily used. Rather, common delivery modes are identified and used where possible. For example, once the aforementioned group of related subscribers are identified, their profiles or viewing habits may be evaluated to identify any common viewing patterns. These may include e.g., (i) watching common programs or program channels; (ii) watching the same or different programs/channels at common times (e.g., early morning before work); (iii) frequent or infrequent use of features such as "telescoping" advertisements, etc. These data can be utilized by the APCSM to select the best common delivery mode for the exemplary sports car advertisement; e.g., on the commonly watched program/channel of item (i) above; at certain times of day across many different channels for item (ii); or as part of a telescoping advertisement for item (iii).

It should be noted that the program-centric approach of item (i) above differs from that of the prior art previously discussed in that, inter alia, the target group is identified by MSO data and is particular to that network, versus merely a loose projection/correlation (i.e., that certain types of people watch certain types of programs) that is based on data that bears no particular relationship to the MSO's particular network. However, it will be recognized that implementation of the present invention need not be an "all or nothing" proposition; in fact, the methods and apparatus of present invention can advantageously be mixed to any degree desired with prior art program-based techniques, whether across different portions of the network (e.g., one service group or hub operating according to a first scheme, and a second according to a second scheme), across different time slots or periods in the same (or different) portions of the network (e.g., one scheme for prime time, and another for all non-prime times, within the same service group), or even across different program channels (e.g., major network channels operate on one scheme, and other channels operate on a second scheme).

Myriad other schemes for identifying and exploiting such "common" delivery modes will be recognized by those of ordinary skill given the present disclosure.

Moreover, under the more "granular" methods previously discussed, the MSO (or advertiser) can know who is watching what channel at what time (whether explicitly, or anonymously using the privacy protection methods described elsewhere herein) based on channel change and tuning events instigated by that subscriber/CPE and recorded at the headend 150 or switching hub (or even the CPE 106), and use this information within a historical/predictive framework. For example, the MSO can associate the aforementioned subscriber/CPE with particular historical viewing habits (see, e.g., the methods and apparatus described in co-owned U.S. patent application Ser. No. 11/243,720 entitled "SELF-MONITORING AND OPTIMIZING NETWORK APPARATUS AND METHODS" filed Oct. 4, 2005, and issued as U.S. Pat. No. 8,582,584 on Nov. 12, 2013, incorporated herein by reference in its entirety), whether on an individual basis (i.e., utilizing historical information for that particular subscriber/CPE), or on a generic basis (e.g., using data from that subscriber's service group, zip code, or the network/region as a whole). Predictive template or artifact matching may also be utilized to predict subscriber activity on an individual or group basis (e.g., subscriber X has tuned to "24" every Monday night for the past ten weeks, and therefore can be expected to do so this Monday evening, or 75% of subscribers in Service Group M have tuned to "24" every Monday for the past ten weeks, etc.), as described for example in co-owned an co-pending U.S. patent application Ser. No. 11/800,093 entitled "METHODS AND APPARATUS FOR PREDICTIVE CAPACITY ALLOCATION" filed May 3, 2007 and issued as U.S. Pat. No. 9,398,346 on Jul. 19, 2016, incorporated herein by reference in its entirety.

At yet a higher level of granularity, larger pools of subscribers may be evaluated and used as a basis for selecting delivery modes, whether statistically or anecdotally. Note that this high-level analysis may also advantageously be performed irrespective of the identification of any particular subscriber or CPE, or when they are viewing what channel, etc. For example, the APCSM may garner statistical/historical data regarding the tuning behavior, bandwidth demand, etc. associated with groups of subscribers or the network as a whole without having to access particular subscriber account/CPE information. A historical peak in bandwidth consumption on the day of the NFL division championship game, for example, that generally coincides with the start time of the game can be presumed to occur each year at that same day/time. If the prospective advertiser/MSO knows that since a certain city's team is playing in this year's division championship game, a larger fraction of a given MSO's subscribers (where that MSO covers the relevant territory) will be from, or areas adjacent to, that city. Hence, if that advertiser wishes to access a demographic of residents of that city (perhaps for a geographically localized car sales promotion or the like), the MSO can schedule the advertisement for that time slot, without knowing which of its subscribers are watching at that time, in what precise location those subscribers live, etc. Stated differently, this approach is very "dumb" by comparison to the more granular approaches, since it requires little or no a priori knowledge of or data for individual subscribers, or data regarding their current activities.

Of course, the precision of targeting certain demographics or psychographics under this highly granular approach is also much less than that of the more granular approaches previously described, but it advantageously reduces the processing overhead and level of detailed analysis (and information) necessary for implementation.

Relevant to the present discussion is also the concept of "saturation". In the present context, saturation refers to how many views or impressions a given subscriber receives for a given advertisement or promotion, and also optionally the temporal relationship of these discrete impressions. For instance, a subscriber who views (or is given the opportunity to view) a Ford sports car advertisement once every four days would be considered to have a relatively low saturation. Conversely, a subscriber who is presented with the same advertisement four times a night would have a comparatively higher saturation. Saturation would also be increased by the relative placement of the advertisement in the various program streams that the subscriber watches. For example, in the foregoing case of four impressions in one night, the saturation of a subscriber who views these impressions at roughly equal intervals over the night, and perhaps over four different program channels, would be lower than that for the same subscriber who views sets or clusters of close-proximity advertisements on the same program channel (e.g., one before, during, and after a single program). There may be benefits or alternatively detriments to the advertiser when using such clustering (e.g., the subscriber tends to mentally "tune out" the second and third iterations of the advertisement since they have just viewed it ten minutes before). Conversely, certain subscribers may tend to ignore advertisements unless they are "beaten to death" with them via high frequency/repetition.

Irrespective of the benefit/detriment, saturation provides yet one more metric or parameter that can be controlled by the advertiser and/or MSO in delivery of an advertisement or promotion. This parameter can be readily incorporated into the aforementioned delivery scheduling methods (and associated APCSM algorithms) so as to either increase or decrease saturation as desired. For example, a rule might be imposed via the APCSM that says that the same advertisement should not be run on the same channel more frequently than once every three hours. Conversely, a "saturation" regime might be used where n different variants of the same basic advertisement (ensemble) are delivered in a prescribed sequence and in close temporal proximity of one another on a given program channel. The ensemble may have a correlated presence, celebrity, or theme if desired as well (e.g., all Ford Mustang advertisements yet each with a different famous sports personality pushing the product).

Saturation can also be dynamically controlled via a feedback process as described elsewhere herein; e.g., such as where a very high initial saturation rate is reduced after determining that many subscribers tune away from the advertisement each time it is repeated (i.e., they are getting annoyed).

Referring again to FIG. 2*c*, delivery is next attempted per step 264. If delivery is unsuccessful for whatever reason (e.g., the target subscriber tuned away, the subscriber's CPE is powered down, too large a percentage of subscribers in a group are not tuned to the relevant program channel(s), etc.)), the error is handled at step 266. In certain embodiments (as in the embodiment depicted by FIG. 2*c*) this error handling procedure involves determining a new set of groups for the selected content, where "marked" groups are removed from the set of eligible groups. Alternatively, a redelivery can be attempted to the same group, whether shortly thereafter, or at another time. Note, however, that depending on the level of granularity selected and other factors, the group constituency at any given time may be quite variable, yet still meet demographic or psychographic requirements. Much like a flowing river for example, the water may still be cold, but it is not the same water at any different moment. Any such delivery errors noted per step 266 may also be recorded to a flat file or log which can be subsequently accessed by one or more computer processes and/or a human operator, such as for subsequent analysis, and correction of any identified deficiencies or adaptation by the APCSM.

If the delivery to the group was successful, the delivery is then recorded or logged at step 270. In some embodiments, the content descriptors are updated so as to indicate delivery related data, such the number of times the content has been successfully delivered, the number of impressions or subscribers ostensibly reached, the time of last delivery, etc. Control then resumes at step 252 and the procedure repeats until the list of advertising or promotional content has finally been exhausted.

Referring now to FIG. 3, one embodiment of the method of operating a content-based network so as to provide dynamically adaptive advertising or promotion content delivery is described. As will be noted, the method of FIG. 3 is basically "request-driven"; i.e., the delivery of the advertising or promotional content is driven by a request from an advertiser, network, etc. The methodology previously described with respect to FIGS. 2*a*-2*c*, in contrast, is more "subscriber-driven" in that the process is focused on matching and selecting advertising or promotional content based on one or more identified subscribers (e.g., those who are watching television at that point in time and have requested a given program). It will be appreciated, however, that both of these methods can be used in concert, and may in fact interact with one another, or iterate.

As shown in FIG. 3, the method 300 comprises first receiving a request for advertising or promotional insertion (step 302). This might comprise, for example, a request directly from an advertiser, from a third party "broker" or intermediary, or from an MSO entity that is tasked with handling or pre-processing such requests. These requests might come in several different forms, such as e.g., (i) one requesting a particular advertisement be run so as to access a particular demographic or target audience; (ii) one requesting only that a particular demographic be accessed, with a plurality of different advertisements to choose from in fulfilling the request; (iii) one requesting that the advertisement be focused within a particular geographic area; (iv) one requesting that the content of the advertisement be correlated to programming content with which it is contemporaneously associated (i.e., given the proper "context"), and so forth. Combinations of the foregoing may also be used. This approach advantageously gives the MSO appreciable business flexibility; i.e., they can satisfy a multitude of different types of advertising requests, each being suited to different types of advertisers (or needs).

The target demographic or psychographic is then determined (if not known) per step 304. For example, this might comprise simply using the advertiser-provided demographic data. Alternatively, the advertising content provided may be evaluated to identify various features or attributes which correlate to various demographics. For example, in the case of an advertisement for a new powerful upscale (i.e., relatively costly) pickup truck, males aged 25-55 in the construction, contracting, farming, etc. fields might be identified as likely demographic candidates.

Next, per step 306, one or more subscribers within the network and meeting the target demographic are identified. A previously described, this may constitute evaluation of subscriber profile data retained by the MSO, evaluation of data regarding various viewing habits (e.g., historicals), and the like. Note that depending on the level of granularity chosen, this identification process may include, for example: (i) pointedly identifying one or more known individuals within the subscriber pool (e.g., John Jones at 123 Main Street, San Diego, Calif.); (ii) anonymously identifying individuals (e.g., based on association between a CPE MAC, TUNER ID, etc. hash and the attributes or profile of that subscriber (irrespective of their actual identity); (iii) identifying groups of subscribers within a localized geographic region (e.g., zip code) or "network" region (e.g., those in a particular service group, BSA hub, etc.); (iv) using all or segments of the network as a whole based on statistical or historical analysis; and so forth.

Lastly, per step 308, the advertising or promotional content is delivered to the target individuals or population in order to obtain the desired penetration or number of impressions. This delivery may be scheduled in advance, such as where it is determined that the desired demographic will be accessed by inserting the advertisement at certain locations within certain channels at certain times. Alternatively, the delivery may be dynamically varied and ad hoc, such as where a "target" subscriber with ideal demographics instantiates a VoD session, and the VoD stream is adapted on-the-fly for that subscriber. Similarly, the MSO might notice that a large percentage of subscribers within the target demographic (e.g., viewers within zip code 92127) are presently tuned to a small number of channels based on their tuner activity, and hence the advertisement can be dynamically scheduled into the next available slot on those channels for at least the service groups serving that zip code.

FIG. 3a illustrates one variant of the exemplary method of FIG. 3, wherein contextual matching as previously described herein is performed.

Per step 332 of the method 330 of FIG. 3a, a request for advertising or promotional insertion is first received. Next, per step 334, a target demographic or psychographic for the received request is determined. This may be accomplished by receiving information from the advertiser themselves (e.g., as to one or more target demographics), or alternatively by analysis by the MSO or a third party of the various attributes of the advertisement or promotion. For example, one variant of the method scans the advertisement/promotion for metadata or other descriptive data, and attempts to generate a demographic or psychographic profile therefrom. Alternatively, a human operator can watch the advertisement or promotion, and record their impressions regarding content, appeal, target audience, etc. Historical or pre-existing demographic or psychographic "profiles" may be used for this process as well, such as where the advertisement meets all or a certain number of criteria for that profile (e.g., an advertisement about new high-cost premier titanium golf clubs might be characterized as appealing to 75% male demographic, 25% female demographic (assumed to be roughly the ratio of male to female golfers in the subscriber pool) having incomes in excess of $150,000 per year. Other approaches may be used as well.

Next, per step 336, the advertisement or promotion to be inserted is characterized. This may be accomplished in a fashion similar to that previously described for determining the demographic associated with the advertisement or promotion. For example, in one embodiment, the content carries metadata with a plurality of descriptive terms (e.g., "golf clubs"; "titanium"; "high-income", etc.).

Next, per step 338, one or more subscribers within the network meeting the target demographic are identified. This can be accomplished as previously described; e.g., via examination of one or more subscriber databases, evaluating historical viewing habits, VoD requests, CPE activity, products purchased via MSO-enabled services, etc. In many cases, a high-level match to a demographic can be accomplished based on information given by the subscriber at sign-up (e.g., a subscriber self-profile), which may indicate for example, age, income bracket, profession, hobbies or interests, marital status, geographic location, and so forth.

Next, one or more program elements matching advertisement/promotion characterization of step 338 are identified per step 340. In one embodiment, this step comprises searching an MSO programming content database or other repository for programming having correlation to the content characterization of the advertisement/promotion to be inserted. For example, the APCSM 401 might search the aforementioned content database or an impending program lineup for metadata matching the words "golf", "club" and "wealthy". This might return the movie "Caddyshack" or "Tin Cup", or an ABC sports coverage of the Master's Tournament for instance.

Next, the identified matching program elements are evaluated for their scheduled broadcast or delivery times/dates per step 342. In one embodiment, this comprises simply a date and time and duration of the program to be broadcast based on an existing program schedule.

Per step 344, the selected advertising or promotional content is delivered to one or more of the target subscribers along with contextually matched program content (e.g., during "Caddyshack") when one or more target subscribers are actually viewing the content (as determined for example by the status of their tuner), or are projected to view (such as via historical analysis or projections, etc.).

Alternatively, in the on-demand or user-controlled environments, the delivery will be indeterminate (even total duration may not be known, due to inter alia "trick mode" functions), since it will depend on the requesting subscriber's desires. Hence, the APCSM 401 can be configured in such cases to route any VoD, nDVR, nPVR, etc. requests for program content through its analysis algorithms to perform one or both of the following: (i) evaluate the requested content and match it (e.g., via metadata or the like as previously described) to one or more pending advertisement/promotion requests, and if the requesting subscriber meets the target demographic, immediately schedule the matching advertisement/promotion into the delivery of the on-demand program stream; or (ii) determine if the requested content is on a previously generated "match" list (per step 340 above), and if so, and if the requesting subscriber falls within the selected target demographic (step 338), then scheduling the matching advertisement for delivery over the on-demand channel.

Use of Metadata—

As previously indicated, metadata of the type well known in the computer programming arts may be utilized in the various embodiments of the present invention to allow for even more precise targeting of one or more subscribers according to their demographic or psychographic profile, including inter alia logical coupling to program content. Consider the simple example where demographic information about a particular subscriber indicates that he is male, between 40 and 65, has a high income and high net worth, and enjoys sports cars. This may correlate to the type of demographic that a sports car manufacturer wants to target with its advertising/promotions. Under a prior art approach, the advertiser might use a Nielsen-like model to correlate that demographic to a particular television program (e.g., National Geographic "Explorer" or the like), and advertise during that program.

Under the exemplary embodiment of the present invention, however, the advertiser would not need to perform any correlation to a program; they could simply tell the MSO in essence that "I make and sell sport cars, and I want to hit this particular demographic". Using this information, the MSO could identify subscribers meeting the target demographic using the methods described elsewhere herein, and deliver the advertiser's sports car advertisement to those subscribers (irrespective of the program context in which it was delivered).

However, under the another variant of the invention, the MSO can further optimize the efficacy of this targeting process by evaluating metadata associated with program content that is broadcast at the proposed channel/time coordinates to determine if there is tangency or correlation to the content of the advertisement ("context matching"). Note that this is markedly different than the prior art (e.g., Nielsen) approach, the latter which says in effect that a given demographic can be associated with a particular program, irrespective of the program's content. For instance, 18-30 year-old females may be known to watch American Idol every Monday night, and the advertiser may wish to sell hair care products to these females, yet hair care products have literally no relation to the content of the typical American Idol program.

In contrast, the exemplary methods and apparatus described herein may be configured to correlate the content of the advertisement and the content of the contemporaneous programming via metadata, thereby placing the advertisement or promotion "in context".

In the previously discussed sports car example, the exemplary APCSM process would identify one or more programs with the word "sports car" or similar descriptor in the metadata, and select or prioritize this/these program(s) for delivery of the sports car-related advertising. In this fashion, there is ostensibly even higher penetration or efficacy against the target demographic, since the sports car advertisement will be delivered during programming about sports cars. Irrespective of the subscriber's demographic data that indicates that he likes sports cars (assume this data to not be present or available in the subscriber's profile for the purposes of this example), it can be presumed that since the subscriber is watching a show about sports cars (or which at least contains some elements relating thereto, such as a sports car chase scene), they will have at least some interest in watching a commercial about sports cars.

Additionally, the APCSM process may further fine tune this correlation, such as by determining if the subscriber demographic data: (i) affirmatively lists sports cars as an area of interest or hobby, (ii) the subscriber(s) in question log many hours watching auto racing, sports car-related programs, etc., or (iii) the subscriber indicates via e.g., survey or other such mechanism that he owns one or more sports cars. In the event that any one or more of these exemplary criteria "match" the subscriber(s) being evaluated, there is an even higher prospective correlation or efficacy for the aforementioned sports car advertisement, thereby weighing in favor of broadcasting that advertisement to that subscriber at that time.

At yet a further level of precision, the metadata in the program content and/or advertising/promotional content can be provided with a timing index or other reference and further information (e.g., descriptive codes) that allow for precise placement of the advertising or promotion within a program stream for maximum efficacy. In the context of the foregoing sports car example, the program might comprise the Steve McQueen movie "Bullitt", wherein an exciting sports car chase sequence between McQueen's Ford Mustang and another car takes place at a certain juncture in the movie. The advertiser might be Ford Motor Co., and the advertisement relating to their 2008 Ford Mustang. Hence, metadata for the movie might indicate "sports car; Ford; Mustang, chase" or the like, along with a chronological or timing reference to the program stream (e.g., SI index). The APCSM process of the present invention would read this metadata, and also read the metadata associated with the proposed advertisement (e.g., "Ford; Mustang; sales event; convertible" or the like), and determine according to its established evaluation algorithm or scoring system that there is a high correlation between these two sets of metadata based on "Ford" and "Mustang". Hence, the APCSM process would indicate that insertion of the Ford advertisement in the slot immediately following the car chase scene is optimal, according to a predetermined APCSM rule (e.g., that correlated ads are best inserted immediately after correlated program stream content).

The net result would be that the subscriber who has just witnessed an exciting sports car chase scene in the movie would see the Ford Mustang advertisement immediately thereafter (ostensibly while their excitement level or "rush" from the scene was still high), thereby potentially inducing them to become more interested in the advertisement or take action that they would not take otherwise (e.g., impulse buy). This technique can also be used very effectively with ancillary commerce channels or opportunities, as has been demonstrated by programs such as QVC, which allow the subscriber to instantaneously "self gratify" through immediate purchase.

It will further be appreciated that the aforementioned telescoping advertisements (or other subscriber interactive mechanisms) may be configured so that they present contextually relevant information. Here, the term "contextually relevant" refers to inter alia: (i) relevant to the then-prevailing program content being delivered to the subscriber, and/or (ii) relevant to the advertising or promotion(s) being presented at that time. See, e.g., co-owned U.S. patent application Ser. No. 11/198,620 entitled "METHOD AND APPARATUS FOR CONTEXT-SPECIFIC CONTENT DELIVERY" filed Aug. 4, 2005, and issued as U.S. Pat. No. 9,286,388 on Mar. 15, 2016, incorporated herein by reference in its entirety, for exemplary methods and apparatus by which this functionality may be accomplished. One variant of the present invention selects the content of interactive links included with the advertisements or elements that can be telescoped by the subscriber. For instance, in the case of a telescoping window or advertisement for the Ford Mustang sports car, the APCSM (or the local CPE or client process thereof, if used) may determine various context elements from the metadata associated with the advertisement (e.g., "Ford", "Mustang", "Sale"), and select two or three interactive links or "pointers" to items of interest or particular relevance. Hence, the aforementioned Ford advertisement might, for example include a telescoping window where the subscriber could obtain more information on the 2008 Mustang, contact a dealer, locate local Ford dealers that stock the Mustang and which are currently running a sale, set up a test drive, etc. Dealers might also use this information to dynamically create new sales opportunities; e.g., by actually bringing a 2008 Mustang demo to the subscriber's residence or the like for a test drive on short notice so as to capitalize on the "impulse buy" tendencies of the subscribers.

Additionally, the selection of the telescoping Ford Mustang advertisement itself can be based on the subscriber demographics/psychographics, and/or the context of the program content associated with the advertisement (e.g., Bullitt) as previously described.

At yet a greater level of precision, the advertisement could be contextually adapted or coupled to the content. For example, Ford might provide the MSO in the foregoing illustration with multiple versions of Mustang advertisements, including one that includes Steve McQueen's likeness, and perhaps a short clip of the chase scene in Bullitt, and/or some catchy copy such as "Want to put a little excitement in your morning commute? Buy a 2008 Ford Mustang". The APCSM process would be able to use unique metadata associated with each version (e.g., the aforementioned "Bullitt" version including metadata such as "Bullitt" or "McQueen") to select the version of the advertisement that is most highly correlated with the program content. These multiple versions may be cached in the MSO network, such as using a storage device with pre-encoded versions readily accessible to an advertising splicer, and hence rapidly selected and inserted, effectively seamless to the viewing subscriber(s).

Since the broadcast program lineup is effectively fixed as a function of time in most networks, the MSO (via the APCSM process) can opportunistically identify instances where insertion of a given advertiser's advertising or promotional content is optimal for reaching the target demographic (e.g., so as to achieve a desired number of impressions). This also provides the MSO with a great deal of operational flexibility, since the advertiser is not telling the MSO where and when to run a given advertisement, but rather only the desired result. Such "results-driven" advertising allows the MSO to literally revise all or parts of its advertising schedule dynamically based on inter alia, analysis performed by the APCSM.

In another aspect of the invention, a personalized (or substantially personalized) advertising or promotion "stream" is utilized for achieving the desired level of demographic/psychographic penetration. For instance, in one variant, the advertising or promotion stream comprises a selectively accessible source (e.g., advertising server) within or outside the MSO network that can be accessed to provide an advertising playlist or sequence for one or more users within the target demographic or psychographic. In a simple implementation, the source (e.g., advertising server) is used in conjunction with a VoD delivery paradigm such that when a prescribed user within the demographic selects or requests a VoD session, the APCSM (or even VoD SRM) configures the session such that any advertisements or promotions that are spliced into the content stream are taken from the advertising server, the latter which is configured to store and retrieve an advertising/promotional playlist that is particularly relevant to that subscriber's demographic or psychographic. In one variant, the hashed tuner variable or MAC address for the subscriber's CPE is stored in a correlation database within the advertising server (or associated asset, such as an MSO subscriber database). The correlation database associates each particular user or groups of users with an existing (or even spontaneously generated) playlist. For instance, one embodiment uses the subscriber's unique identity information (e.g., tuner or MAC hash) to recall a predetermined playlist or sequence for that subscriber, which may consist of only one advertisement in some cases. The recalled playlist is then implemented by splicing the appropriate advertising content into the VoD stream at the appropriate location(s), using e.g., splicing techniques described elsewhere herein.

Alternatively, the aforementioned hash or other descriptive information can be used to access a demographic profile associated with that subscriber, which is then processed by a computer program (e.g., APCSM) so as to identify corresponding advertisements, such as via searching for metadata matches as previously described. This approach has the advantage of generating the playlist at time of delivery (versus perhaps hours, days, or weeks in advance), thereby avoiding stagnation or obsolescence or one or more advertisements on the playlist.

Myriad other approaches for generating a relevant playlist will be appreciated by those of ordinary skill given the present disclosure.

In another variant, a broadcast delivery paradigm (e.g., BSA) is used, and the playlist may be selected based on one or a plurality of subscribers that may fall within the target demographic. For instance, at a high level of granularity, it may be known that most or at least a significant fraction of the subscribers in a particular service group fall within a particular demographic (e.g., males living in zip code 92131). Hence, an advertisement or playlist of advertisements directed at this demographic can be inserted into the broadcast streams delivered to that service group, under the presumption that at any given time, the fraction of subscribers watching programming on those channels will generally correlate to that of the larger population (i.e., all subscribers in that service group).

At a finer level of granularity, individual subscribers within the service group can be targeted, such as by detecting their tuner activity (e.g., MAC address in an upstream switching or channel change request, etc.), their program streams configured to obtain the advertising from the aforementioned personalized source at relevant points within the broadcast program stream. It is really of little concern whether other subscribers not within the demographic are also tuned to the same program channel(s) as the one or more subscribers of interest within the demographic; since the exemplary business model described herein is predicated upon number of impressions within the demographic, there is no real penalty for "misses" (i.e., impressions by viewers outside of the target demographic), so long as the requisite penetration within the demographic occurs. Of course, there may be competing interests from the standpoint that the advertising slots within a given program channel may be more effectively used by another advertisement that more closely maps onto the then-existing statistics of the viewing subscribers, such as where the majority of current viewers are female in the foregoing example. However, the relative cost/benefit of various options can be weighed and evaluated using the APCSM process (or NOC process) referenced elsewhere herein, and a selection made.

It will be appreciated that the foregoing exemplary implementations using a "personalized advertising stream" share the common feature of being optionally decoupled from the program content with which the advertising or promotions are delivered. For instance, in one variant, the content of the advertisement or promotion placed on the playlist for a subscriber or group is completely decoupled from the context of the program content, being selected rather based solely on the demographic and/or psychographic of the relevant subscriber(s). Alternatively, the advertisements on the playlist can be selected so as to further (or even only) satisfy a contextual correlation between the advertisement and program content as described elsewhere herein.

Control and Tracking of Impressions—

As described elsewhere herein, the network operator utilizing various embodiments of the present invention can also optionally control and track the type of viewer experience or impression for a given advertisement. For example, one type of impression would be viewing an advertisement that is broadcast mid-way through the corresponding content program. Another type of impression would be viewing an advertisement at the beginning or end of the program. Yet another type of impression might relate to use of one of a plurality of variants of the same advertisement (e.g., same advertiser, product and/or service, but different setting or genre). Still another type of impression might comprise one of a plurality of durations of the advertisement (e.g., 5- or 10-second "shortie" versus a full 30-second advertisement). As yet another option, the encoding or other media-related parameter may be varied across types of impressions (e.g., HD versus SD).

The MSO can further optionally track the behavior of one or more viewers during the broadcast of the advertisement. For example, in one variant, the interaction of the viewer with their CPE can be used to assess degree of penetration. In the case of so-called "telescoping" advertisements or promotions (see, e.g., co-owned U.S. patent application Ser. No. 10/662,776 entitled "System and Method for Advertisement Delivery within a Video Time Shifting Architecture" filed Sep. 15, 2003, and issued as U.S. Pat. No. 8,214,256 on Jul. 3, 2012, incorporated herein by reference in its entirety, for one exemplary embodiment thereof), subscribers who telescope are assumed to have at least some level of interest in the product or service advertised, therefore indicating some level of success or efficacy in the advertisement. Additional factors can be used to more accurately divine the level of subscriber interest, such as e.g., follow-on requests for information on the subject matter of the advertisement, persistence of the telescoped window or GUI (i.e., how long they keep it open or interact with it), repeat telescopes or interactions (thereby ostensibly indicating a higher level of interest, much as when an individual repeatedly views the same pictures of something or particular interest to them), and so forth.

Similarly, if the viewer changes channels or pauses (e.g., VoD or nDVR) in the middle of the advertisement, this is perceived by the operator (and hence advertiser ultimately) to indicate affirmatively that the viewer is not interested in the advertised or promoted product or service.

This underscores another salient advantage of the invention; i.e., the ability (if desired) to utilize feedback or indirect information relating to user impressions that varies in confidence level, and the ability of the MSO and/or advertiser to make use of this information. Hence, for example, an affirmative channel switch during an advertisement is considered a reliable and high-confidence indication of no interest by that viewer in the material broadcast. The converse, however, is much lower confidence; i.e., that fact that the viewer did not switch the channel during the advertisement does not necessarily mean that the viewer is interested; they may have simply been distracted, ambivalent, or too lazy to pick up the remote and change it.

As will be appreciated by those of ordinary skill, other indicia of a user actually viewing an advertisement (impression) versus merely being tuned to it and having no cognizance thereof, may be utilized consistent with the invention, such as e.g., the interactive client application discussed subsequently herein.

Moreover, various indicia of "negative" viewing may be used to affirmatively determine that the subscriber is not interested in, and/or has not had a valid impression, a particular advertisement may be used consistent with the invention. For example, the MSO might monitor the status of the CPE 106 during the advertisement or promotion for, inter alia, its power state (on or off), existence of any logged hardware or software errors that would preclude viewing, the power state of a connected monitor, the absence of any tuning events for a protracted period of time (despite the CPE being powered up), etc. If the CPE and/or monitor are off, for example, it is a strong indicator that the advertisement was not viewed.

In one variant of the invention, the MSO installs a small client application on the CPE 106 of participating subscribers which the subscriber agrees to interact with during viewing. In one embodiment, this application generates an unobtrusive on-screen display that asks the subscriber questions regarding what they are viewing or have viewed. In another embodiment, the subscriber merely uses the client application to provide the MSO his/her viewing status (e.g., "Away from my TV" or "Offline", akin to well known instant messaging (IM) applications now ubiquitous on personal computers). For example, the user may merely push a button on their remote to select the "Away" or other option as applicable. The MSO can then know with greater confidence which advertisements or promotions the subscriber has actually viewed (or at least which ones they have not viewed).

It will also be appreciated that the aforementioned status or impression-related indicia may be obtained on a sampling basis from the target demographic, and extrapolated. For instance, where the target demographic comprises 1,000 subscribers, yet only 100 have opted-in for the MSO program to collect data on their viewing habits and personal demography, the results obtained from these 100 participants can be at least somewhat reliably extrapolated to estimate the behavior of the 1,000 subscriber pool as a whole, assuming that the 100 participants are at least somewhat normally distributed within the larger statistical population. For example, if 75 of the 100 participants tune away during a given advertisement, it is a pretty safe bet that the advertisement had low efficacy for that demographic as a whole (or the wrong demographic has been picked). Statistically, of course, it is possible that the aforementioned 75 were out on one end of the probability distribution (e.g., $3\sigma$), and represent a departure from the overall behavior of the group of 1,000; however such statistical distribution can be taken into account in the reliability or confidence of the data. For instance, if the selected subset of the population is 100 of 1000, this data would be given a lower confidence rating than data obtained from 300 of 1000 subscribers.

The apparatus and methods of the present invention further allow for various types of business models (described subsequently herein), as well as having significant implications for the effectiveness of the advertising or promotion ("Quality of Efficacy", or QoE). Specifically, the ability to accurately target demographics or psychographics within the MSO subscriber pool allows the MSO to provide at least some assurances regarding efficacy. In one variant, the degree of efficacy is determined indirectly by evaluating both the number of impressions and the correlation between the advertisement and the viewing subscribers. At a very high level of granularity, the MSO might provide information to the advertiser indicating the number of impressions within the target demographic that has been achieved (e.g., the MSO provided 1,000 impressions within 24 hours within the target 18-30 year-old female demographic). As more specificity is added to the target demographic profile (e.g., 18-30 year-old female college students living in zip code 92101 with incomes between $20,000 and $30,000/yr.), the degree of viewer-to-advertisement correlation can be better assessed. For instance, of the aforementioned 1,000 impressions, 50 may have met all of the demographic elements (100% correlation), 150 met four of the five criteria (80% correlation), 300 met three of the five criteria, 700 met two of the five criteria, and so forth. This type of information can be used by the MSO and/or advertiser as a indirect metric of efficacy or penetration. Other types of information can included, such as for example: (i) how many of those impressions occurred at various points relative to a given program (e.g., how many were "midstream" in a given program, regardless of what that program was), (ii) what program(s) were each "impression" associated with; (iii) how many occurred in prime-time or other periods of interest; and so forth. Hence, the MSO can maintain detailed statistics in an advertising or similar database regarding the actual implementation of each different advertisement, and provide this information (at any level of specificity or according to any "slice" of the data) to the advertiser so that they may gauge the effectiveness of their advertising. They may even sell this information to third parties or other advertisers, in effect giving the latter a direct window into the habits and demography of cable or satellite network subscribers.

Where a commerce channel is also accessible, more "direct" effectiveness measures such as number of advertised widgets sold over the Internet after the advertisement, number of people coming into a car dealership saying the saw the advertisement, etc. can also be melded with the indirect information to form a more complete picture for the advertiser or promoter.

It will be recognized that the foregoing "feedback" data can also be used by the MSO and/or advertiser for dynamic adjustments to the prescribed advertising implementation scheme. For instance, in one embodiment, the aforementioned detailed correlation data (i.e., 50 met all of the demographic elements (100% correlation), 150 met four of the five criteria (80% correlation), 300 met three of the five criteria, and so forth) would be used as a basis of changing one or more targeting or operational parameters within the network during the "run" of a given advertisement. The aforementioned correlation numbers for example indicate that there was fairly poor correlation to the demographic, in that only 50 of 1,000 impressions (5%) met all demographic requirements of the advertiser. As data is obtained during the broadcast schedule of the advertisement (say, over the space of a day or week) indicating such a poor correlation, the MSO might alter its placement strategy, such as by shifting the delivery schedule earlier in the evening on a Friday night before the target college students go out to parties, clubs, concerts, etc. The adjustments can be directly coupled to the statistics; e.g., if the demographic factor that is not being met is the income level, then maybe the MSO needs to shift the advertisement delivery into zip codes with higher or lower per-household income, as applicable. These types of adjustments can be performed dynamically by the APCSM process, under MSO manual control, or both.

Moreover, as demographics of one or more users changes with time (e.g., 18-30 year old females tune away), the advertising content can be changed accordingly. Advantageously, these changes need not be at program boundaries, as in many prior art approaches. Consider for example the case where most or all CPE within a service group tuned to program channel X (airing American Idol at that time) are 18-30 year old females. Effective penetration or "impressions" would likely occur for an advertiser by airing their advertisement targeted at this demographic during that period. However, conventional program-based advertising might indicate that if American Idol were followed by an episode of "24", many or most of those 18-30 year old females would tune away, thereby causing the prospective advertiser (via the MSO) to not play its advertisements during the "24" slot. Yet, if the actual tuning data and subscriber profile data indicate that for whatever reason 18-30 year old females are continuing to watch 24, the MSO utilizing the APCSM 401 of the present invention in their network could dynamically alter the advertising lineup (e.g., move a scheduled advertisement for a different demographic, such as 45-60 year old males, to another slot somewhere else, and instead insert an advertisement for the 18-30 year old female demographic). Simply stated, one configuration of the present invention allows for dynamic placement of advertisements based on real-time feedback and network conditions, as opposed to a predetermined projection of who will be on what channel and when.

Multiple and Alternate Delivery Paradigms—

Additionally, it will be recognized that the methods and apparatus disclosed herein may be applied to video-on-demand (VoD) and network DVR (nDVR) or personal video recorder (PVR) delivery paradigms. As is well known, these delivery paradigms provide for effectively individualized subscriber content delivery which can be initiated (and controlled) by that individual at any time they wish. For example, the nDVR architecture allows consumers of video content to customize their viewing experience, including the ability to pause live broadcast television, restart or rewind shows currently in progress, fast forward and rewind pre-recorded programs and record multiple programs simultaneously.

These individualized delivery paradigms provide new opportunities for the delivery of advertisements, such as targeted advertisements delivered with on-demand video assets, as well as playback of prerecorded programs with additional or replacement advertising through the functionality that the VoD/nDVR/nPVR architecture provides.

For example, in the context of the present invention, since the individual subscriber requesting e.g. a VoD session is known (whether actually or by their anonymous identification information such as a hash), their associated demographic or psychographic may also be known, and hence an advertiser seeking to access that demographic can be virtually assured a viable impression by that subscriber (in effect a captive audience of one). Similarly, the nDVR user who requests replay of a previously broadcast from the network is known (as is their demographic), and targeted advertising can be inserted in such a case as well.

Moreover, the insertion of targeted advertising or promotional content can be orchestrated across multiple delivery paradigms in order to achieve the desired degree of penetration or "impressions". For example, an advertisement may be spliced into certain broadcast program streams (such as via the aforementioned BSA infrastructure), a corresponding advertisement spliced into a VoD session (e.g., before the feature starts), and another corresponding advertisement spliced into an IP stream delivered over an in-band or DOCSIS downstream channel (e.g., IPTV), such as the contextually related links or advertisements described in co-owned U.S. patent application Ser. No. 11/198,620 entitled "METHOD AND APPARATUS FOR CONTEXT-SPECIFIC CONTENT DELIVERY" filed Aug. 4, 2005, and issued as U.S. Pat. No. 9,286,388 on Mar. 15, 2016, incorporated herein by reference. Audio-only versions may also be delivered over, e.g., VoIP.

Session-over-cellular channels such as those described in co-owned and co-pending U.S. patent application Ser. No. 11/258,229 entitled "METHOD AND APPARATUS FOR ON-DEMAND CONTENT TRANSMISSION AND CONTROL OVER NETWORKS" filed Oct. 24, 2005, incorporated herein by reference, may also be utilized. For example, as described in the foregoing application, a network subscriber might utilize their cellular phone to request VoD-over-cellular or broadcast-over-cellular content delivery; e.g., an instructional video on how to change the flat tire on their Jaguar XJ8. Upon receiving this request, the MSO might route it to the APCSM process for analysis, and based on the APCSM determining that it is an automotive-related and tire-related video request, dynamically splice in a short advertisement for local tire stores or repair services.

The foregoing heterogeneous delivery modes may also provide very different correlation or impression rates, thereby causing adjustment by the MSO as previously described. For instance, a given subscriber might be willing to sit through a Ford car advertisement in their living room, but not on their PC or cellular phone.

Moreover, the format and encoding (and even in some cases the content itself) must be selected so as to be appropriate for the selected delivery mode. For instance, the MSO could not deliver a high-bandwidth HD-encoded version of a commercial to a cellular subscriber with only a limited display environment and processing (as well as communication bandwidth). Hence, the present invention contemplates the use of multiple formats and encodings of advertisements and promotions from which the MSO can select (e.g., HD full-length version, H.264 version, "micro" shortie version for handhelds, etc.).

Targeted advertising or promotion may also occur incidentally or in an ad hoc fashion, or as part of other communications; e.g., delayed content delivery notifications (see co-owned U.S. patent application Ser. No. 11/706,620 entitled "METHODS AND APPARATUS FOR CONTENT DELIVERY NOTIFICATION AND MANAGEMENT" filed Feb. 14, 2007, and issued as U.S. Pat. No. 9,270,944, incorporated herein by reference), on-screen displays associated with download and recording functions (see co-owned U.S. patent application Ser. No. 11/080,693 entitled "METHOD AND APPARATUS FOR NETWORK CONTENT DOWNLOAD AND RECORDING" filed Mar. 14, 2005, and issued as U.S. Pat. No. 8,028,322 on Sep. 27, 2011, incorporated herein by reference), and the like.

Hence, the present invention advantageously provides a great degree of flexibility in not only the delivery mode, but also the delivery time, delivery format/encoding, the targeted subscriber(s), and the contextual correlation between the delivered advertising or promotional content and the primary content (e.g., movie, program, etc.) with which it temporally corresponds.

In another aspect of the present invention, advertising or promotional content can be statically or dynamically inserted into content that is delivered to remote network nodes (e.g., "slung" to a remote subscriber location when that subscriber is not at their premises). See, e.g., co-owned U.S. patent application Ser. No. 11/441,476 entitled "SECONDARY CONTENT INSERTION APPARATUS AND METHODS" filed May 24, 2006, issued as U.S. Pat. No. 9,386,327 on Jul. 5, 2016, and incorporated herein by reference in its entirety, which describes exemplary methods and apparatus for delivering content to a secondary location via a personal content server or PCS (including selective substitution of advertising or promotional content more germane to the secondary location and/or delivery time). Hence, in one embodiment, the APCSM 401 described herein may communicate with the aforementioned PCS to select advertising/promotional content that is optimized for such instances.

Advertising and Promotional Content Selection Module (APCSM)—

FIG. 4 illustrates one exemplary network configuration comprising a modified architecture in accordance with one embodiment of the present invention. In this embodiment, the headend 150 has been modified to include an Advertising and Promotional Content Selection Module (APCSM) 401 used to implement various of the functions described herein. The exemplary APCSM 401 comprises additional modules adapted to, inter alia, facilitate advertising or promotional content identification and assignment based on received information about one or more groups of content consumers, as previously described with respect to FIGS. 2-3a herein.

The exemplary APCSM 401 of FIG. 4 comprises a subscriber information repository or database (SID) 402, an information analysis module (IAM) 404, and a content assignment module (CAM) 406, as shown. These three modules interact with one another as described below in order to provide the requisite targeted delivery functionality.

Initially, personal information is collected about one or more network users. In some variants, this information may include one of, or combinations of, the following characteristics: name, address, age, race, ethnicity, gender, anatomical dimensions (height, weight, etc.), physical/mental conditions, marital status, family size, number of dependents, sexual orientation, religious persuasion, political affiliation, net worth, annual income, types of automobiles owned, number of automobiles owned, country of citizenship, languages spoken, occupation, hobbies, and personal preferences. Myriad other informational characteristics may also be collected without departing from the scope of the present invention.

In some embodiments, at least a portion of this information is self-reported by the consumer. For example, the information might be taken from a questionnaire or a form filled out on-line (e.g., at a designated website), via an on-screen interactive display after the user's cable or satellite service is established, via mail (or e-mail), or at the MSO's office, upon a service activation request and/or renewal. Hand-held wireless devices such as PDAs or the like may also be used, allowing the user to fill out the questionnaire easily using e.g., a touch-screen display. In one such variant, a touch-interactive GUI (such as that on the exemplary Apple iPhone™) is used to present the user with a sequence of questions to which they may select from two or more answer options. Users may also be offered incentives or other consideration for participating.

From a user participation perspective, it is also noted that the promise of enhanced services delivered to the subscriber may be used as an incentive to participate. For example, a subscriber knowing that the types and content of advertisements and promotions they view will be much more closely tailored to their particular needs or interests will in many cases be willing to expend the extra effort needed to fill out the survey (and perhaps maintain and update it periodically over time). Financial or other such incentives may be offered as well, such as where the subscriber receives an X % discount on their monthly bill for each month that they participate.

Similarly, the present invention contemplates that subscribers may given a choice as to whether to "opt-in" or "opt-out" of the information collection process in general. In one variant, the user can control access to various types of information such that only the information that the user has affirmatively designated is eligible for collection and/or analysis. For example, a given user may grant access to information about his historical viewing patterns (such as most frequently requested programs), but deny access to more personal information (such as age, income, and occupation).

As described elsewhere herein, certain embodiments of the invention also completely insulate the user's actual identity so as to maintain privacy, such as via a cryptographic hash or other security mechanism, limits on the type and specificity of information collected and stored, or both.

The collected information is then input into a storage medium comprised within a user information repository 402 such as a RAID-protected database, which is adapted to organize and store the information accordingly in corresponding data structures (e.g., files).

Alternatively, the gathering of information about the subscriber may be completely passive (i.e., no affirmative user participation or submission of information required), such as where viewer tuning habits, upstream requests (e.g., PPV or VoD), service calls, etc. are passively analyzed. This passive collection and evaluation may or may not be with subscriber permission, depending on e.g., the business and legal considerations relating to collection of such data, and/or the subscriber "opting into" the program.

In some embodiments, at least a portion of the subscriber-related information (e., tuning activity, etc.) is passively obtained by one or more automated processes (algorithms) within the APCSM 401. These automated processes may be resident locally (for example, at the CPE 106 or service area node 414), or alternatively, the processes may be resident at a remote location (for example, at the distribution node 412 or cable headend 150).

Subscriber-related information can also be passively estimated or extrapolated as described elsewhere herein. For example, if the consumer has viewed one or more French language channels for more than ten hours during a given week, an automated process may use this information to predict that the consumer can speak French, is a Francophile, and/or is of French descent. Upon obtaining or extrapolating this information, the APCSM 401 facilitates updating that subscriber's entry in the user information repository 402 accordingly.

Optionally, a consumer's historical viewing patterns may be recorded in the user information repository 402 as well. For example, certain information collected may indicate that the consumer in question: (i) watches the Golf Channel every week for at least three hours, (ii) changes channels on average three times every ten minutes, (iii) has never requested content on Sunday evenings for the last eight months, (iv) mostly frequently requests channels 25, 45, and 48, and (v) most frequently requests "Friends" and "The Daily Show." This information can be subsequently synthesized with the user's self-reported and estimated personal characteristics in order to generate a profile within the database 402 which uniquely describes that consumer. This report can be rendered in both computer- and human-accessible form (e.g., XML) so as to enhance its utility.

In some embodiments, at least a portion of the user information which could be used to personally identify a particular content consumer is first hashed, scrambled, or otherwise enciphered, as previously described with respect to FIGS. 2-2c herein. In this manner, subscriber privacy is effectively maintained if desired. In other embodiments, at least a portion of the user information which could be used to personally identify a particular content consumer is simply not transmitted or received in the first instance. Advantageously, this provides additional privacy protection and requires no additional logic for resident hashing, scrambling, or enciphering processes.

In another embodiment, the consumer's historical viewing patterns are stored locally on the CPE 106 (such as via a client application running thereon), and transmitted to the headend via OOB frequencies, over a DOCSIS channel, etc. In some embodiments, raw data received from the CPE is subsequently abstracted or generalized, and this generalized data is stored in the user information repository 402 in addition to (or in lieu of) the raw data itself. For example, the raw data from a given consumer viewing pattern during a given week n may indicate that the consumer watched the Disney channel on Monday-Friday from 3:00-6:00, and on Saturday and Sunday from 10:00-8:00, whereas the generalized or abstracted data may merely indicate: "Week n, Disney, 35 hrs." Myriad other forms of abstraction and generalization are also possible in accordance with the scope of the present invention.

Once the foregoing information has been successfully collected or otherwise provided, the user information repository 402 will then contain one or more of: (i) the self-reported personal or demographic characteristics of one or more content consumers, (ii) any estimated or extrapolated personal characteristics of those consumers, and/or (iii) the historical viewing patterns of those consumers. In this manner, relevant data can be subsequently extracted for analysis and subsequent data generation, such as by the information analysis module 404.

In one embodiment, the information analysis module 404 of the APCSM 401 retrieves data from the user information repository 402, analyzes the retrieved data, and generates an output based at least in part on this analysis. This output can be streamed directly to the requesting module and/or cached in a storage medium in order to expeditiously service subsequent requests of a similar nature. In some variants, the cache is first accessed in order to determine whether a similar request has already been serviced in a relatively recent time period. This time period can be adjusted by an operator in accordance with a one variant of the present invention. In this manner, repetitive processing associated with data parsing can be eliminated or reduced substantially, thereby increasing overall system performance.

In one embodiment, a request received by the information analysis module 404 is accompanied by certain input arguments or parameters, which are used to indicate the type of operation requested. For example, the information analysis module 404 may receive a request to determine how many consumers have watched ESPN for more than fifteen hours in the last three days. Alternatively, the request may consist of determining the set of content consumers in a given service area or zip code who are older than 55 years of age. As yet another example, the request may consist of determining the percentage of content consumers currently requesting content from the Home Shopping Network and that have a self-reported household income of less than $35,000/yr. The above examples are merely illustrative in nature; myriad other requests are also possible in accordance with the scope of the present invention.

The information analysis module 404 then retrieves the data necessary to facilitate servicing the request from the user information repository 402. As mentioned above, the data stored in the user information repository 402 can be raw data, generalized or abstracted data, metadata, or any other form useful to the analysis module 404.

In some embodiments, the information analysis module 404 then parses the data in order to extract relevant information. In one variant, the information's relevancy is governed by the input arguments or parameters passed to the information analysis module 404 along with the request. In another variant, the information's relevancy has already been specified, and is stored with the data. In still other variants, a combination of input parameters and specified relevancy indicators are used.

In alternative embodiments, a database is queried in order to service a given request. In a preferred embodiment, a relational database is utilized, enabling specialized queries to be conducted by selection, projection, and join operations specified by an intermediary interface language. In many cases, these relational database operations provide efficiency increases vis-à-vis the data parsing method described above.

After the relevant data is extracted, the information analysis module 404 subsequently generates an output based upon this data. Per certain embodiments of the present invention, this output may be streamed directly to the requesting module and/or cached to a storage medium. The output data may be used as input to subsequent analysis algorithms associated with the information analysis module 404. For example, a request to determine which consumers are currently requesting content from the Home Shopping Network and who have a self-reported household income of less than $35,000/yr might be handled in the following manner:

a) generate a list of those users who are currently requesting content from the home shopping network,
b) save this output as list #1 in the associated storage medium,
c) generate a list of those users who have a household income of less than $35,000/yr,
d) save this output as list #2 in the storage medium,
e) generate a list of consumers who appear in both list #1, and list #2 (using both list #1 and list #2 as inputs), and
f) f) save this output as list #3.

Note that the output generated by the information analysis module 404 can take on any number of forms in accordance with the present invention. For example, the contents of the output may comprise numbers (real or imaginary), percentages, numeric totals, group lists, member lists, prices, schedules, tables, projections, data aggregations, concatenations of data, and any combination thereof. They may also comprise fuzzy logic, Bayesian, Dempster-Shafer, or Boolean variables or logical relationships as desired. Myriad other possibilities are also contemplated.

Figure 4A:
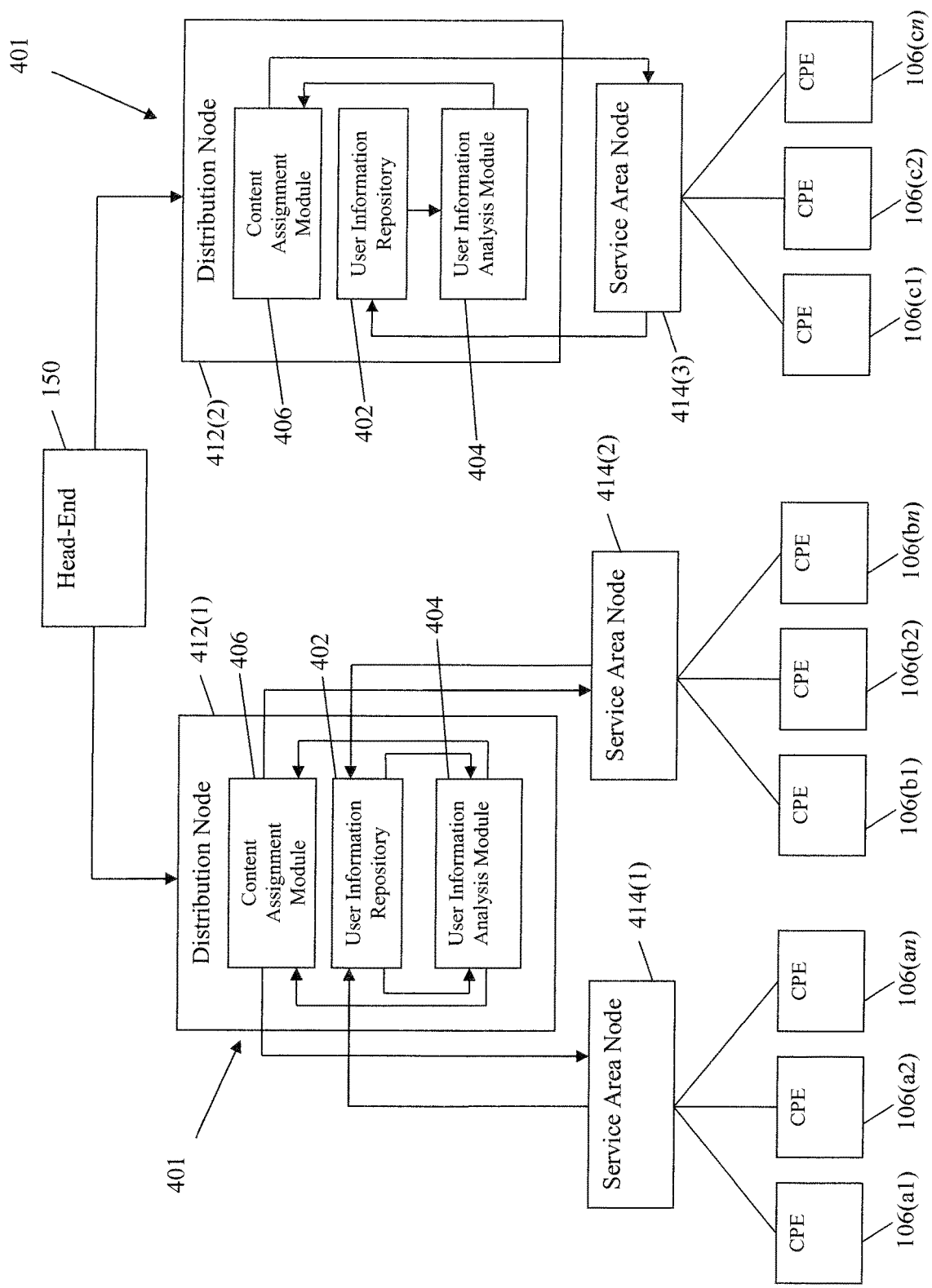
FIG. 4a illustrates a second exemplary network configuration comprising a modified distribution hub architecture in accordance with another embodiment of the present invention.

FIG. 4a illustrates one network configuration comprising modified distribution node architecture in accordance with another embodiment of the present invention. Note that the embodiment depicted by FIG. 4a is similar to the embodiment depicted by FIG. 4, except that the APCSM 401 and its modules (namely, the user information repository 402, the information analysis module 404, and the content assignment module 406) are disposed within one or more distribution nodes 412, as opposed to the headend 150. As FIG. 4a indicates, this modular functionality may be comprised within a single distribution node 412 resident within a corresponding distribution network. In alternative embodiments, the functionality may be spread across multiple distribution nodes 412 resident in the same distribution network.

Relocating the aforementioned APCSM modules closer to the CPE 106 as in FIG. 4a advantageously preserves computational resources of the headend 150 by allowing certain localized content to be sourced directly from a node situated more locally to the target CPE 106. This also ostensibly frees up the transmission path between the source distribution node 412 and the headend 150 (including all distribution nodes located upstream from the source distribution node 412), thus preserving overall network bandwidth.

Figure 5:
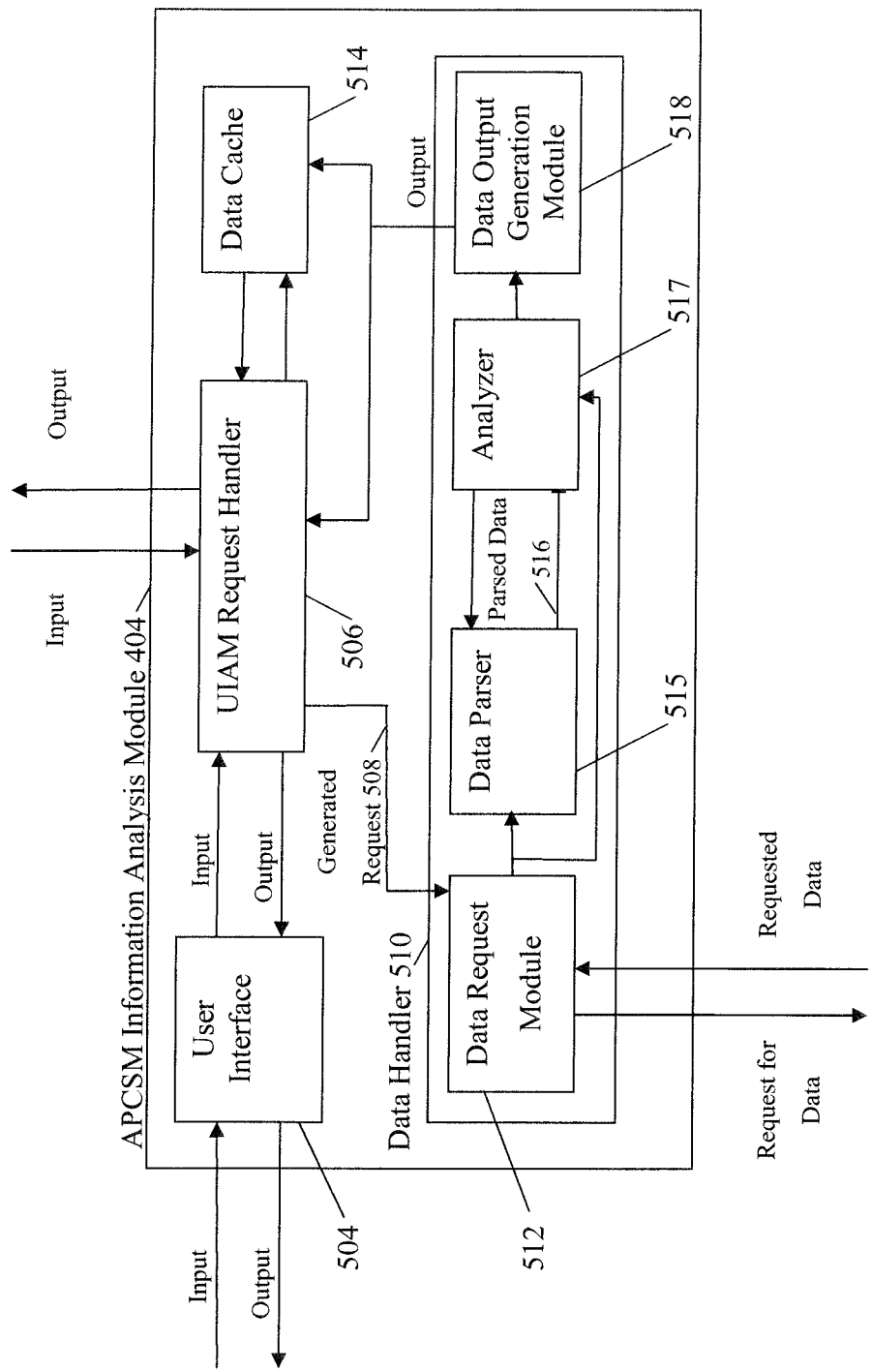

FIG. 5 illustrates one embodiment of the information analysis module 404 as depicted in FIG. 4. The information analysis module 404 comprises a IAM request handler 506, a data handler 510, and optionally, a user interface 504. According to one embodiment, the information analysis module 404 is adapted to analyze user information in order to service requests received from requesting network modules.

According to the embodiment depicted by FIG. 5, the IAM request handler 506 is adapted to receive and service requests for user information. These requests may be generated according to substantially automated processes (for example, as by a content assignment module 406), or these requests may be input manually (for example, as by a human operator providing input to connected user interface 504). Depending on the types of requests received by the request handler 506, multiple operations may be required, such as a request to determine which consumers are single, presently under the age of 30, and who have a self-reported income of more than $40,000/yr. In many embodiments, input arguments are used in order to designate the requested parameters and operations.

In one embodiment, a data cache 514 is accessed by the IAM request handler 506 in order to retrieve the results of recently serviced requests. This data cache 514 may comprise any combination of volatile and/or non-volatile storage or memory. If the serviced request is relatively recent and located within the data cache 514, the IAM request handler can service the request merely by retrieving the stored output corresponding to the previous request. In this manner, computational resources are preserved as duplicative processing is averted. Speculative pre-fetch type approaches for caching data within the cache 514 can be used as well, such as for example where the APCSM logic estimates or speculates that the demand for a particular type of information (or particular subscriber's or group's information) may be high due to historical data, anecdotal data or signals, etc.

If the requested output does not appear in the data cache 514, or if a data cache is not used, the IAM request handler 506 transmits the generated request 508 to the data handler 510. According to a preferred embodiment, the data handler 510 is adapted to request data necessary to service the request from the user information repository 402, analyze this data, and generate one or more outputs corresponding to the generated request 508.

In one embodiment, the data handler 510 comprises a data request module 512, a data parser 515, a data analyzer 517, and a data output generation module 518. In those variants where a relational database is queried in order to retrieve the requested data, the data analyzer 517 and/or the data parser 515 can be omitted.

In the embodiment depicted by FIG. 5, the data request module 512 is adapted to determine the data necessary to service the generated request 508, and to request such data from the user information repository 402 or other data source (e.g., outside of the APCSM 401). Upon receiving this data, the data is transmitted to the data parser 515 and analyzer 517 modules.

In one embodiment, the data parser 515 scans through one or more lines of a flat file in order to highlight or extract out relevant information. For example, given an input list of all user records stored within the user information repository 402, the data parser 515 may select only those entries in the record which indicate that the consumer is female. In some embodiments, the analyzer 517 controls the data parser 515 by providing it with a set of commands to be performed with respect to a given data set. For example, the analyzer 517 may request that the data parser 514 parse its output list of female consumers in order to determine which entries indicate that this consumer is presently serviced in a certain geographic area.

In certain embodiments, the analyzer 517 is further adapted to generate statistical data based on data it receives from the data parser 515 and/or from the data request module 512. For example, the statistical data generated by the analyzer 517 may indicate that 30% of female consumers in the San Diego area have watched over five hours of MTV during the last week, 50% have self-reported annual incomes of over $42,000/yr, and 43% are married. Note that in one embodiment, the default group analyzed (if not otherwise specified by the generated request 508) can be specified; e.g., as the entire group of content consumers presently requesting content over the cable network, or those within a prescribed service group, zip code, etc.

The data corresponding to the generated request 508 is then handled by the data output generation module 518. In a preferred embodiment, the data output generation module 518 receives an output from the analyzer 517, formats the output accordingly, and then routes the formatted output to the data cache 514 and/or IAM request handler 506. This routing may be necessary, for example, in embodiments where multiple IAM request handlers 506 are used. Finally, upon receiving the output from the data output generation module 518, the IAM request handler 506 forwards the output to the requesting module or process accordingly.

Figure 6:
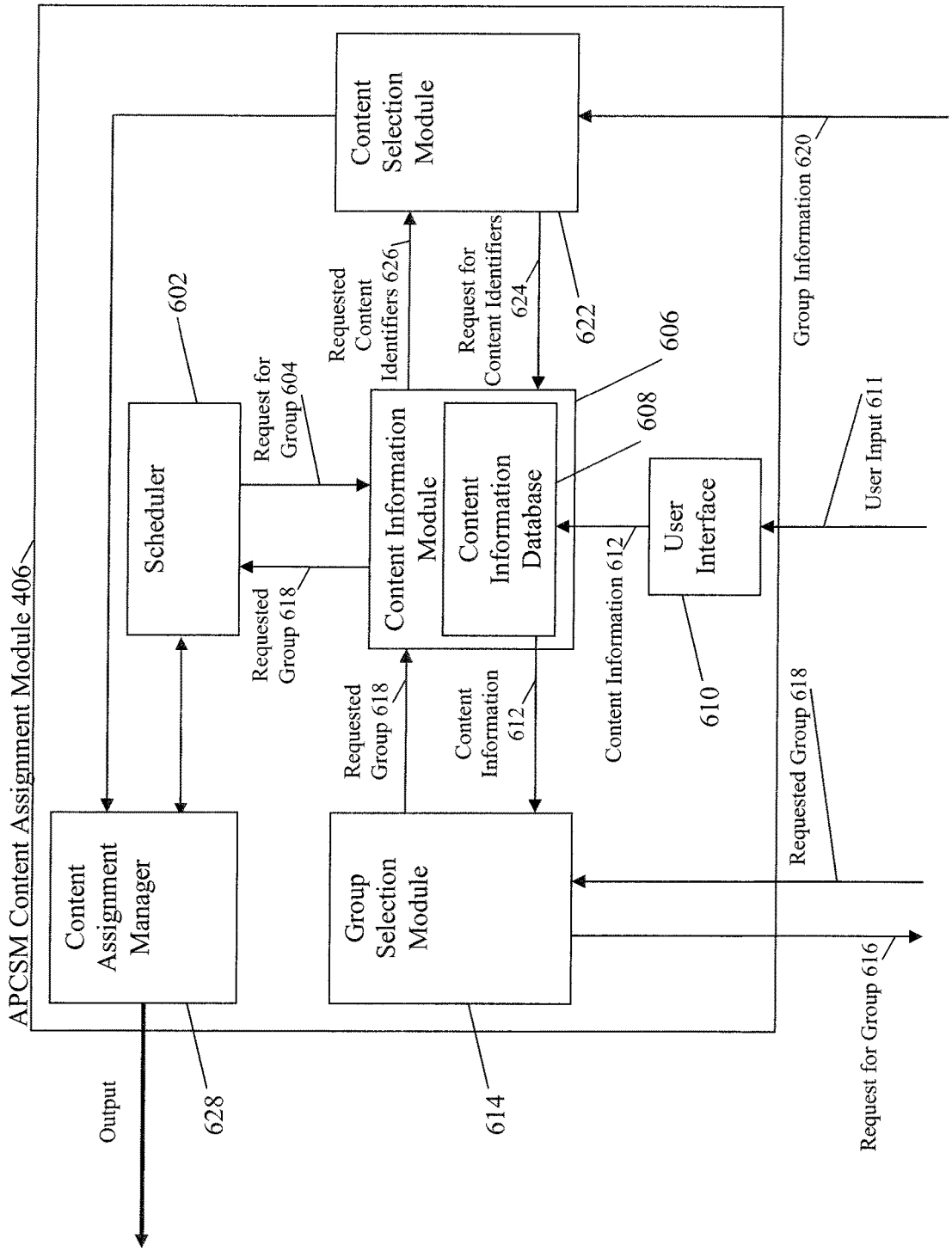

FIG. 6 illustrates one exemplary implementation of the content assignment module 406 as illustrated in FIG. 4; it will be appreciated that this configuration is merely illustrative of the broader principles of the invention, and other configurations may be used with equal success.

The exemplary content assignment module (CAM) 406 of FIG. 6 comprises a scheduler 602, a content information module 606, a user interface 610, a group selection module 614, a content selection module 622, and a content assignment manager 628.

In one embodiment, the scheduler 602 comprises a schedule of advertising or promotional content intended for broadcast over a cable network. For example, the schedule might indicate an SUV advertisement, followed by a diamond ring advertisement, followed by an advertisement for a program soon airing on Discovery Channel. In one mode of operation, the content assignment module 406 is adapted to select an appropriate group (i.e., one or more subscribers) for receiving this advertising or promotional content. Thus, the scheduler sends out a request for a group 604 corresponding to a certain referenced content element, stream or ensemble. In a preferred embodiment, this request comprises a unique identifier to the content stream (such as a sequence of alphanumeric characters which uniquely identify the content element/stream/ensemble).

The request for a group 604 is then received at the content information module 606. In one embodiment, the content information module comprises a content information database 608 adapted to store a set of metadata or other descriptors corresponding to each content element or stream. This set of descriptors is denoted in FIG. 6 as content information 612. In one variant, each descriptor relates to a desired target demographic or psychographic. For example, the advertisement for a program airing on MTV might include the descriptors: "Reality Show," "Teenage," "Drama," and "Music." Other descriptors might include the length or duration, type of encoding, content source, and so forth. The data may also include information on historical use of the content by the MSO; e.g., number of times the content had been delivered, the time at which the content was last delivered, and/or the program channels on which the advertisement was run. Myriad other descriptors have also been contemplated in accordance with the present invention.

In some embodiments, the content information is retrieved based on an indexed lookup of a relational database, such as by a query comprising a primary key. For example, the descriptors listed above might be retrieved by the input of "MTV AD#17," where "TITLE" is the primary key. In alternative embodiments, other data structures may instead be utilized, such as arrays, lists, hash tables, trees, or combinations thereof.

In the embodiment depicted by FIG. 6, content information 612 corresponding to each content element, stream or ensemble is input into the content information database 608 by a human operator interacting at a user interface 610, such as via a user terminal. In alternative embodiments, content information 612 is streamed to the content information database 608 from an outside electronic source, such as a third-party website.

Once the content information 612 is collected, it is then transmitted to the group selection module 614. The group selection module 614 forms one or more requests for a group 616 based on this content information 612. In one embodiment, the group selection module 614 further comprises logic for selecting among various permutations of possible requests based on certain specified priorities. For example, the request might be to identify only those consumers who have an extreme interest in reality-based programming (for example, those consumers who watch over seven hours of programs of the reality genre in a given week). Alternatively, the request might be to identify those consumers with a moderate interest in reality shows (i.e., those who watch at least three hours of reality shows in a given week), a small interest in music (i.e., those who watch at least one hour of music channels in a given month), and who are indicated to have at least one teenager in the household. In some variants, these priorities are indicated explicitly in the content information 612 such that each descriptor comprises an associated priority.

The request for group 616 is then transmitted to the information analysis module 404 (FIG. 5), which returns the requested group 618. This requested group 618 is then ultimately passed to the scheduler 602 along with any associated identifiers. In this manner, the scheduler can populate its schedule with references to optimal groups for each content element/stream/ensemble in its schedule.

In one embodiment, the content assignment manager 628 is responsible for transmitting one or more (group, content) pairs to a content delivery module for content delivery. In some embodiments, content assignment manager 628 keeps track of all content delivered and targeted groups. This can be accomplished, for example, by writing logs and storing these logs to one or more data files stored locally in the content assignment module 404. In certain embodiments, the content assignment manager 628 also updates content information 612 in order to reflect delivery data such as the number of times specific content has been delivered, the time at which the content was last delivered, and/or the program channels on which the content was delivered.

In an alternative mode of operation, the content assignment module 404 is adapted to select content for a designated group.

The content selection module 622 retrieves group information 620 from the information analysis module 404. In some embodiments, this group information 620 comprises a set of group descriptors, such as e.g., "55 and older," "restaurant," "medicine," and "travel." Alternatively, referenced identifiers (such as numbers) can be used to convey the same ideas. In the above example, these descriptors indicate that the designated group comprises a specified number of consumers who are 55 years of age or older, who like to dine in restaurants, who are interested in or utilize medical treatments, and who frequently travel. Optionally, percentages or other such indicia can be used to represent this data, as well as data indicating the number or percentage of consumers who are members of multiple groups.

Once the demographics of the present group have been identified, the content selection module 622 requests the advertising or promotional content identifiers 624 which best match this group information. In one variant, this is accomplished by intelligently searching the content information database 608 and returning the primary key of those entries which match the descriptors present in the group information 620. In embodiments where a relational database is not used, one or more substitute data structures are instead accessed accordingly (such as by returning an array element, traversing a tree, or traversing a linked-list of elements).

According to one embodiment, the requested identifiers are then transmitted to the content selection module 622. The content selection module 622 then determines the optimal content to assign to the present group. This may involve, for example, selecting between multiple possible content elements, streams or ensembles using a specified system of weights or priorities. For example, if it is known that the present group of interest comprises 60% sports enthusiasts and 60% music enthusiasts, and two identifiers have been returned corresponding to an advertisement for a sporting event and an advertisement for a music event, the content selection module 622 may decide to select the advertisement for the music event given that, e.g., this particular advertisement has not been run as often as the other advertisement. Alternatively, the content selection module 622 may decide to select the advertisement for the sporting event if it is determined that the sporting event is scheduled for an earlier date than the music event. Or, it may select both advertisements to be used as an ensemble. Note that the above examples are merely illustrative of general principles; in practice, any means of content selection or content prioritization may be utilized in accordance with the scope of the present invention.

Once the group has been assigned suitable content, this assignment is then conveyed to the content assignment manager 628. As mentioned above, the exemplary content assignment manager 628 is responsible for transmitting one or more (group, content) pairs to a content delivery module for content delivery. According to some embodiments, the content assignment manager 628 also updates content information 612 in order to reflect delivery data such as the number of times specific content has been delivered, the time at which the content was last delivered, and/or the program channels on which the content was delivered.

Software Architecture—

Referring now to FIGS. 7*a*-7*d*, exemplary embodiments of the software architecture useful with the present invention are described in detail. It will be appreciated by those of ordinary skill that while four exemplary embodiments are described herein, other variations and combinations of the following architectures may be utilized depending on the desired attributes and network topology in use.

Figure 7A:
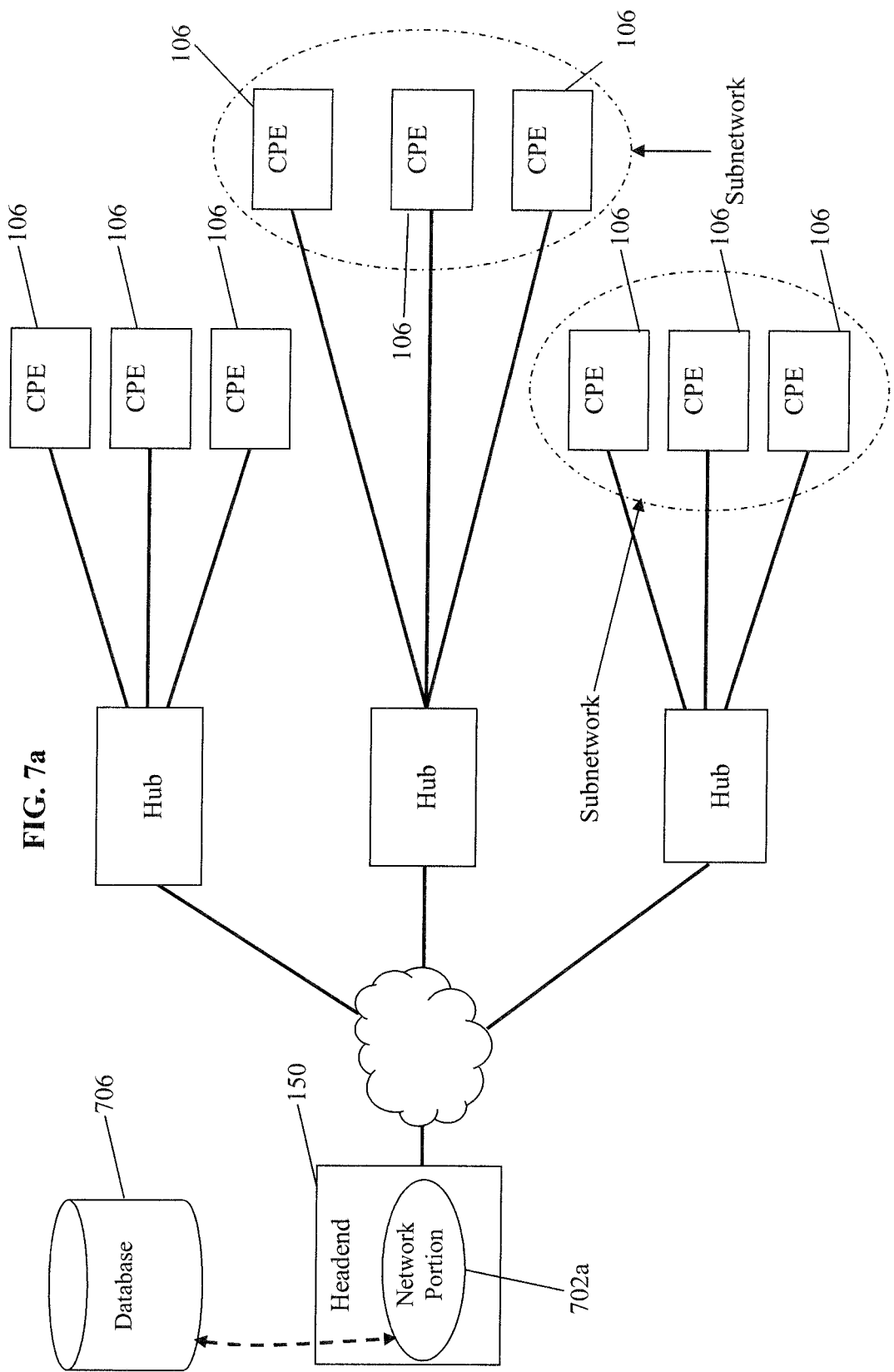
FIG. 7a is a block diagram illustrating a first exemplary embodiment of a network software architecture according to the present invention.

As shown in FIG. 7*a*, a first embodiment of the architecture comprises a network portion 702 of the APCSM 401 software, which effectively functions as a supervisory process, and is in logical communication with a database 706 (which may or may not comprise the user information repository 402 previously discussed with respect to FIG. 4), as well as other network equipment and processes (not shown) in order to effectuate the APCSM process methods and policies as previously described. For example, in one variant, the APCSM network portion 702 is in direct or indirect communication with a BSA switching hub process (not shown) in order to implement program allocation policies. The aforementioned network portion 702 may for example be combined with other network management entities (such as the entity 198 of FIG. 1*c* previously described), or may be stand-alone in nature.

As shown in FIG. 7*a*, not all "subnetworks" in the network need be included within the purview of the APCSM network portion software 702; rather, the methodologies previously described may be implemented on a per-subnetwork (or per-node) basis if desired, although clearly the entire network can be included as well.

It is noted that in the embodiment of FIG. 7*a*, no dedicated client processes or portions (e.g., CPE software) are used; the APCSM network portion 702 analyzes data it obtains from the database 706 (or other such sources, e.g., the user information repository 402) in order to derive its advertising and group selection policies. For instance, the APCSM network portion 702 may access the database 706 in order to determine a demographic/psychographic profile, historical tuning habits, codec capabilities, etc. for each CPE 106 of interest. The BSA server logs that are based on the client-server interactions as previously described may also be utilized for e.g., determination of a "predictive" program lineup for that node and/or estimation of predicted demand (see, e.g., co-owned U.S. patent application Ser. No. 11/800,093 entitled "METHODS AND APPARATUS FOR PREDICTIVE CAPACITY ALLOCATION" filed May 3, 2007, which issued as U.S. Pat. No. 9,398,346 on Jul. 19, 2016, and U.S. patent application Ser. No. 11/243,720 entitled "SELF-MONITORING AND OPTIMIZING NETWORK APPARATUS AND METHODS" filed Oct. 4, 2005, which issued as U.S. Pat. No. 8,582,584 on Nov. 12, 2013, each of the foregoing incorporated by reference herein in its entirety), or even indirect assessment of CPE configuration as described elsewhere herein. Hence, the foregoing methods can also advantageously be implemented in a predictive or "look-ahead" fashion if desired, both in terms of what a given subscriber (or group of subscribers) may request in terms of programming, as well as future projected bandwidth demands and constraints (e.g., as a function of time of day, day of the year, and so forth).

Figure 7B:
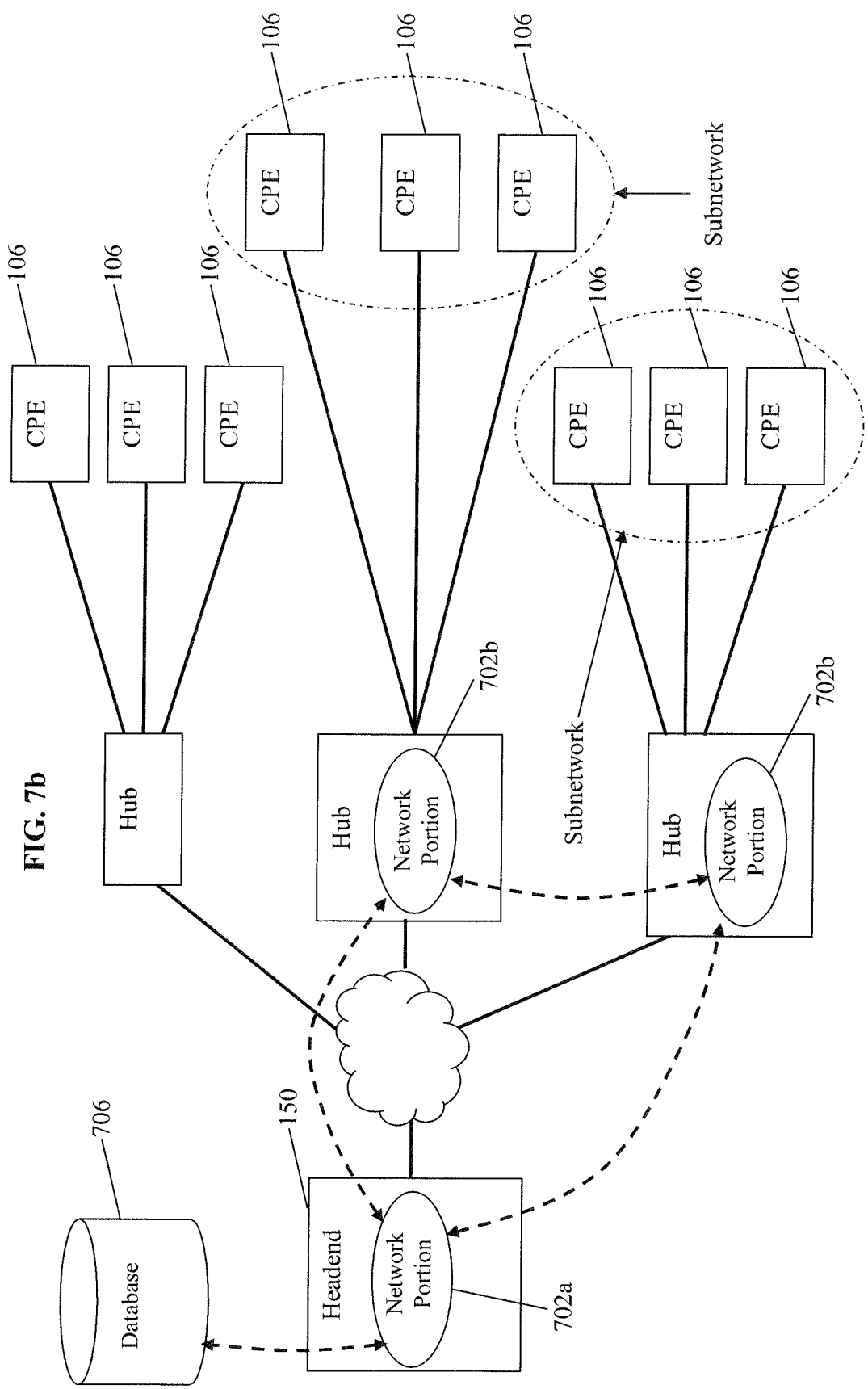
FIG. 7b is a block diagram illustrating a second exemplary embodiment of a network software architecture according to the present invention.

As shown in FIG. 7b, a second embodiment of the software architecture comprises a plurality of APCSM network portions 702a, 702b, in this example disposed at the headend 150 and one or more hubs of the network, respectively. The various network portions 702a, 702b are in logical communication with one another (or at least the hub portions 702b with the headend portion 702a), thereby allowing for sharing of information. The aforementioned database 706 may also be used to provide information relating to subscriber profile and demographics/psychographics, CPE configuration, etc. as in the embodiment of FIG. 7a, thereby obviating the use of client portions within the network. Use of hub network portions 702b as illustrated also allows for a finer level of control; i.e., each hub process 702b can in one variant control advertising/promotion selection or group selection in a substantially autonomous fashion from other hubs if desired. This is to be distinguished from the embodiment of FIG. 7a, wherein the hubs, while in one embodiment in communication with the headend process 702a, have no real innate "intelligence" of their own with respect to implementation of the methodologies previously described. Rather, the hubs (and other device) of the embodiment of FIG. 7a act merely as slaves to implement headend process policies or directives.

Moreover, in the event of a failure or problem with the headend APCSM portion 702a, the individual hub portions 702b can continue to operate (and optionally communicate with one another directly), thereby providing a degree of fault tolerance and redundancy. To this extent, it will be recognized that another variant of the invention utilizes only the hub portions 702b (i.e., without the headend portion 702a) in this fashion, with either local individual databases, or logical connection directly to the "master" database 706 (not shown).

Figure 7C:
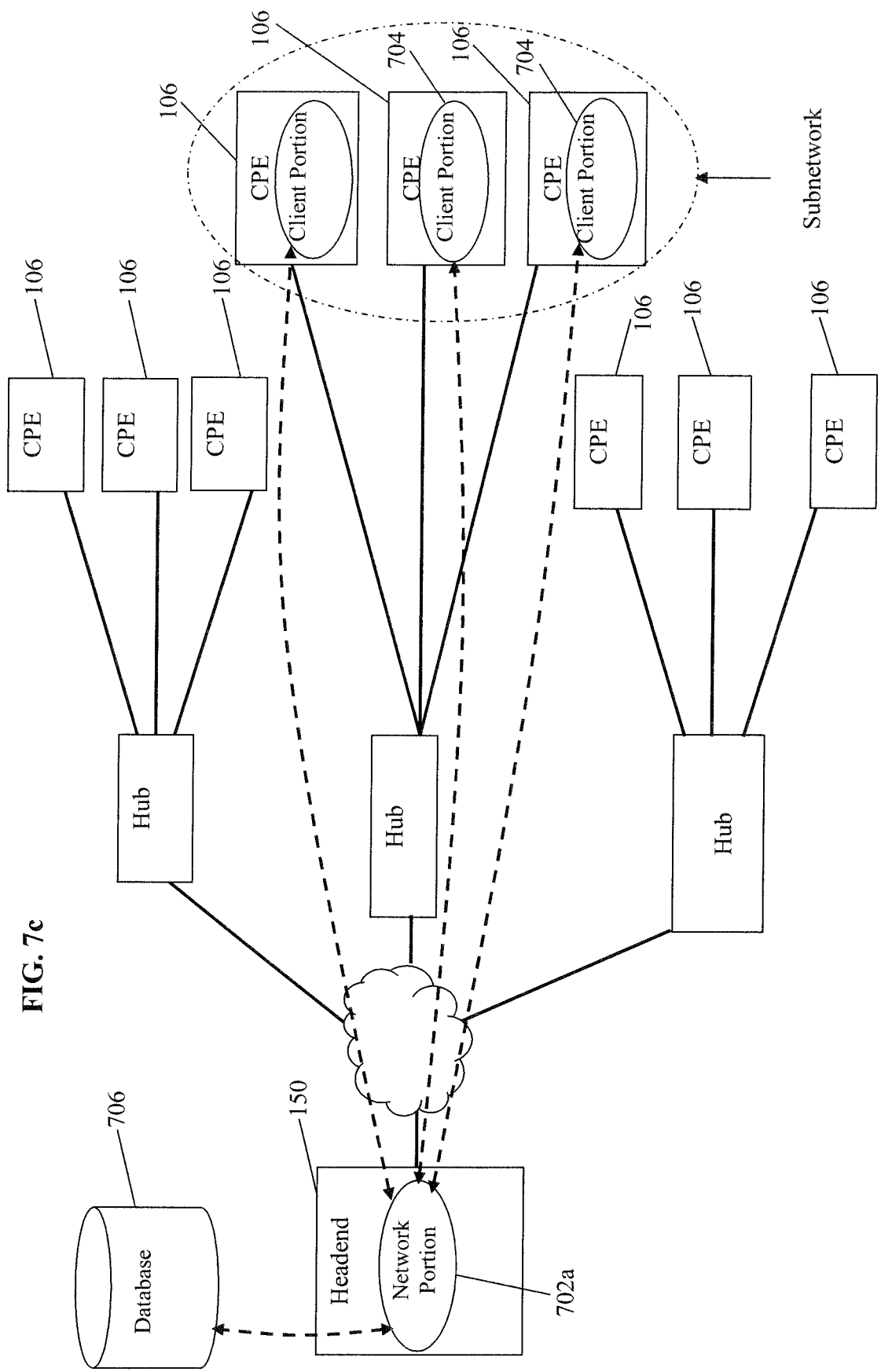
FIG. 7c is a block diagram illustrating a third exemplary embodiment of a network software architecture according to the present invention.

As shown in FIG. 7c, yet another embodiment of the software architecture of the invention comprises a headend APCSM portion or process 702a in logical communication with client (e.g., CPE) portions 704 disposed on all or a subset of the CPE within the network. Such subsets may be organized based on subnetwork/node as shown, or using another scheme. These client portions 704 act as remote proxies for the headend APCSM process 702a, allowing the MSO to control at least aspects of the operation of the CPE 106 having such client portions 704, including notably the collection of CPE configuration information, as well as historical data and even tuning information from the CPE. This approach has the advantage that the MSO can gather much more accurate and relevant information about an individual CPE, including the operation thereof over time. For example, the headend APCSM process 702a can periodically poll the client portions to determine operational status, what channel is currently being tuned to, recent errors that have been logged (e.g., inability to play a certain format of content, resource contention, etc.), and even invoke corrective action if desired. The client portion 704 can also be used to generate notifications, telescoping advertisements, interactive displays or queries on the user's display device or other output device as previously described (e.g., delay notification, request for input regarding optimization/program selection options, etc.). Hence, the client portion 704 of FIG. 7C provides the MSO with a "point of presence" within each CPE as well.

Figure 7D:
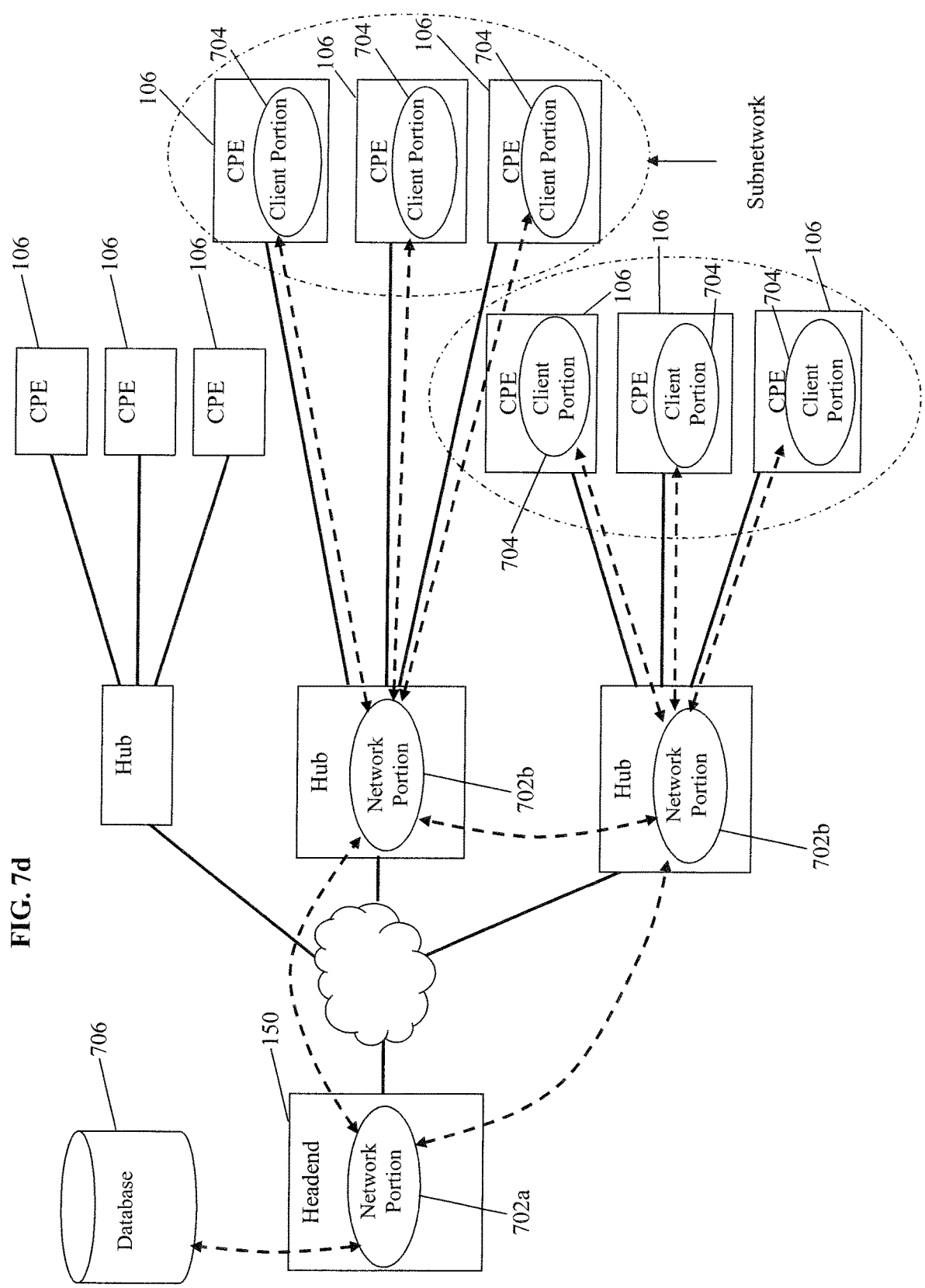
FIG. 7d is a block diagram illustrating a fourth exemplary embodiment of a network software architecture according to the present invention.

Referring now to FIG. 7d, yet another embodiment of the software architecture is disclosed, wherein both client portions 704 and headend/hub network portions 702a, 702b are utilized. This hybrid approach provides essentially all of the benefits of the embodiments of FIGS. 7b and 7d previously described, yet at the price of somewhat greater complexity.

Network Server—

Figure 8:
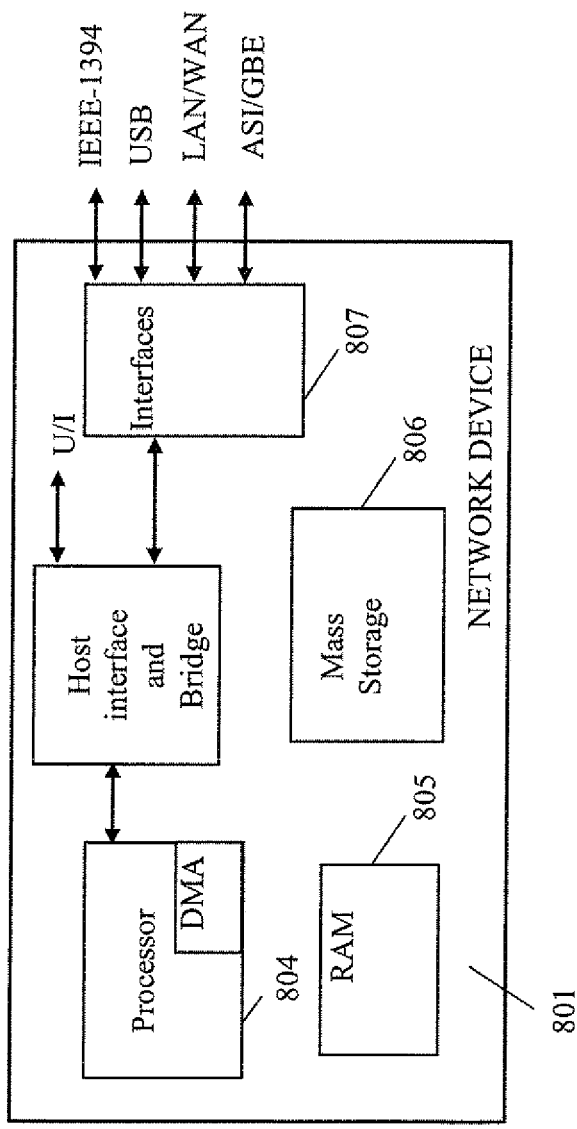
FIG. 8 is a functional block diagram illustrating an exemplary embodiment of a network device with advertising and promotion selection functionality according to the invention.

Referring now to FIG. 8, one embodiment of an improved network device (e.g., server) with APCSM advertising and group selection capability according to the present invention is described. As shown in FIG. 8, the device 801 generally comprises and OpenCable-compliant server module. It will be appreciated that, consistent with which architecture of FIGS. 7a-7d above is selected for use, the server device 801 may be disposed at various locations throughout the network. For example, in one variant, the device 801 comprises a BSA network server module adapted for use at the hub site of FIG. 1c, although the server may comprise other types of devices (e.g., VoD or application servers) within the network as previously described, including those at the headend 150.

The device 801 comprises a digital processor(s) 804, storage device 806, and a plurality of interfaces 807 for use with other network apparatus such as RF combiners, IP routers and other packet network devices, network management and provisioning systems, local PCs, etc. Other components which may be utilized within the network device 801 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data and "rules" interchange between the network device 801 and the CPE where applicable. The APCSM supervisory process software (e.g., the network or hub portion of FIGS. 7a-7d) is also disposed to run on the server module 801, and can be configured to provide a functional interface with e.g., the headend or any client processes 702a, 704 on the network CPE 106 (where used), or other interposed or remote entities. These components and functionalities are well known to those of ordinary skill in the cable and embedded system fields, and accordingly not described further herein.

The device 801 of FIG. 8 may take any number of physical forms, comprising for example one of a plurality of discrete modules or cards within a larger headend, network edge, or hub device of the type well known in the art. The server may also comprise firmware, either alone or in combination with other hardware/software components such as those previously described (e.g., disposed in the aforementioned headend or edge device). Alternatively, the device 801 may be a stand-alone device or module disposed at the headend, hub or other site, and may even include its own RF front end (e.g., modulators, encryptors, etc.) or optical interface so as to interface directly with various portions of the HFC network 101. Numerous other configurations may be used. The device 801 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the APCSM functionality described above may take the form of one or more computer programs (e.g., the network and client processes, 702, 704). Alternatively, such computer programs may have one or more components distributed across various hardware environments at the same or different locations, such as where the APCSM network process 702 is distributed across multiple platforms at the hub site and the headend 150 as shown in FIGS. 7b and 7d.

As yet another example, portions of the functionality may be rendered as a dedicated or application specific IC having code running thereon. Myriad different configurations for practicing the invention will be recognized by those of ordinary skill in the network arts provided the present disclosure.

CPE—

Figure 9:
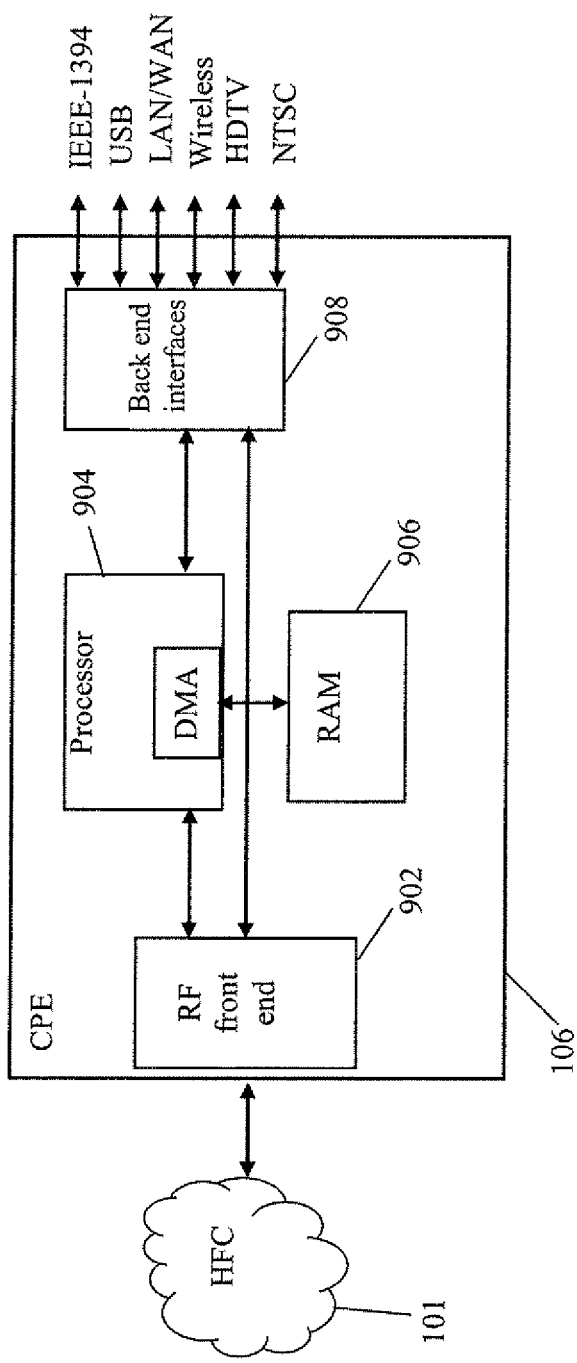
FIG. 9 is a functional block diagram illustrating an exemplary embodiment of CPE adapted to support advertising and promotion selection functionality.

FIG. 9 illustrates an exemplary embodiment of the improved CPE 106 according to the present invention. It will be appreciated that in MSO implementations where no CPE or client portion of the APCSM software process is used (such as in FIGS. 7a and 7b previously discussed), literally any type of CPE 106 that is compatible with the bearer network may be used. However, in cases where an APCSM client portion is desired (e.g., to obtain subscriber/use/CPE profile or operational data and send it back upstream to the APCSM network portion), the following exemplary configuration may be used.

As shown in the simplified diagram of FIG. 9, the exemplary device 106 generally comprises and OpenCable (OCAP)-compliant embedded system having an RF front end 902 (including tuner and demodulator/decryptors) for interface with the HFC network 101 of FIGS. 1-1c, digital processor(s) 904, storage device 906, and a plurality of interfaces 908 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 9 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 9 is also provided with an OCAP 1.0-compliant application and Java-based middleware which, inter alia, manages the operation of the device and applications running thereon (including the client process 404 where used). It will be recognized by those of ordinary skill that myriad different device and software architectures may be used consistent with the tuning functions of the present invention, the device of FIG. 9 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the APCSM client process 704.

In another embodiment, the CPE 106 comprises a converged premises device, such as for example that described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

Moreover, the foregoing embodiments of the CPE 106 may utilize any number of other methods and apparatus in conjunction with the functionality previously described herein in order to further extend its capabilities. See, e.g., co-owned U.S. patent application Ser. No. 10/723,959 filed Nov. 24, 2003 entitled "METHODS AND APPARATUS FOR HARDWARE REGISTRATION IN A NETWORK DEVICE," and issued as U.S. Pat. No. 8,302,111 on Oct. 30, 2012; U.S. patent application Ser. No. 10/773,664 filed Feb. 6, 2004 entitled "METHODS AND APPARATUS FOR DISPLAY ELEMENT MANAGEMENT IN AN INFORMATION NETWORK", and issued as U.S. Pat. No. 9,213,538 on Dec. 15, 2015; and U.S. patent application Ser. No. 10/782,680 filed Feb. 18, 2004 entitled "MEDIA EXTENSION APPARATUS AND METHODS FOR USE IN AN INFORMATION NETWORK", and issued as U.S. Pat. No. 8,078,669 on Dec. 13, 2011, each of the foregoing incorporated herein by reference in its entirety. Myriad other combinations and variations of the CPE 106 will also be recognized by those of ordinary skill given the present disclosure.

As previously noted, the CPE 106 of FIG. 9 further comprises an APCSM client portion 704, in the form of e.g., a software application running on the CPE. This software application may be configured to perform any number of functions relating to targeted advertising or promotion delivery, including without limitation: (i) forming a cryptographic hash of one or more CPE-specific variables in order to maintain the anonymity of the CPE/subscriber with respect to historical or profile data, as previously described; (ii) generating "telescoping" advertisement interfaces or other user interfaces that allow the subscriber to interact with the CPE; (iii) collecting data on user-specific activities such as tuning or activity logs, power on/off times/duration, PPV/VoD requests, frequency of use of other ancillary functions associated with the CPE, DVR or monitor operation and use (such as via communications from a connected DVR or monitor device), etc.; (iv) identifying and communicating CPE hardware or software errors logged by the middleware; (v) identifying and communicating new hardware or software components logged with the middleware registry, and so forth.

Advertising Insertion Apparatus and Methods—

In content-based networks such as cable television networks, advertisements (including without limitation promotions, commercials, and short segments) that are viewed by subscribers can be controlled in several ways. Generally, two categories or subdivisions of these techniques exist: (i) national- or high-level insertion, and (ii) local- or low-level insertion.

Under national level insertion, national networks (such as NBC, ABC, etc.) are responsible for determining the advertisements or promotions that are resident in a given program stream. The pre-configured stream is delivered to the network operator (e.g., MSO), and the MSO merely then delivers the stream (content and advertisements) to the relevant subscribers over their network.

Under local-level insertion, the MSO (and even broadcast affiliates) can insert locally-generated advertisements or commercials and other such segments into remotely distributed regional programs before they are delivered to the network subscribers.

In terms of technology, three primary variants of advertisement insertion technologies exist: (i) analog; (ii) hybrid analog/digital; and (iii) digital.

Under the analog approach, programs are distributed as NTSC video and include analog cues (tones) to the MSO that signal the local operator to replace the national-level advertisements with locally-generated ones. Insertion equipment includes so-called ad-splicers and storage devices that is typically maintained in the MSO headend or other location. These analog systems, however, have limited capability and do not support advanced functionality such as detecting a program change (e.g., situations where the advertisement lineup should or could be changed due to a change in the content broadcast schedule, such as where a championship sporting event runs into overtime). Moreover, analog systems make targeted/addressable advertising insertion difficult if not impossible.

Under the hybrid approach, advertisements are stored in a digitally compressed or encoded format, e.g., MPEG-2, in local storage. Both the source (network) feed to the headend and the subscriber delivery channel can be either analog or digital. If the network feed is analog, embedded cue-tones are used to cue retrieval and conversion of the digital advertisement to analog. An analog splicer switches input from the network feed to the converted local advertisement. When completed, the splicer switches the input back to the network feed.

The analog output of the splicer is encoded to a digital format in the case that the delivery channel to the subscriber is digital. If the channel is digital, the analog output of the splicer is digitally encoded. If the network feed and subscriber delivery channel are both digital, both the program network feed and the advertisement are converted into analog prior to insertion of the advertisement. The analog content is then encoded back to digital before delivery to the subscriber. Unfortunately, the aforementioned conversion from digital to analog, and then back to digital, requires a high processing overhead and cost, and may significantly degrade video quality since the conversions are at least partly "lossy" in nature.

Under the fully digital approach, many of the aforementioned limitations are overcome. Several standards have been developed to implement such digital techniques, including SCTE 35 2001 (formerly DVS253), "Digital Program Insertion Cueing Message for Cable", and SCTE 30 2001 (formerly DVS380), "Digital Program Insertion Splicing API". These standards define splicing of MPEG-2 streams for digital content insertion (including advertisements), and create standardized communication protocols for the insertion of content into any MPEG-2 output multiplex in the splicer.

By keeping the process of local advertisement insertion completely within the digital compressed domain, as well as keeping this content in the compressed domain from the network operator to the subscribers, the quality of the network-supplied video and advertisements is maintained effectively intact.

Advantageously, the present invention can be used with any number of different advertising insertion or splicer architectures, whether analog, digital or hybrid in nature. See, for example, co-owned U.S. patent application Ser. No. 10/662,776 filed Sep. 15, 2003 entitled "SYSTEM AND METHOD FOR ADVERTISEMENT DELIVERY WITHIN A VIDEO TIME SHIFTING ARCHITECTURE", and issued as U.S. Pat. No. 8,078,669 on Dec. 13, 2011, which is incorporated by reference herein in its entirety, for exemplary advertising insertion and splicer apparatus and methods in the context of, e.g., networked digital video recorder (nDVR) or VoD delivery paradigms.

In one variant, advertising insertion is accomplished by routing the network feed through a splicer. The splicer may be used to create multiple output versions of the network feed for a current advertising zone structure (e.g., CNN Boulder, CNN Denver). When an SCTE 35 cue enters the splicer on the network feed, the splicer generates a cue request to the advertising server management section (here, which includes the APCSM 401). The advertising server management section determines which advertisement or promotion to play, according to a schedule, as previously discussed. The advertising server management section then instructs the splicer to splice a content stream, and instructs a content server to play the selected advertisement or promotion at the designated time according to the schedule.

In the context of an exemplary nPVR (network personal video recorder) VoD architecture that implements splicing, the networks are run through a statistical multiplexer (stat-mux) splicer for two reasons: (i) by always splicing in a default advertisement, a "splice point" is inserted in the compressed MPEG stream and this makes it trivial to split the content at the correct point; and (ii) the stat-mux clamps or adjusts the input feed to VoD encoding standards. The networks are fed to the VoD server (optionally through a device that splits the content into chapters and advertisements). The VoD server treats the input stream as a file once ingested (and may or may not be stored depending on the current acquisition rules for the program).

When a user (or the server in advance of a user request) requires a stream, a "session" is first set up. The difference between this session and a normal unicast on-demand session is that this session is assigned a multicast IP. The multicast IP allows many edge QAMs to join the stream versus directing the stream directly to an edge QAM in unicast IP mode. This session basically is a minimal delay "StartOver" session, essentially passing the real-time network feed through the VoD server. When an SCTE 35 cue is seen on the RTA input section, an SCTE 30 cue is sent to the advertising manager (ADM), which may incorporate the APCSM 401 described previously herein. As is well known, the ADM can be implemented externally to the VoD server, or internally to the VoD server. If located internal to the VoD server, the SCTE 30 message is not needed.

The ADM then selects an advertisement or promotion to play. In the case of the aforementioned BSA network (FIG. 1c) a DVS/629 or similar mechanism can be used to request a real-time match as to the best asset to play at this instant. This can be based e.g., on the number of viewers, demographics, geographics, psychographics, or whatever other information is available on the user or group of users that this feed is being delivered to, as previously described herein. The ADM then instructs the VoD server the name of the selected advertising or promotional content element to splice in. When the VoD server detects the appropriate splice point, timed by the SCTE 35 cue and the previously inserted default advertisement, it performs a playlist diversion between the RTA content and the selected content element. After the advertisement or promotion content finishes, the VoD server playlist diverts back to the RTA stream.

Business Methods and "Rules" Engine—

In another aspect of the invention, the aforementioned APCSM process 702 (e.g., rendered as one or more computer programs) optionally includes an operations and/or business rules engine. This engine comprises, in an exemplary embodiment, a series of software routines running on the network device 801 of FIG. 8 or other associated hardware/firmware environment that are adapted to control the operation of the targeted advertising/promotion algorithms previously described. These rules may also be fully integrated within the APCSM process itself, and controlled via e.g., a GUI on a PC connected to the network device 801. In effect, the rules engine comprises a supervisory entity which monitors and selectively controls or coordinates with, via the APCSM process 702 and/or CPE process 704, the advertising/promotion insertion functions at a higher level, so as to implement desired operational or business rules.

The rules engine can in one embodiment be considered an overlay of sorts to the algorithms of the APCSM 702 previously described. For example, the APCSM process 702 may invoke certain operational protocols or decision processes based on data received from the CPE 106 (e.g., historical activity data, CPE configuration, etc.), subscriber-specific data (e.g., profile, preferences, demographic, etc.), network operational or historical data, geographic data, etc. However, these processes may not always be compatible with higher-level business or operational goals, such as maximizing profit on a network-wide basis (or after consideration of other factors not input to the APCSM algorithms, such as taxes, cost/benefit of certain alternative courses of action, maintenance or repair costs, additional equipment leasing or use costs, etc.), or system reliability and/or flexibility. Moreover, the APCSM may be operating on a per-CPE or per-request basis (i.e., evaluating each individual request effectively in isolation, and generating a decision or recommendation without considering larger patterns or decisions being made in the service group or network as a whole).

Hence, when imposed, the business/operational rules can be used to dynamically (or manually) control the operation of the APCSM process 702 (and/or client process 704), in conjunction with the operational "recommendations" generated by the APCSM 702 as part of its advertising or group selection functions previously described.

For example, one rule implemented by the rules engine may comprise selectively servicing (or at least queuing first) requests from certain users first with targeted advertising or promotions; e.g., those with a higher subscription priority or level under bandwidth-limited cases, and only after this tier of users is satisfied, servicing any remaining content requests. This assures that the MSO's "premium" clients receive the most tailored advertising or promotional content first, thereby increasing their satisfaction. In one variant, subscribers are divided into tiers (a hierarchy), and certain tiers of the hierarchy are serviced to a prescribed level first.

Another rule might allow for the relegation of low-priority requests to the back of the service queue; e.g., those associated with subscribers who have elected to receive content on a less-than-timely or delayed basis (perhaps in exchange for financial or other considerations). Such subscribers effectively do not care when they receive the content (within certain constraints, obviously), and hence the MSO can prioritize other requests first. When these latent requests are subsequently processed, appropriate advertising or promotional content for that later time can be selected.

Similarly, capacity (e.g., bandwidth) for servicing requests can be allocated to those users which, e.g., based on demographics, historical patterns, geographic area, etc. will make best use of the bandwidth in terms of reaching the desired penetration (e.g., number, type, and/or quality of impressions), monetary return, profit, or some other business performance metric. For example, the MSO might invoke a business rule that selectively processes content requests in terms of advertisement selection for the best or most lucrative zip codes (or demographic slices) first. Such identification of certain zip codes can be performed using, inter alia, the methods and apparatus set forth in U.S. patent application Ser. No. 11/186,452 entitled "METHOD AND APPARATUS FOR BOUNDARY-BASED NETWORK OPERATION", previously referenced and incorporated herein.

Moreover, a cost/benefit optimization technique may be utilized consistent with the present invention. For example, a decision process may be used to evaluate various options for use of network capacity (such as bandwidth), and determine which is/are most desirable from an operations or business standpoint.

A composite or weighted grade can also be formed, such as where the overall grade of a prospective insertion includes: (i) a metric indicating the level of demographic/psychographic match; (ii) a metric indicating the level of context match or correlation; and (iii) a metric indicating the relative or absolute profit or revenue benefit from the proposed insertion. Myriad other schemes for ranking or prioritizing advertising/promotional content for insertion based on such factors will be readily appreciated by those of ordinary skill given the present disclosure.

It will also be appreciated that the decisions generated by the APCSM selection analysis can be manually or semi-manually utilized by network operators, such as in the form of a recommendation rather than a hard and fast decision point. For instance, the APCSM may present a recommended choice or selection to a human operator, thereby letting the operator decide whether to implement it. This variant of the invention allows for the intangible but often important "gut feeling" or intrinsic knowledge of the operator to be factored into the decision process. The operator may also be able to identify trends or patterns in subscriber activity, behavior, network operation, etc. that the APCSM or rules engine cannot, such as the topical popularity of a given program or advertisement, in effect allowing the operator to override the APCSM when his/her knowledge or intuition says that a different course should be followed.

Enforcement of the foregoing business rules may be executed by servers or other devices separately for each service (e.g. nDVR, BSA or VoD) or centrally via the controlling actions of a master APCSM, SRM (Session and Resource Manager) or other network agent.

In one embodiment, advertisers or even content providers (e.g., studios, networks, etc.) would pay a premium or provide other incentives to the MSO to have particular advertisements or promotions prioritized over others targeted to the same demographic. For example, the MSO may program its rules engine to select the more lucrative of various advertiser's content (i.e., the one for which they receive greater payment or other consideration for using).

Similarly, a more incremental approach can be applied, such as where various advertisements or promotions are "graded" based on profit/revenue and/or operational considerations (i.e., those which earn most and/or give highest user satisfaction, etc. receive a higher grade), and the insertion at particular points within one or more program channels based on such grade(s).

Since the program-coupled fee structure of the prior art is not utilized in the exemplary embodiments, the present invention advantageously provides opportunities for many different fee or consideration models. As previously described, the prior art fee structure is generally based on the program(s) during which the advertisement is run, and the number of different "runs" (or total time of run). So, for example, running a car advertisement twice during a very "Nielsen rating"-popular program in prime time might cost the advertiser significantly more than the same advertisement run once during off-prime hours and a less popular program. In contrast, the dynamic targeted approach of the present invention is not bound to insert the car advertisement at any given time or slot, or coupled with any particular program. It may be decided, for example, that the advertiser will achieve maximum penetration to the target demographic by inserting the car advertisement 5 times over multiple different programs that are less popular, but more narrowly tailored to the target demographic. For instance, a Nielsen-type approach may indicate that 10 million viewers will view a prime-time program such as American Idol, and that many of those viewers will be 18-30 year-old females. However, if the advertiser seeks to penetrate a more focused demographic (e.g., 27-30 year-old females that live in the Southern California area and which have college degrees, since their market research indicates that most buyers of their product fall into such a category), it may be more efficacious to run the advertiser's spot multiple times but only within Southern California markets, and only on prescribed channels which the MSO's historical analysis indicates that such 27-30 year-old college educated females watch.

In another aspect of the invention, a "click-through" or similar revenue model can be employed for determining payments or cost of the advertising or promotions. As is well known in the context of the Internet, click-through models in general generate revenue for a carrier based at least in part on the number of certain events that occur (e.g., clicks or interactions with a certain advertisement's hyperlink or website). Similarly, interactions by a subscriber with an entity associated with the MSO can be recorded and used as a basis for determining advertising pricing or other factors. This can be modeled multiple ways, such as where the more interactions that occur, the more the advertiser pays (based on ostensibly coupling the more interactions with more "impressions" and hence prospective value to the advertiser, and greater burden on the MSO infrastructure). In one variant, the aforementioned telescoping advertisements are used as the basis of this model; e.g., when a subscriber telescopes and advertisement/promotion, or interacts some other way with it, this is considered an affirmative show of interest (or at least impression).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A computerized method for delivery of digitally rendered secondary content within a content delivery network, the computerized method comprising:
   receiving data representative of a request, the request originating from a third party entity and comprising a request for the delivery of the digitally rendered secondary content over the content delivery network, the digitally rendered secondary content comprising advertising or promotional content having at least one target demographic or psychographic associated therewith;
   obtaining information about a first plurality of users of the content delivery network;
   identifying at least a portion of the first plurality of users as belonging to the at least one target demographic or psychographic based at least in part on the information;
   identifying computerized client devices associated with at least the portion of the first plurality of users, respectively; and
   delivering the digitally rendered secondary content to the computerized client devices, the delivering being (i) based at least in part on the at least one target demographic or psychographic, and (ii) agnostic to digitally rendered primary content being delivered to at least the portion of the first plurality of users contemporaneously with the digitally rendered secondary content.

2. The computerized method of claim 1, wherein the delivering comprises:
   based on one or more device parameters of the computerized client devices, selecting one or more delivery modes from a plurality of potential delivery modes.

3. The computerized method of claim 2, wherein said selecting the one or more delivery modes comprises selecting one delivery mode, the one delivery mode comprising delivering the digitally rendered secondary content substantially at the beginning or at the end of the digitally rendered primary content.

4. The computerized method of claim 2, wherein said selecting the one or more delivery modes comprises selecting one delivery mode, the one delivery mode comprising
   delivering the digitally rendered secondary content substantially in the middle of the digitally rendered primary content.

5. The computerized method of claim 2, wherein said selecting the one or more delivery modes comprises selecting one delivery mode, the one delivery mode comprising delivering the digitally rendered secondary content at different points within the digitally rendered primary content.

6. The computerized method of claim 2, wherein:
   the one or more delivery modes comprise high definition (HD)-encoded delivery and standard definition (SD)-encoded delivery;

the one or more device parameters comprise bandwidth and processing power available to the computerized client devices; and the selecting of the one or more delivery modes comprises selecting, based on the bandwidth and processing power, one of the HD-encoded delivery or the SD-encoded delivery.

7. The computerized method of claim 2, further comprising selecting the one or more device parameters, the one or more device parameters comprising a display environment of the computerized client devices.

8. The computerized method of claim 1, further comprising:

obtaining viewing data, the viewing data relating to said delivering of said digitally rendered secondary content; and providing the viewing data to said third party entity.

9. The computerized method of claim 8, wherein said obtaining the viewing data comprises:

causing installation of a client application on at least a portion of the computerized client devices; and receiving the viewing data via the client application.

10. The computerized method of claim 9, wherein the causing of the installation of the client application comprises causing installation of an interactive client application, the interactive client application configured to prompt a user to provide at least a part of the viewing data to the client application.

11. The computerized method of claim 8, wherein said obtaining the viewing data comprises:

determining a power status (ON or OFF) of the computerized client devices; and determining a power status (ON or OFF) of monitors or screens associated with the computerized client devices.

12. The computerized method of claim 8, wherein said obtaining the viewing data comprises identifying when a viewing of the digitally rendered secondary content is interrupted by a user, the interruption comprising turning off power in the user's respective computerized client device, switching a channel, or pausing the digitally rendered secondary content, or switching.

13. The computerized method of claim 8, wherein the obtaining the viewing data comprises:

obtaining the viewing data on a sampling basis; and the computerized method further comprises:

extrapolating the viewing data on the sampling basis to at least the portion of the first plurality of users.

14. The computerized method of claim 8, wherein said obtaining the viewing data includes determining an actual or estimated number of views of the digitally rendered secondary content achieved within a time frame by at least the portion of the first set of users.

15. The computerized method of claim 8, wherein said obtaining the viewing data includes determining saturation levels of the digitally rendered secondary content in at least the portion of the first set of users.

16. Computerized network apparatus for use in a content delivery network, said computerized network apparatus comprising:

processing apparatus; and storage apparatus in data communication with said processing apparatus, said storage apparatus comprising at least one computer program having a plurality of instructions, said plurality of instructions configured to, when executed by said processing apparatus:

receive data representative of a request from a computerized client device of a user, the request comprising a request for delivery of digital secondary content to the computerized client device via said content delivery network, said data representative of said request comprising data specific to the computerized client device, said digital secondary content comprising data relating to at least one target demographic or target psychographic;

obtain user information, the user information relating to said user;

determine that said user correlates to at least one of said at least one target demographic or target psychographic, the determination based at least in part on a computerized evaluation of said data relating to said at least one target demographic or target psychographic and said user information;

determine a type of delivery mode of said computerized client device, the determination based on said data specific to said computerized client device; and deliver said digital secondary content to said user, the delivery based at least in part on said type of delivery mode and said at least one target demographic or target psychographic.

17. A computerized method of delivering a plurality of digitally rendered secondary content elements to one or more computerized devices of one or more respective users of a content delivery network, the computerized method comprising:

determining one or more descriptive features associated with said plurality of digitally rendered secondary content elements;

identifying one or more target users of said content delivery network, the identifying based at least in part on said descriptive features;

identifying one or more digitally rendered primary content elements to be delivered over said content delivery network; and delivering both said plurality of digitally rendered secondary content elements and the one or more digitally rendered primary content elements to said identified one or more target users, said delivering comprising delivering said plurality of digitally rendered secondary content elements and the one or more digitally rendered primary content elements according to a prescribed schedule.

18. The computerized method of claim 17, further comprising selecting the plurality of digitally rendered secondary content elements, wherein the plurality of digitally rendered secondary content elements are each contextually related to one another, yet differ from each other in at least one aspect.

19. The computerized method of claim 17, wherein the delivering of said plurality of digitally rendered secondary content elements and the one or more digitally rendered primary content elements according to the prescribed schedule comprises delivering the plurality of digitally rendered secondary content elements at different points within the one or more digitally rendered primary content elements.

20. The computerized method of claim 17, wherein the delivering of said plurality of digitally rendered secondary content elements and the one or more digitally rendered primary content elements according to the prescribed schedule comprises delivering the plurality of digitally rendered secondary content elements substantially one after another with no intervening content.

* * * * *